(12) United States Patent
Wang et al.

(10) Patent No.: US 12,453,600 B2
(45) Date of Patent: Oct. 28, 2025

(54) ANATOMICAL SCANNING, TARGETING, AND VISUALIZATION

(71) Applicant: IMIRGE MEDICAL INC., London (CA)

(72) Inventors: Hao Wang, Seattle, WA (US); Neil Duggal, London (CA)

(73) Assignee: IMIRGE MEDICAL INC. (CA)

( * ) Notice: Subject to any disclaimer, the term of this patent is extended or adjusted under 35 U.S.C. 154(b) by 472 days.

(21) Appl. No.: 17/954,263

(22) Filed: Sep. 27, 2022

(65) Prior Publication Data

US 2023/0015717 A1   Jan. 19, 2023

Related U.S. Application Data

(63) Continuation-in-part of application No. 16/595,255, filed on Oct. 7, 2019, now abandoned, which is a
(Continued)

(51) Int. Cl.
*A61B 34/10* (2016.01)
*A61B 5/00* (2006.01)
(Continued)

(52) U.S. Cl.
CPC ............ *A61B 34/10* (2016.02); *A61B 5/0059* (2013.01); *A61B 17/00* (2013.01); *A61B 34/20* (2016.02);
(Continued)

(58) Field of Classification Search
CPC ....... A61B 34/10; A61B 5/0059; A61B 17/00; A61B 34/20; A61B 90/11; A61B 90/13;
(Continued)

(56) References Cited

U.S. PATENT DOCUMENTS

| 5,212,720 A | 5/1993 | Landi |
| 5,230,623 A | 7/1993 | Guthrie |

(Continued)

FOREIGN PATENT DOCUMENTS

| CA | 2866370 A1 | 9/2013 |
| CN | 102813504 A | 12/2012 |

(Continued)

OTHER PUBLICATIONS

International Search Report dated Jan. 12, 2023 for corresponding PCT Application No. PCT/US2022/044945.

*Primary Examiner* — Sanjay Cattungal
(74) *Attorney, Agent, or Firm* — David Meibos; Maywood IP Law

(57) ABSTRACT

A method for visualizing and targeting anatomical structures inside a patient utilizing a handheld screen device may include grasping the handheld screen device and manipulating a position of the handheld screen device relative to the patient. The handheld screen device may include a camera and a display. The method may also include orienting the camera on the handheld screen device relative to an anatomical feature of the patient by manipulating the position of the handheld screen device relative to the patient, capturing first image data of light reflecting from a surface of the anatomical feature with the camera on the handheld screen device, and comparing the first image data with a preoperative 3-D image of the patient to determine a location of an anatomical structure located inside the patient and positioned relative to the anatomical feature of the patient.

19 Claims, 38 Drawing Sheets

Related U.S. Application Data continuation of application No. 15/006,951, filed on Jan. 26, 2016, now Pat. No. 10,433,911, which is a continuation-in-part of application No. 14/490,610, filed on Sep. 18, 2014, now Pat. No. 9,877,795.

(60) Provisional application No. 63/248,732, filed on Sep. 27, 2021, provisional application No. 62/108,193, filed on Jan. 27, 2015, provisional application No. 62/051,784, filed on Sep. 17, 2014, provisional application No. 61/879,620, filed on Sep. 18, 2013.

(51) Int. Cl.

| | |
|---|---|
| *A61B 17/00* | (2006.01) |
| *A61B 34/20* | (2016.01) |
| *A61B 90/11* | (2016.01) |
| *A61B 90/13* | (2016.01) |
| *A61B 90/30* | (2016.01) |
| *A61B 6/00* | (2006.01) |
| *A61B 6/12* | (2006.01) |
| *A61B 6/46* | (2024.01) |
| *A61B 6/58* | (2024.01) |
| *A61B 8/00* | (2006.01) |
| *A61B 8/08* | (2006.01) |
| *A61B 90/00* | (2016.01) |

(52) U.S. Cl.
CPC .............. *A61B 90/11* (2016.02); *A61B 90/13* (2016.02); *A61B 90/30* (2016.02); *A61B 6/12* (2013.01); *A61B 6/4441* (2013.01); *A61B 6/461* (2013.01); *A61B 6/582* (2013.01); *A61B 8/0841* (2013.01); *A61B 8/4416* (2013.01); *A61B 8/4438* (2013.01); *A61B 8/461* (2013.01); *A61B 2017/00398* (2013.01); *A61B 2034/107* (2016.02); *A61B 90/361* (2016.02); *A61B 2090/363* (2016.02); *A61B 2090/364* (2016.02); *A61B 2090/3916* (2016.02); *A61B 2090/3954* (2016.02); *A61B 2090/3966* (2016.02); *A61B 2090/3991* (2016.02)

(58) Field of Classification Search
CPC ......... A61B 90/30; A61B 6/12; A61B 6/4441; A61B 6/461; A61B 6/582; A61B 8/0841; A61B 8/4416; A61B 8/4438; A61B 8/461; A61B 90/361; A61B 2017/00398; A61B 2034/107; A61B 2090/363; A61B 2090/364; A61B 2090/3916; A61B 2090/3954; A61B 2090/3966; A61B 2090/3991; A61B 6/4417; A61B 6/4464; A61B 6/466; A61B 6/501; A61B 6/5235; A61B 2034/2048; A61B 8/085; A61B 17/1703; A61B 90/96; A61B 2017/00199; A61B 2017/00221; A61B 2017/00734; A61B 2034/2059; A61B 2034/2065; A61B 2034/2068; A61B 2090/309; A61B 2090/366; A61B 2090/371; A61B 2090/374; A61B 2090/376; A61B 2090/3764; A61B 2090/3937; A61B 2090/3983; A61B 5/1077; A61B 5/1079; A61B 5/6898; A61B 5/742; A61B 5/0077; G01R 33/285

See application file for complete search history.

(56) References Cited

U.S. PATENT DOCUMENTS

| | | |
|---|---|---|
| 5,662,111 A | 9/1997 | Cosman |
| 5,782,842 A | 7/1998 | Kloess |
| 5,807,387 A | 9/1998 | Druais |
| 6,178,340 B1 | 1/2001 | Svetliza |
| 6,187,018 B1 | 2/2001 | Sanjay-Gopal |
| 7,281,849 B2 | 10/2007 | Sohal |
| 7,603,163 B2 | 10/2009 | McNeirney |
| 7,831,096 B2 | 11/2010 | Williamson, Jr. |
| 8,246,352 B2 | 8/2012 | Takebayashi |
| 8,265,731 B2 | 9/2012 | Kukuk |
| 8,271,069 B2 | 9/2012 | Jascob |
| 8,332,012 B2 | 12/2012 | Kienzle, III |
| 8,412,308 B2 | 4/2013 | Goldbach |
| 8,467,851 B2 | 6/2013 | Mire |
| 8,467,852 B2 | 6/2013 | Csavoy |
| 8,473,026 B2 | 6/2013 | Ferre |
| 9,504,531 B2 | 11/2016 | Teichman |
| 9,510,771 B1 | 12/2016 | Finley |
| 9,877,795 B2 * | 1/2018 | Hao ..................... A61B 90/11 |
| 10,016,243 B2 | 7/2018 | Esterberg |
| 10,398,514 B2 | 9/2019 | Ryan |
| 10,433,911 B2 | 10/2019 | Wang |
| 10,499,996 B2 | 12/2019 | de Almeida Barreto |
| 10,603,133 B2 | 3/2020 | Wang |
| 10,646,283 B2 | 5/2020 | Johnson |
| 10,646,285 B2 | 5/2020 | Siemionow |
| 10,698,493 B1 | 6/2020 | Crowther |
| 10,820,948 B2 | 11/2020 | West |
| 10,841,556 B2 | 11/2020 | Casas |
| 10,849,693 B2 | 12/2020 | Lang |
| 11,096,765 B2 | 8/2021 | Atiya et al. |
| 12,251,203 B2 * | 3/2025 | Davies ................. A61B 5/743 |
| 2004/0005061 A1 * | 1/2004 | Buer ................... H04L 63/0485 |
| | | 380/282 |
| 2006/0015030 A1 | 1/2006 | Poulin |
| 2009/0274271 A1 * | 11/2009 | Pfister ................... A61B 90/13 |
| | | 378/65 |
| 2011/0245660 A1 | 10/2011 | Miyamoto |
| 2013/0060146 A1 * | 3/2013 | Yang ..................... A61B 34/20 |
| | | 600/476 |
| 2014/0100620 A1 * | 4/2014 | Mullaney ........... A61B 17/1725 |
| | | 606/86 R |
| 2014/0107473 A1 * | 4/2014 | Dumoulin .......... A61B 17/1703 |
| | | 606/130 |
| 2014/0276000 A1 * | 9/2014 | Mullaney .............. A61B 34/20 |
| | | 600/424 |
| 2016/0166333 A1 | 6/2016 | Wang et al. |
| 2017/0280970 A1 | 10/2017 | Sartor et al. |
| 2018/0092699 A1 | 4/2018 | Finley |
| 2019/0029757 A1 | 1/2019 | Roh |
| 2019/0053851 A1 | 2/2019 | Siemionow |
| 2019/0142519 A1 | 5/2019 | Siemionow |
| 2019/0175285 A1 | 6/2019 | Siemionow |
| 2019/0192230 A1 | 6/2019 | Siemionow |
| 2019/0333480 A1 | 10/2019 | Lang |
| 2020/0085511 A1 | 3/2020 | Oezbek |
| 2020/0129240 A1 | 4/2020 | Singh |
| 2020/0138518 A1 | 5/2020 | Lang |
| 2020/0197107 A1 | 6/2020 | Ryan |
| 2020/0229869 A1 | 7/2020 | Dorman |
| 2020/0237256 A1 | 7/2020 | Farshad |
| 2020/0357176 A1 | 11/2020 | Crowther |
| 2020/0390412 A1 | 12/2020 | Bertram |
| 2021/0177517 A1 | 6/2021 | Uhde et al. |
| 2021/0192759 A1 | 6/2021 | Lang |

FOREIGN PATENT DOCUMENTS

| | | |
|---|---|---|
| CN | 109512514 A | 3/2019 |
| CN | 110537985 A | 12/2019 |
| CN | 110660130 A | 1/2020 |
| EP | 3443888 A1 | 2/2019 |
| EP | 3566669 A1 | 11/2019 |
| EP | 3721826 A1 | 10/2020 |
| JP | 2003260064 A | 9/2003 |
| WO | WO2016195401 A1 | 12/2016 |

* cited by examiner

ANATOMICAL SCANNING, TARGETING, AND VISUALIZATION

CROSS-REFERENCE TO RELATED APPLICATIONS

The present application claims the benefit of U.S. Provisional Patent Ser. No. 63/248,732, entitled ANATOMICAL SCANNING, TARGETING, AND VISUALIZATION, which was filed on Sep. 27, 2021. The present application is also a continuation-in-part of U.S. patent application Ser. No. 16/595,255, entitled OPTICAL TARGETING AND VISUALIZATION OF TRAJECTORIES, which was filed on Oct. 7, 2019, which is a continuation of U.S. patent application Ser. No. 15/006,951, entitled OPTICAL TARGETING AND VISUALIZATION OF TRAJECTORIES, which was filed on Jan. 26, 2016 and issued on Oct. 8, 2019 as U.S. Pat. No. 10,433,911. U.S. patent application Ser. No. 15/006,951 claims the benefit of U.S. Provisional Patent Ser. No. 62/108,193, entitled OPTICAL TARGETING AND VISUALIZATION OF TRAJECTORIES, which was filed on Jan. 27, 2015. U.S. patent application Ser. No. 15/006,951 is also a continuation-in-part of U.S. patent application Ser. No. 14/490,610, entitled OPTICAL TARGETING AND VISUALIZATION OF TRAJECTORIES, which was filed on Sep. 18, 2014 and issued on Jan. 30, 2018 as U.S. Pat. No. 9,877,795. U.S. patent application Ser. No. 14/490,610 claims the benefit of U.S. Provisional Patent Ser. No. 62/051,784, entitled OPTICAL TARGETING AND VISUALIZATION OF TRAJECTORIES, which was filed on Sep. 17, 2014. U.S. patent application Ser. No. 14/490,610 also claims the benefit of U.S. Provisional Patent Ser. No. 61/879,620, entitled OPTICAL TARGETING AND VISUALIZATION OF TRAJECTORIES, which was filed on Sep. 18, 2013. All of the foregoing documents are incorporated by reference as though set forth herein in their entirety.

TECHNICAL FIELD

The present disclosure relates to medical systems and methods. More specifically, the present disclosure relates to systems and methods for scanning, targeting, and visualization of anatomical features for medical procedures.

BACKGROUND

Various imaging techniques, such as X-rays, fluoroscopy, ultrasound, computerized tomography (CT), and magnetic resonance imaging (MRI) play a role in a wide variety of medical procedures. The term "image assisted" may be used to describe medical procedures utilizing some type of imaging technique to guide the medical procedure.

The incorporation of image guidance systems into various procedures allows a physician to correlate a location of a patient's anatomy to images taken preoperatively or intraoperatively using various imaging modalities such as x-rays, ultrasounds, CT scans, MRI's, etc. The use of image guidance systems also provides the ability to look through superficial layers of anatomy to visualize deeper targets of interest. Further, image guidance systems provide the guidance needed to access target areas of interest within the patient's anatomy through the use of pre-defined entry points and/or target zones. Often, physicians rely heavily on imaging systems when a target cannot be directly visualized in order to avoid damage to surrounding anatomical structures and to minimize unnecessary tissue trauma. Image navigation has proven to be extremely useful in improving accuracy of targeting, avoiding damage to surrounding critical structures, and improving patient outcomes. However, accurate targeting of deep anatomical structures is challenging across multiple disciplines. There is a need for image guidance systems that facilitate identification of trajectories that are difficult to visualize.

There are several clinical applications that may benefit from improved targeting methods. One example is the insertion of external ventricular drains (EVD) or ventricular shunts (ventricular peritoneal, ventricular atrial, ventricular pleural, etc.). EVD procedures may be performed to release/redirect cerebrospinal fluid (CSF) and/or monitor intracranial pressure (ICP). The current standard of care in EVD procedures involves a blind passage of the ventricular catheter from the skin surface to the deep ventricular system in the brain via crude external landmarks. Current image guided systems used in this procedure rely upon rigid fixation of the head and access to the operating room. In addition, the use of existing image guided systems may significantly lengthen the procedure time, making their use in the emergency setting unsuitable, especially when urgent control of ICP is needed.

A need exists for simple portable imaging systems that allow for real-time scanning of anatomical features that utilize preoperative imaging to guide the physician as they target structures hidden below the surface of the skin or anatomical feature in emergency situations. Imaging systems with the ability to perform deformable registration to account for tissue shift would also be desirable.

SUMMARY

The various systems and methods of the present disclosure have been developed in response to the present state of the art, and in particular, in response to the problems and needs in the art that have not yet been fully solved by currently available visualization systems. The systems and methods of the present disclosure may provide enhanced registration/tracking of patient anatomy as well as enhanced visualization of trajectories that facilitate a variety of medical procedures.

In some embodiments, a method for visualizing and targeting anatomical structures inside a patient utilizing a handheld screen device may include grasping the handheld screen device and manipulating a position of the handheld screen device relative to the patient. The handheld screen device may include a camera and a display. The method may also include orienting the camera on the handheld screen device relative to an anatomical feature of the patient by manipulating the position of the handheld screen device relative to the patient, capturing first image data of light reflecting from a surface of the anatomical feature with the camera on the handheld screen device, and comparing the first image data with a pre-operative 3-D image of the patient to determine a location of an anatomical structure located inside the patient and positioned relative to the anatomical feature of the patient.

In some embodiments, the method may also include projecting a structured light pattern onto the surface of the anatomical feature of the patient with a structured light source. The first image data may represent a deformed structured light pattern reflecting from the surface of the anatomical feature. The method may also include generating a 3-D surface map of the anatomical feature of the patient based on the deformed structured light pattern and registering the 3-D surface map with the pre-operative 3-D image of the patient. The pre-operative 3-D image may include second image data of the anatomical feature of the patient and third image data of the anatomical structure located inside the patient.

In some embodiments, the method may also include capturing fourth image data of the anatomical feature of the patient with the camera on the handheld screen device and displaying the fourth image data of the anatomical feature of the patient on the display of the handheld screen device.

In some embodiments, the method may also include displaying an augmented virtual image on the display of the handheld screen device in addition to the anatomical feature of the patient. The augmented virtual image may include at least one of: a virtual trajectory oriented with respect to the anatomical feature of the patient and the anatomical structure located inside the patient, and an overlay of the anatomical structure located inside the patient.

In some embodiments of the method, the structured light pattern may include a structured light dot matrix pattern.

In some embodiments of the method, the structured light dot matrix pattern may include at least one of: a predefined dot density, and a predefined spacing between adjacent dots forming the structured light dot matrix pattern.

In some embodiments of the method, the structured light pattern may include a structured light grid pattern.

In some embodiments of the method, the structured light grid pattern may include at least one of: a predefined orientation of lines forming the structured light grid pattern, and a predefined grid spacing between adjacent lines forming the structured light grid pattern.

In some embodiments, the handheld screen device may include a smart phone.

In some embodiments, a method for visualizing and targeting anatomical structures inside a patient utilizing a handheld screen device may include holding the handheld screen device and manipulating a position of the handheld screen device relative to the patient. The handheld screen device may include a camera and a display. The method may also include orienting the camera on the handheld screen device relative to an anatomical feature of the patient by manipulating the position of the handheld screen device relative to the patient, capturing image data of light reflecting from a surface of the anatomical feature with the camera on the handheld screen device, and comparing the image data with a pre-operative 3-D image of the patient to determine a location of an anatomical structure located inside the patient and positioned relative to the anatomical feature of the patient. The method may also include displaying the anatomical feature of the patient on the display of the handheld screen device and displaying an augmented virtual image on the display of the handheld screen device in addition to the anatomical feature of the patient. The augmented virtual image may include at least one of: a virtual trajectory oriented with respect to the anatomical feature of the patient and the anatomical structure located inside the patient, and an overlay of the anatomical structure located inside the patient.

In some embodiments, the method may also include projecting a structured light pattern onto the surface of the anatomical feature of the patient with a structured light source. The image data may represent light from a deformed structured light pattern reflecting from the surface of the anatomical feature. The method may also include generating a 3-D surface map of the anatomical feature of the patient based on the deformed structured light pattern and registering the 3-D surface map with the pre-operative 3-D image of the patient to determine the location of the anatomical structure located inside the patient.

In some embodiments of the method, the handheld screen device may include a smart phone.

In some embodiments of the method, the camera may be configured to capture infrared image data reflected from the surface of the anatomical feature of the patient.

In some embodiments of the method, the structured light pattern may include a structured light dot matrix pattern.

In some embodiments, a method for visualizing and targeting anatomical structures inside a patient utilizing a handheld screen device having a scanner, a detector, a registration module, a camera, and a display may include grasping the handheld screen device relative to the patient and orienting the scanner of the handheld screen device relative to an anatomical feature of the patient. The method may also include projecting a structured light pattern onto a surface of the anatomical feature with the scanner of the handheld screen device, capturing first image data of a deformed structured light pattern reflecting from the surface of the anatomical feature with the detector of the handheld screen device, and comparing the first image data with a pre-operative 3-D image of the patient to determine a location of an anatomical structure located inside the patient and positioned relative to the anatomical feature of the patient. The method may also include capturing second image data of the anatomical feature of the patient with the camera of the handheld screen device and displaying the second image data of the anatomical feature of the patient on the display of the handheld screen device.

In some embodiments, the method may also include generating a 3-D surface map of the anatomical feature of the patient based on the deformed structured light pattern in the first image data and registering the 3-D surface map and the pre-operative 3-D image of the patient with the registration module of the handheld screen device to determine the location of the anatomical structure located inside the patient.

In some embodiments, the method may also include displaying an augmented virtual image on the display of the handheld screen device in addition to the anatomical feature of the patient. The augmented virtual image may include at least one of: a virtual trajectory oriented with respect to the anatomical feature of the patient and the anatomical structure located inside the patient, and an overlay of the anatomical structure located inside the patient.

In some embodiments of the method, the handheld screen device may include a smart phone.

In some embodiments of the method, the scanner may be configured to capture infrared image data reflected from the surface of the anatomical feature of the patient.

In some embodiments of the method, the structured light pattern may include an infrared structured light dot matrix pattern.

These and other features and advantages of the present disclosure will become more fully apparent from the following description and appended claims or may be learned by the practice of the disclosure as set forth hereinafter.

BRIEF DESCRIPTION OF THE DRAWINGS

Exemplary embodiments of the disclosure will become more fully apparent from the following description and appended claims, taken in conjunction with the accompanying drawings. Understanding that these drawings depict only exemplary embodiments and are, therefore, not to be considered limiting of the disclosure's scope, the exemplary embodiments of the disclosure will be described with additional specificity and detail through use of the accompanying drawings in which:

It is to be understood that the drawings are for purposes of illustrating the concepts of the present disclosure and may not be drawn to scale. Furthermore, the drawings illustrate exemplary embodiments and do not represent limitations to the scope of the present disclosure.

DETAILED DESCRIPTION

Exemplary embodiments of the present disclosure will be best understood by reference to the drawings, wherein like parts are designated by like numerals throughout. It will be readily understood that components of the embodiments, as generally described and illustrated in the figures herein, could be arranged and designed in a wide variety of different configurations. Thus, the following more detailed description of the embodiments of the apparatus, system, and method, as represented in the figures, is not intended to limit the scope of the present disclosure, as claimed, but is merely representative of exemplary embodiments of the present disclosure.

The phrases "connected to," "coupled to" and "in communication with" refer to any form of interaction between two or more entities, including mechanical, electrical, magnetic, electromagnetic, fluid, and thermal interaction. Two components may be functionally coupled to each other even though they are not in direct contact with each other. The term "abutting" refers to items that are in direct physical contact with each other, although the items may not necessarily be attached together. The phrase "fluid communication" refers to two features that are connected such that a fluid within one feature is able to pass into the other feature.

The word "exemplary" is used herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Figure 1:
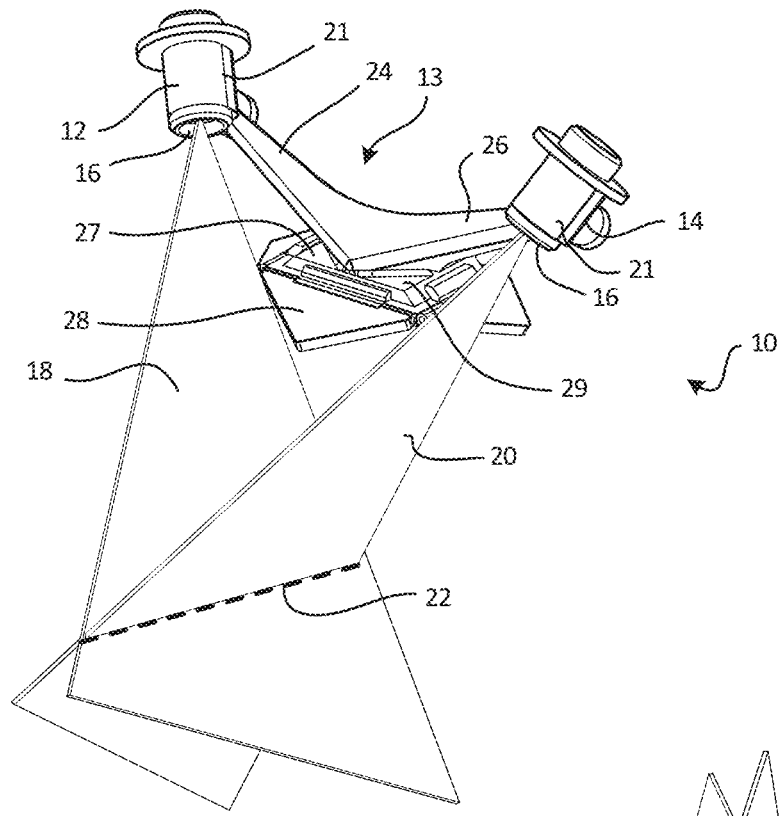
FIG. 1 is a perspective view illustrating a targeting system including a baseplate, according to an embodiment of the present disclosure.

Referring to FIG. 1, a perspective view illustrates a targeting system, or system 10, according to one exemplary embodiment. The system 10 may also be referred to as an image guided laser targeting system, a targeting system, a laser guide, and/or a guided targeting system. As embodied in FIG. 1, the system 10 may be designed to be registered directly on a patient, as will be described subsequently. The system 10 may be well-adapted for cranial procedures such as the installation of external ventricular drains (EVD's) or the like and may be used to project a targeting line along the trajectory a surgical instrument is to follow in order to properly perform the procedure.

As illustrated in FIG. 1, the system 10 includes a first light source in the form of a first laser 12 and a second light source in the form of a second laser 14. In various embodiments, a wide variety of light sources may be used, including but not limited to lasers, light-emitting diodes (LED's), ~ incandescent lights, fluorescent lights, and the like. Coherent light sources and/or incoherent light E sources may also be used. Lasers may advantageously emit coherent light that can provide distinct and easily visible luminance, but in other embodiments, other types of light sources may be used.

The first laser 12 and the second laser 14 may each be designed to emit light along a plane. This may be accomplished, for example, by covering the emitting end of the laser with a slotted cover that permits light to exit via the slot and/or by aligning the laser light source with an optical lens that provides planar light output. Thus, the first laser 12 may emit first light along a first plane, and the second laser 14 may emit second light along a second plane, which may be nonparallel to the first plane.

The first laser 12 and the second laser 14 may be attached to a fixture that keeps the first laser 12 and the second laser 14 in fixed locations relative to each other and to the patient. In the system 10 of FIG. 1, the fixture may take the form of a base component 13 to which the first laser 12 and the second laser 14 are attached at a fixed relative distance from one another. The base component may be designed to register directly on an anatomical feature of the patient, such as the cranium.

In the system 10, the distance between the first laser 12 and the second laser 14 may be fixed. However, in alternative embodiments, the light sources can be movable relative to each other. The positions of the light sources may be accurately measured for use in calculations to accurately project a targeting line along a desired trajectory for visualization. The distance between the first laser 12 and the second laser 14 may be optimized based on the proximity of the desired instrument trajectory to the system 10. In at least one embodiment, the accuracy of the trajectory visualization may be improved by positioning the first laser 12 and the second laser 14 coplanar with a midpoint of the trajectory in an approximately equilateral triangular arrangement.

For example, in a neurosurgical setting, the base component 13 of the system 10 may be attached to a patient's forehead with the targeting area covering the convexity of the cranium. This arrangement may provide an accurate targeting range of approximately 10 cm for the insertion of an External Ventricular Drain (EVD), a dimension which may correspond to the distance between the first laser 12 and the second laser 14.

The first laser 12 and the second laser 14 may each include a lens 16 that is at least partially encapsulated by a casing 21. The lens 16 and/or the casing 21 may be cylindrical. The lens 16 may allow for the generation of first light 18 that originates from the first laser 12 and second light 20 that originates from the second laser 14. As shown, the first light 18 may be emitted along a first plane, and the second light may be emitted along a second plane nonparallel to the first plane.

The first laser 12 and the second laser 14 may be designed such that the first light 18 and the second light 20 are both predominantly composed of frequencies within the visible portion of the electromagnetic spectrum. The second light 20 may have a frequency different from that of the first light 18 and may thus have a color different from that of the first light 18. For example, the first light 18 may be red and the second light 20 may be green. In the rest of this specification, references to red and green lasers are to be interpreted as the first and second lasers, respectively, and are not an indication that red and green lasers are the only colors contemplated by the present disclosure. In other examples, the second laser 14 may be movably mounted relative to the first laser 12 so that the position of the second laser 14 may be adjusted relative to that of the first laser 12. The lens 16 of the first laser 12 and/or the second laser 14 may be a Gaussian lens. Additionally, or alternatively, the system 10 may include one or more additional lasers, which may have various lens types, emission frequencies, and/or other parameters.

The first light 18 and the second light 20 may each originate from a laser source within the corresponding one of the first laser 12 and the second laser 14. These laser sources may be, for example, a red laser diode (not shown) in the first laser 12 and a green laser diode (not shown) in the second laser 14. Laser diodes may provide compact size and favorable energy consumption, although other laser sources may be substituted for laser diodes. The red laser diode may emit electromagnetic radiation of approximately 650 nm. The green laser diode may emit electromagnetic radiation of approximately 530 nm. The first laser 12 and the second laser 14 may be positioned such that when the first light 18 and the second light 20 are emitted, they intersect to produce a targeting line 22, which in this example may be perceived by the human eye as a yellow color due to the additive property of light. The additive color produced by adding the colors of the first laser 12 and the second laser 14 may add an additional element of distinctive visualization of the target trajectory. The additive color can vary depending on the colors of light emitted by the first laser 12 and the second laser 14. In other embodiments, one or more lasers that emit light of different wavelengths (for example, a laser that emits blue light with a wavelength of 450 nm) may be used in place of or in addition to the first laser 12 and/or the second laser 14.

The first laser 12 and the second laser 14 may be attached to the base component 13 in such a way that each has at least two degrees of rotational freedom about axes of rotation that are orthogonal to each other. For example, the first laser 12 and the second laser 14 may each be rotatable such that a relative geometrical relationship between the first laser 12 and the second laser 14 exists so that a third axis orthogonal to the first and second rotational axes remains fixed in rotation. The movement of the first laser 12 and the second laser 14 may be in the "yaw" and "roll" directions while having a fixed "pitch." In other embodiments, the first laser 12 and the second laser 14 may be fixed in rotation about the yaw direction or the roll direction, while rotation is possible about the other two directions. A translational degree of freedom may additionally or alternatively be incorporated if the distance between the lasers is adjustable.

To accurately calculate the "roll" and "yaw" of the first laser 12 and the second laser 14, the trajectory is transformed into the local coordinate system of each of the first laser 12 and the second laser 14 with the laser's center of rotation occupying the origin. The distance between the lasers is known. A plane originating from the center of the first laser 12 (the red laser) and coincident with the trajectory may be the ideal path of the first light 18. The angle of the corresponding first plane with respect to the origin may be used to calculate the roll and yaw angles. The same procedure may be carried out for the second laser 14 (the green laser). Two planes coincident with the same line may intersect at that line (since two planes in 3-D space intersect to form a unique line). As such, the two unique sets of roll and yaw angles are sufficient to determine a unique targeting line that defines a trajectory in three-dimensional space based on the intersection of the first light 18 emitted by the first laser 12 with the second light 20 emitted by the second laser 14.

Figure 2:
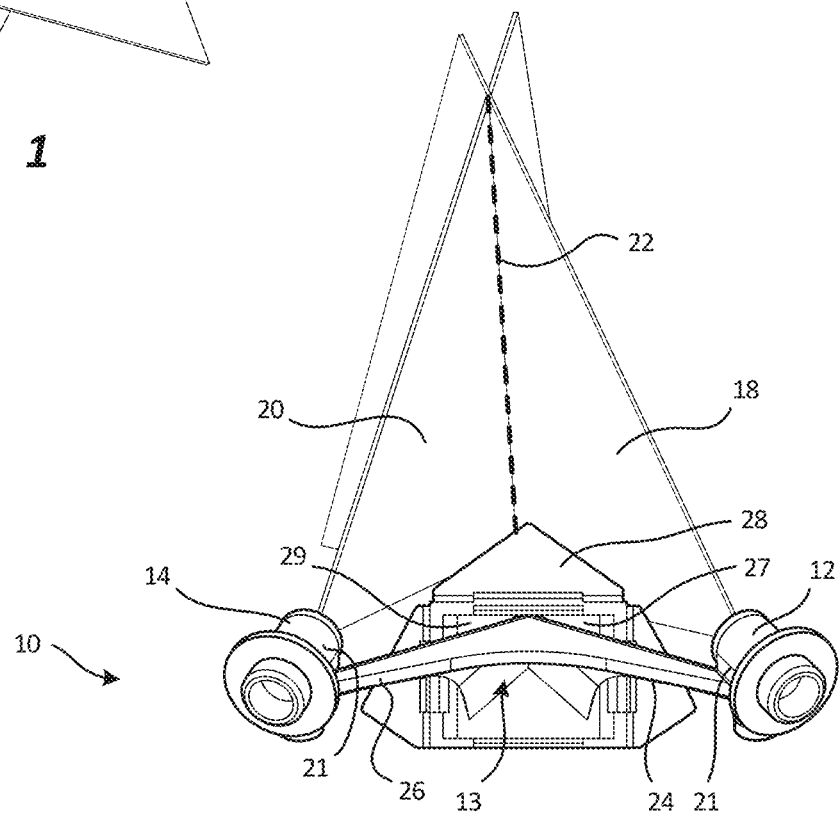
FIG. 2 is an alternative perspective view of the targeting system of FIG. 1.

Referring to FIG. 2, an alternative perspective view illustrates the system 10 of FIG. 1 with the base component 13 more easily visualized. As shown, the base component 13 may have a first arm 24, a second arm 26, a base platform 27, and a baseplate 28. The first laser 12 may be attached to the first arm 24 of the base component 13, and the second laser 14 may be attached to the second arm 26 of the base component 13. The first arm 24 and the second arm 26 may intersect at or near a top surface 29 of the base platform 27. The base platform 27 may be attachable to the baseplate 28, which may be secured to a desired anatomical feature during use.

As embodied in FIG. 2, the baseplate 28 may be a general component that serves two main purposes. First, the baseplate 28 may provide a visual reference to allow accurate image registration. Second, the baseplate 28 may provide an interface to attach the system 10 to the patient. In alternative embodiments, baseplates may perform one or both of these functions with a configuration different from that illustrated in FIG. 2. Alterations or permutations in baseplate features may be made to adapt the system 10 to particular local anatomy or features, depending on the specific application the system 10 is to be used for.

The baseplate 28 may include a bottom surface (not shown in FIG. 2) opposite the top surface 29 that is shaped to interface with a top portion 31 (FIG. 3A) of the baseplate 28. The base platform 27 may include grooves, holes, channels, posts and/or other features that are shaped to engage complementary features on the top portion 31 of the baseplate 28 to secure the base platform 27 to the baseplate 28. The baseplate 28 may include a bottom portion 33 (FIG. 3B) opposite the top portion 31 that is shaped to interface with the desired anatomical part or feature for which trajectory visualization is performed. The bottom portion 33 may include an adhesive material or connection features, such as pins, screws, hook and loop fastener, or other protruding and/or recessed features that allow the system 10 to be substantially secured to the appropriate anatomical feature during the procedure.

Figure 3A:
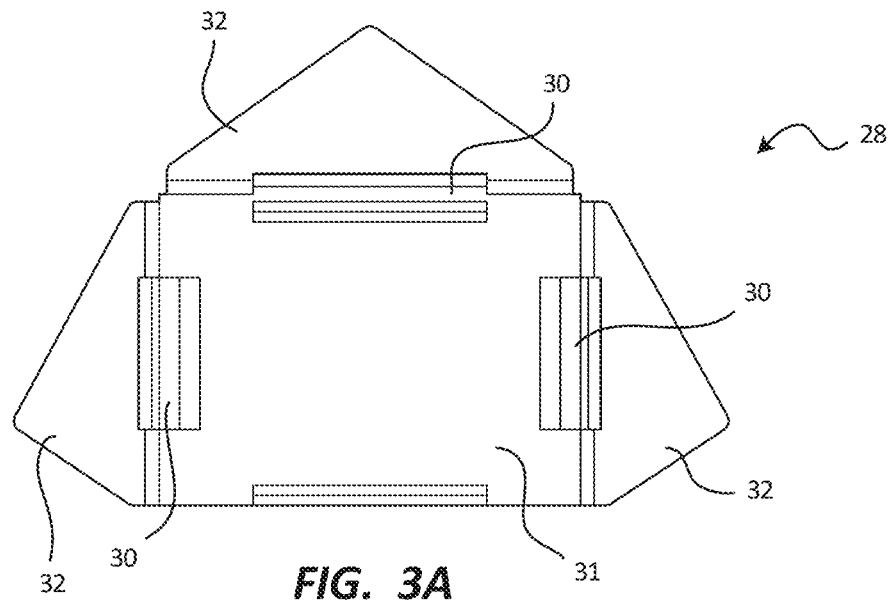
FIGS. 3A-3C are plan, front elevation, and perspective views, respectively, of the baseplate of the targeting system of FIG. 1.
Figure 3B:
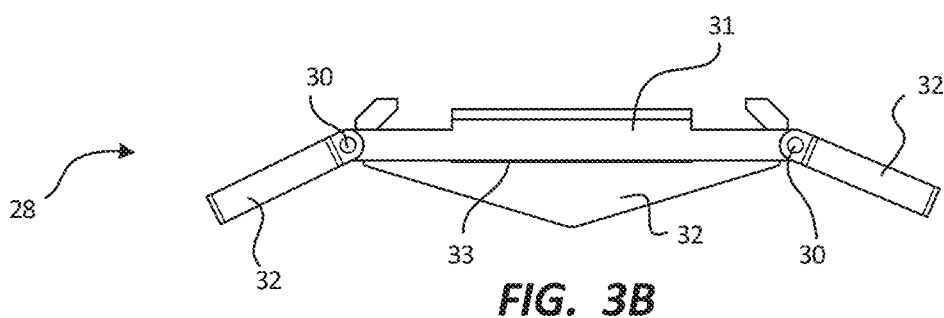
Figure 3C:
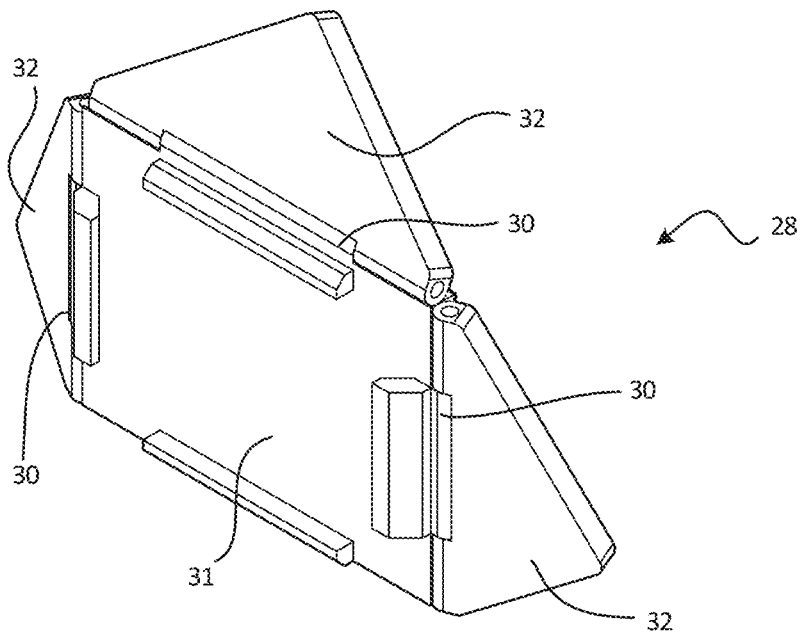

Referring to FIGS. 3A-3C, plan, front elevation, and perspective views, respectively, illustrate the baseplate 28 of the system 10 of FIG. 1. As shown, the baseplate 28 may be substantially flat, and may include one or more hinges, each of which may define an outside edge portion 32 in the shape of a fin. In alternative examples, the baseplate 28 may be curved or angled, in addition to or in place of the presence of hinges. Each hinge 30 may allow the corresponding one of the outside edge portions 32 to rotate about the hinge 30 to enable the baseplate 28 to conform to a complex surface topography. In the example illustrated in FIGS. 3A-3C, the baseplate 28 may include three hinges such that three outside edge portions 32 may rotate about each associated hinge.

Figure 4A:
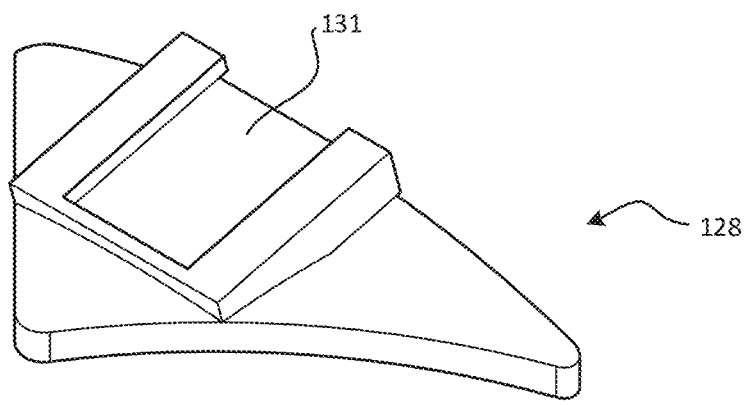
FIGS. 4A-4C are perspective, front elevation, and plan views, respectively, of a baseplate of a targeting system, according to an alternative embodiment of the present disclosure.
Figure 4B:
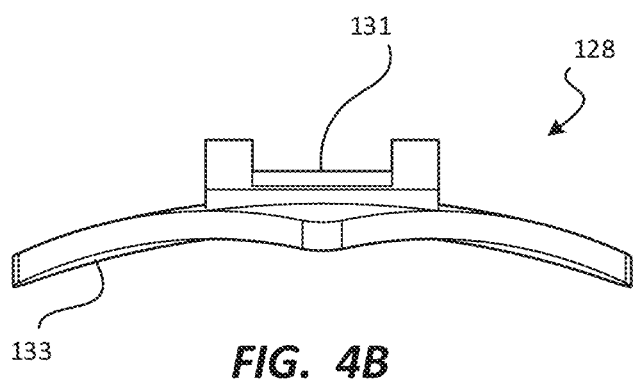
Figure 4C:
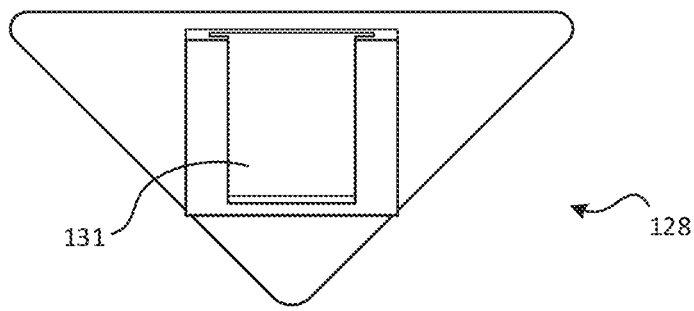

Referring to FIGS. 4A-4C, perspective, front elevation, and plan views, respectively, illustrate a baseplate 128 of a targeting system according to one alternative embodiment, with a predefined curvature and hinges or no movable fins. The baseplate 128 may have a bottom portion 133, which may have a predefined curvature to conform to a contoured anatomical surface. As shown in FIGS. 4A-4C, this curvature may be concave so that the baseplate 128 can conform to a convex surface such as a cranial surface. The baseplate 128 may also have a top portion 131 with a receptacle that mates with a corresponding feature (not shown) coupled to the first and second light sources (not shown).

Figure 5A:
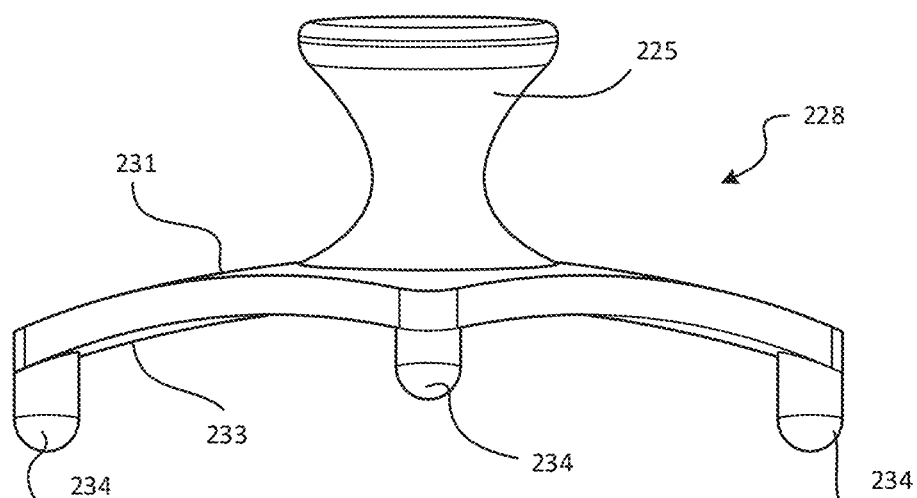
FIGS. 5A-5B are front elevation and perspective views, respectively, of a template for attaching a plurality of points or markers to a patient.
Figure 5B:
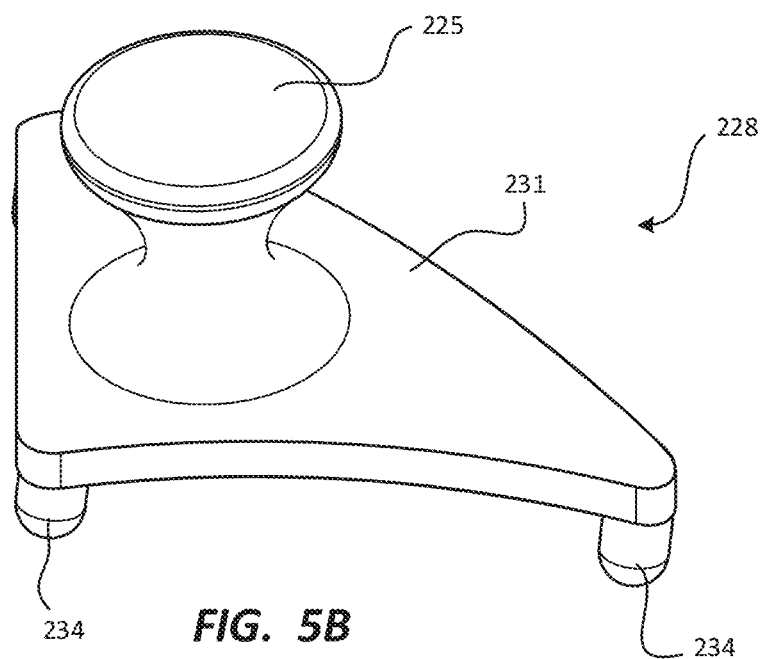

Referring to FIGS. 5A-5B, front elevation and perspective views, respectively, illustrate a template for attaching a plurality of points or markers to the patient to serve as a visual reference for attachment of a targeting system, such as that of FIG. 1, to the patient. As illustrated in FIGS. 5A-5B, the template may include a baseplate 228 with plurality of posts 234 that protrude from the bottom portion 233. These posts 234 may be designed to engage registration markers or fiducials which are commonly used by various image guidance systems. Such fiducials may be held in place on the anatomical feature to which the targeting system (such as the system 10 of FIG. 1) is to be attached by the posts 234. Additionally, the baseplate 228 may include a handle 225 extending form the top portion 231 of the baseplate 228. In some cases, the posts 234 themselves may act as registration markers. In operation, the fiducials (or the posts 234) may be visualized using imaging modalities such as CT scanning or MRI scanning. The posts 234 may be attached to or embedded within the baseplate 228 with a predefined geometry and may be used in operation to calculate a reference point through the process of registration.

In the event that visual references different from the posts 234 are used, the visual references may be placed onto tissue in a pre-defined geometry using a baseplate 228. These visual references may be incorporated into the baseplate 228 and may thus include elements such as radio-opaque materials, MRI contrast enhancing materials (e.g., copper sulfate), and the like. These visual references may also be external to the baseplate 228 and/or connected to the baseplate 228. The visual references may be attached to soft tissue such as skin via an adhesive backing or the like, or they may be secured directly to bone via screws and/or other fasteners. In general, attachment of the baseplate 228 to the patient may involve any combination of methods to form a solid connection. This includes but is not limited to, adhesives, hook and loop fasteners such as Velcro™, and other fasteners including but not limited to clamps, spring-loaded grips, screws, and pins. The manner in which attachment is accomplished may depend on the surgical application, the anatomical location, the type of visualization needed, and the surface properties at the anatomical location (e.g., soft tissue thickness, bone quality, and the like).

In one example of a method of use of a system 10 as in FIGS. 1-3C, and a template or baseplate 228 as in FIGS. 5A-5B, an operator may place visual references at an anatomical region of interest. If attached to the skin, the visual references may be attached to areas of the body with bony prominence and/or minimal soft tissue in order to minimize distortion and shift. Cross-sectional imaging such as CT scanning or MRI scanning may then be performed to visualize these unique markers and generate a reference coordinate system. For example, for cranial navigation, a location with minimal soft tissue may advantageously minimize skin shift. Thus, the visual references may be attached to the forehead in this example. For orthopedic applications, the iliac crest and the anterior tibia are examples of anatomical locations with minimal soft tissue coverage.

After imaging has been carried out, the desired trajectory may be established by utilizing to the image(s) that were obtained. This trajectory may be used, through the use of known geometrical transformations, to determine the required orientations of the first laser 12 and the second laser 14. The first laser 12 and the second laser 14 may be oriented at the necessary orientations and activated to project the first light 18 and the second light 20 to create and project the targeting line 22. The targeting line 22 may advantageously be projected on a surgical instrument or a visualization aid, as will be shown and described in greater detail subsequently.

The orientations of the first laser 12 and the second laser 14 may be configured automatically and/or manually. If desired, a targeting system may include a mechanism by which the user may read and/or adjust the orientations of the first laser 12 and the second laser 14 manually.

Figure 6A:
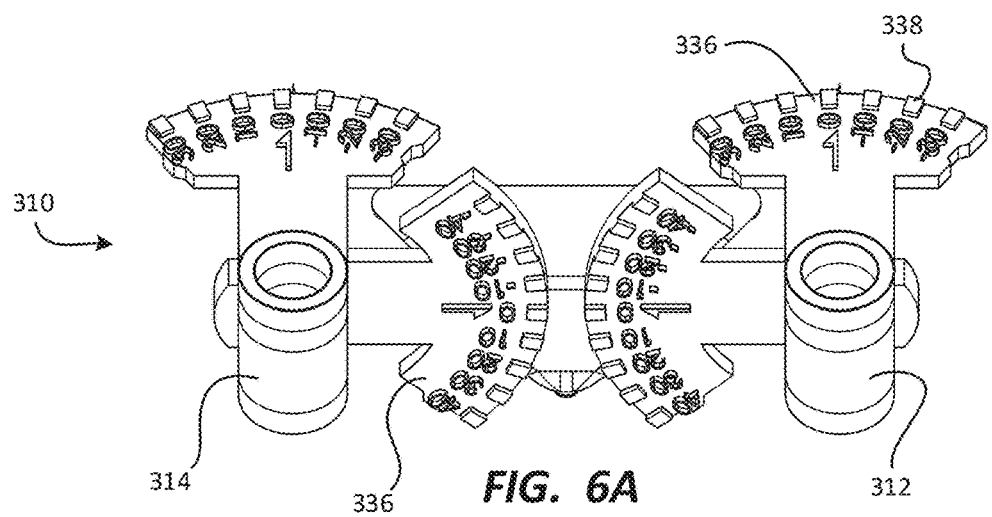
FIGS. 6A-6C are plan, front elevation, and perspective views, respectively, of a targeting system according to another embodiment of the present disclosure.
Figure 6B:
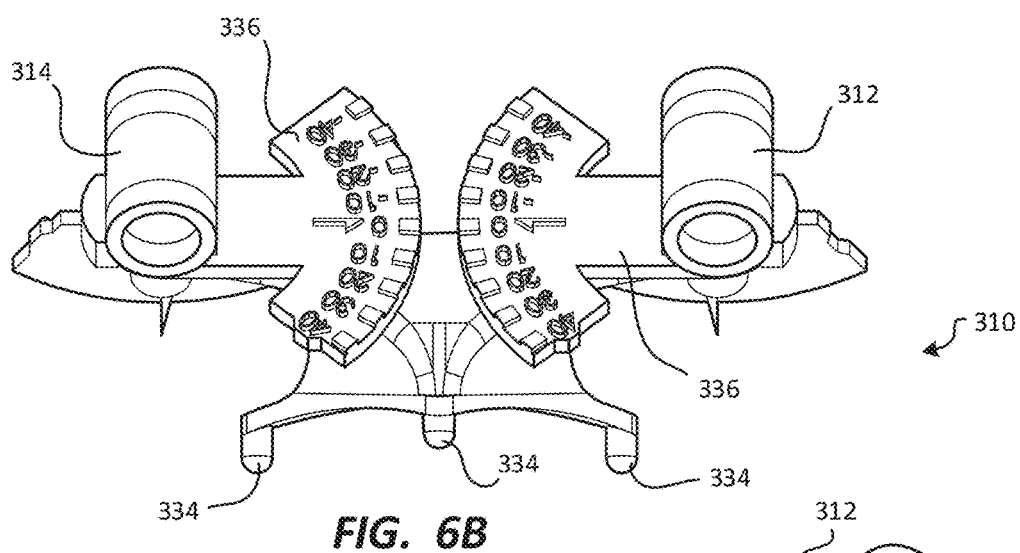
Figure 6C:
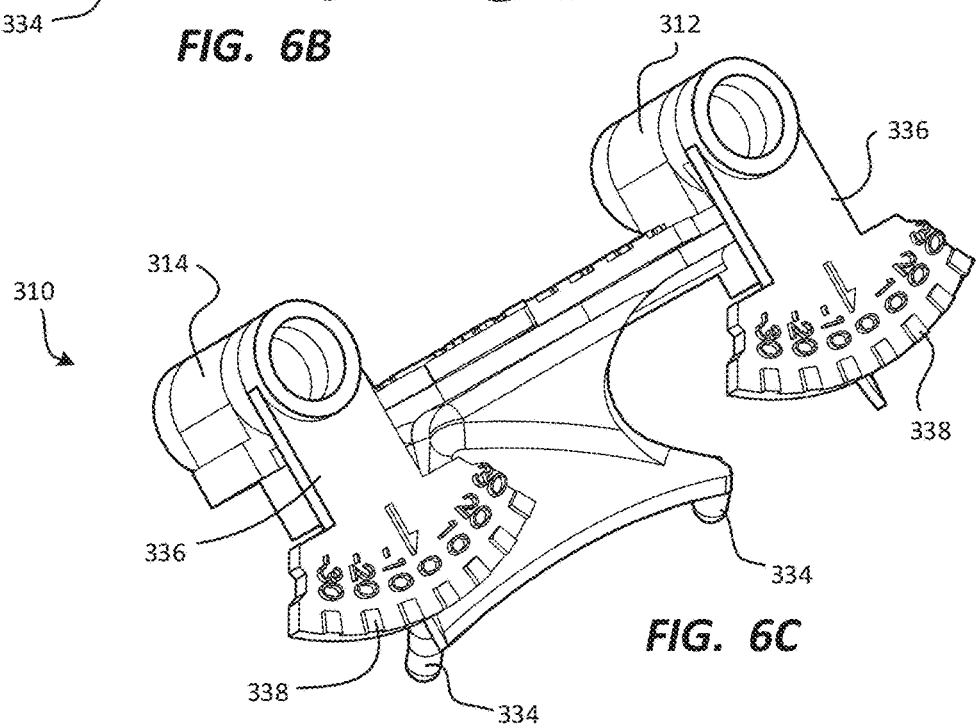
Figure 7A:
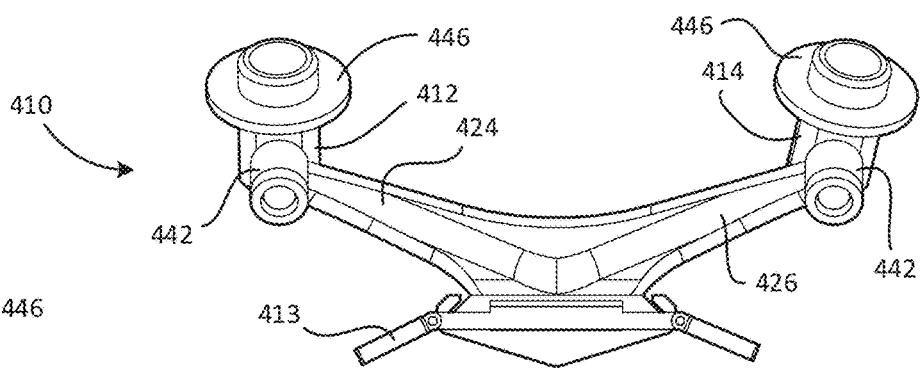
FIGS. 7A-7D are front elevation, perspective, plan, and side elevation views, respectively, of a targeting system according to yet another embodiment of the present disclosure.
Figure 7B:
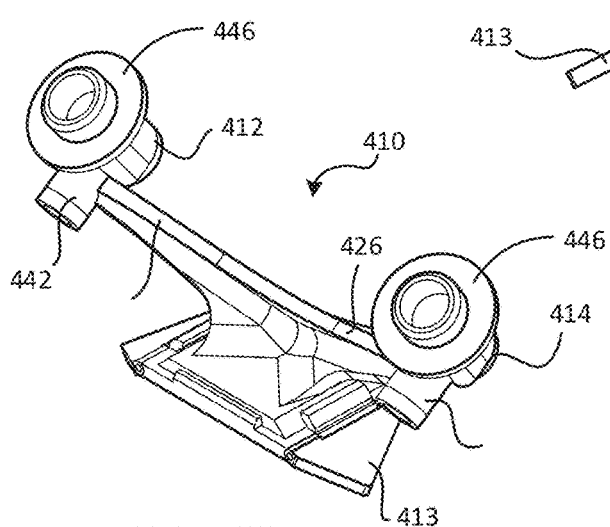
Figure 7C:
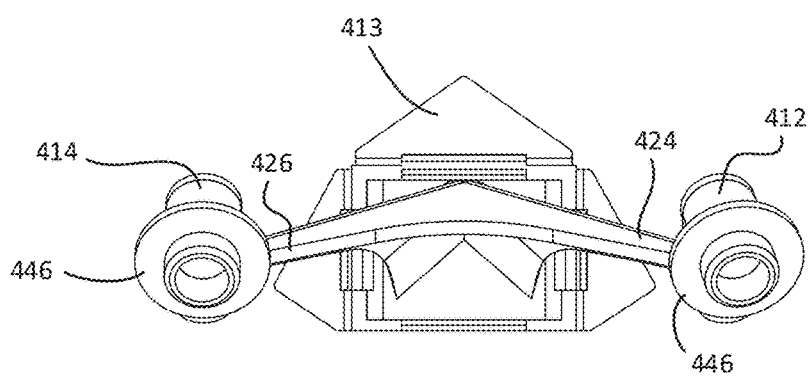
Figure 7D:
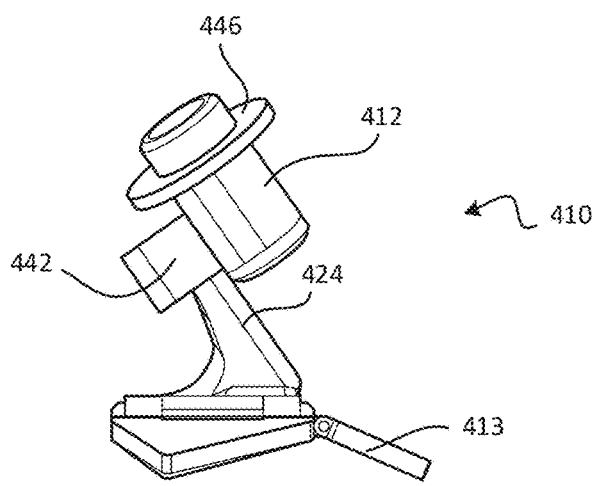

Referring to FIGS. 6A-6C, plan, front elevation, and perspective views, respectively, illustrate a targeting system, or system 310, according to another embodiment. The system 310 may have a first laser 312 and a second laser 314 and may provide for manual adjustment of the orientations of the first laser 312 and the second laser 314. Additionally, the system 310 may have feet that mate with a plurality of visual references (not shown) on the patient. Such visual references may be attached, for example, through the aid of a baseplate 228 such as that of FIGS. 5A-5B, as set forth above. The feet may take the form of posts 334, which may register in such visual references or other registration attachments.

In one example, as illustrated in FIGS. 6A-6C, the system 310 may also include angle indicators 336, which may take the form of precision-machined discs. The first laser 312 and the second laser 314 may each be rotatable in the "roll" and "yaw" directions and may be fixed in the "pitch" direction. Thus, the angle indicators 336 may also be referred to as "roll" and "yaw" angle indicators. The angle indicators 336 may have pre-determined radii with markings 338 etched, embedded, or otherwise provided to indicate the magnitude of the angle. The roll angle and/or the yaw angle of each of the first laser 312 and the second laser 314 may be adjusted to the desired number mechanically by rotating the first laser 312 and the second laser 314 around the roll axis and/or the yaw axis. Once a desired angle has been obtained, a locking mechanism such as setscrews or locking screws may be engaged to lock the system 310 into the desired configuration.

Referring to FIGS. 7A-7D, front elevation, perspective, plan, and side elevation views, respectively, illustrate a targeting system, or system 410, according to yet another embodiment. The system 410 may have electronic angle readout and automated (motorized) laser angle adjustment in combination with a first arm 424, second arm 426, and base component 413 similar to that of FIGS. 3A-3C.

In the system 410 of FIGS. 7A-7D, rotary encoders 442 may be used to couple a first laser 412 and a second laser 414 to the first arm 424 and the second arm 426, respectively. The rotary encoders 442 may provide digital read-outs of the angle measurements (i.e., orientations) of the first laser 412 and the second laser 414. In this example, the first laser 412 and the second laser 414 may be connected to a controller (not shown in FIGS. 7A-7D), which may have a signal processing unit. Such a controller may be a dedicated module, a computer, a smartphone, a tablet, or the like. The controller may provide power to the first laser 412, the second laser 414, and the rotary encoders 442 and may also receive the orientation output from the rotary encoders 442. In this application, the term "controller" does not require that a device issue operational commands to other components; rather, a controller may be any type of electrical device that interfaces with one or more other components of a targeting system.

Such a controller may additionally or alternatively control the orientation of the first laser 412 and the second laser 414 by transmitting signals to motors that rotate the first laser 412 and the second laser 414 to the desired orientation. In some embodiments, the controller may be connected to a first set of motors that controls the orientation of the first laser 412, and a second set of motors that controls the orientation of the second laser 414. Such motors will be shown and described subsequently, and may include servo motors, stepper motors, and the like. Such motors may be coupled directly to the first laser 412 and the second laser 414 or may be connected to them via gears or other torque-transmitting mechanisms. Alternatively, the controller may be connected to one or more mirrors or prisms (including MEM's micro-mirrors) that controls the orientation of the beam of light from the first laser 412, and one or more mirrors or prisms (including MEM's micro-mirrors) that controls the orientation of the beam of light from the second laser 414. In the case of motorized lasers, the desired angle may be digitally entered or controlled by a software program (for example, a program or app that runs on the controller), and the motors may drive the rotation of the laser units in the roll, pitch, and/or yaw directions. Another embodiment may integrate a motorized unit into the lens 16 of the first laser 412 and the second laser 414 to perform micro adjustments directly to the lens 16. This may be done in place of, or in addition to, mechanical roll, pitch, and/or yaw orientation adjustments of the first laser 412 and the second laser 414 and/or adjustments of the laser beams due to mirrors, prisms, or MEM's micro-mirrors. In alternative embodiments, a user may manually set the orientations of the first laser 412 and the second laser 414, as described previously.

In yet another example, the system 410 may include a built-in power source such as a battery. The system 410 may also have a wireless communication interface that wirelessly transmits the angle readings from the rotary encoders 446 to a controller or other electronic device in order to display them to the user. Automated control of the orientations of the first laser 412 and the second laser 414 may also be accomplished wirelessly. Any known wireless protocol may be used for communications between the first laser 412, the second laser 414, and the controller.

Targeting systems according to the present disclosure may be attached to other structures besides those of the patient's anatomy. Any stable structure may provide a suitable anchoring point for a fixture of a targeting system. It may be particularly advantageous to secure a targeting system to a medical imaging device. This may facilitate integration of such targeting systems with medical imaging because the locations of the light sources, relative to the imaging device, may remain constant. This may remove the need for visual references to be used in imaging, even for medical imaging systems with movable components such as C-arm X-ray machines.

Figure 8:
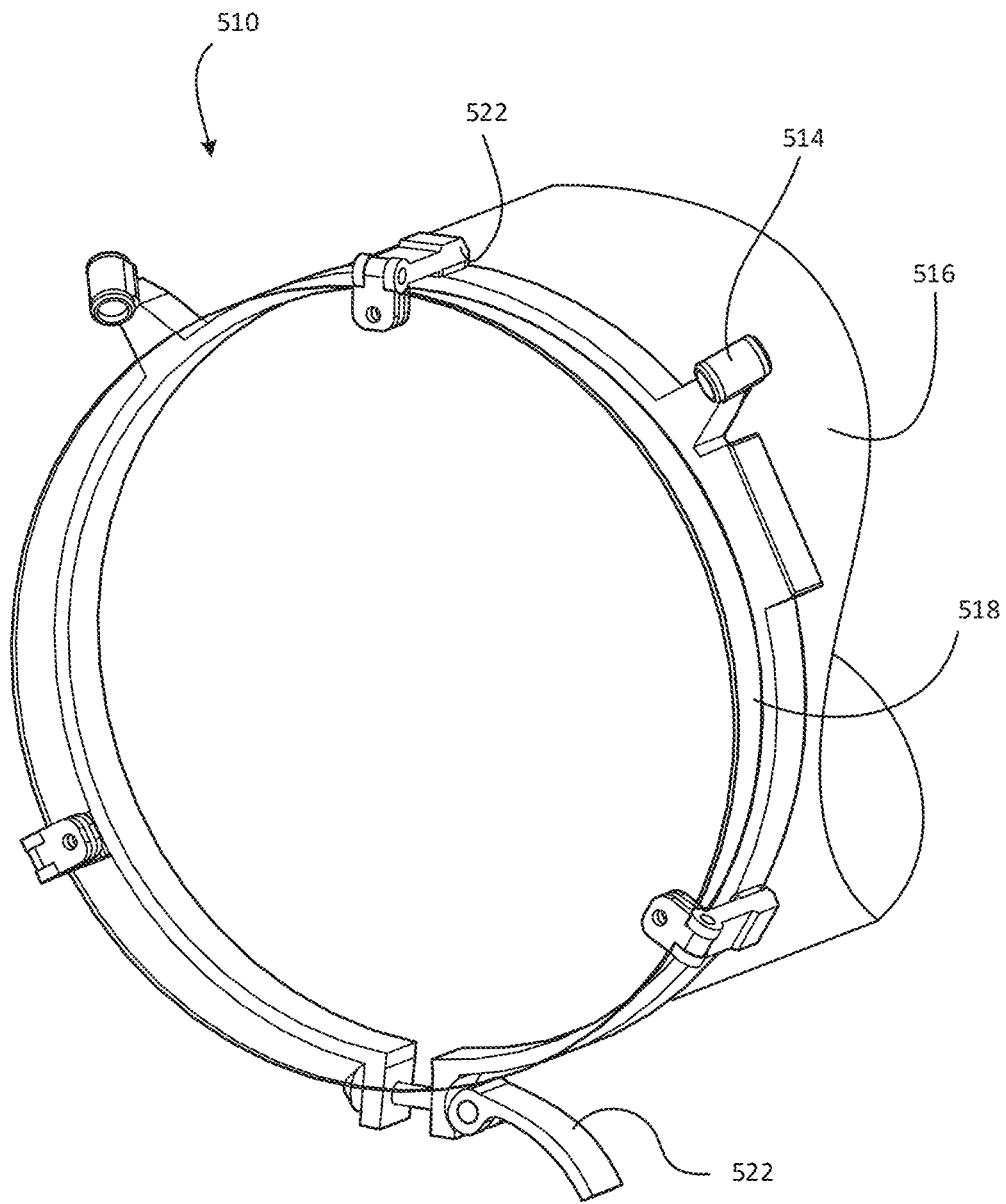
FIG. 8 is a perspective view of a targeting system for planar imaging modalities with attachment directly to a medical imaging device.

Referring to FIG. 8, a perspective view illustrates a targeting system, or system 510, according to yet another embodiment. The system 510 may be usable for planar imaging modalities with attachment directly to a medical imaging device. For example, the system 510 may be attached to an image intensifier 516 on a fluoroscopy unit. The fluoroscopy unit is used here to facilitate understanding of the concept and should be understood as a specific embodiment of any general imaging device that takes projections of its subjects from a plurality of angles. The system 510 may readily be adapted for use with other imaging devices such as flat panel charge coupled devices (CCD's).

Figure 9A:
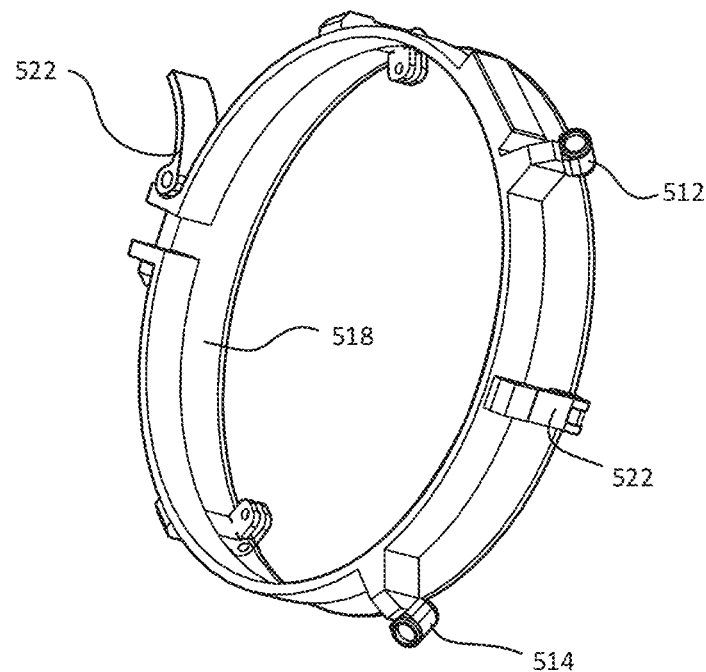
FIGS. 9A-9B are perspective and plan views, respectively, of the targeting system of FIG. 8.
Figure 9B:
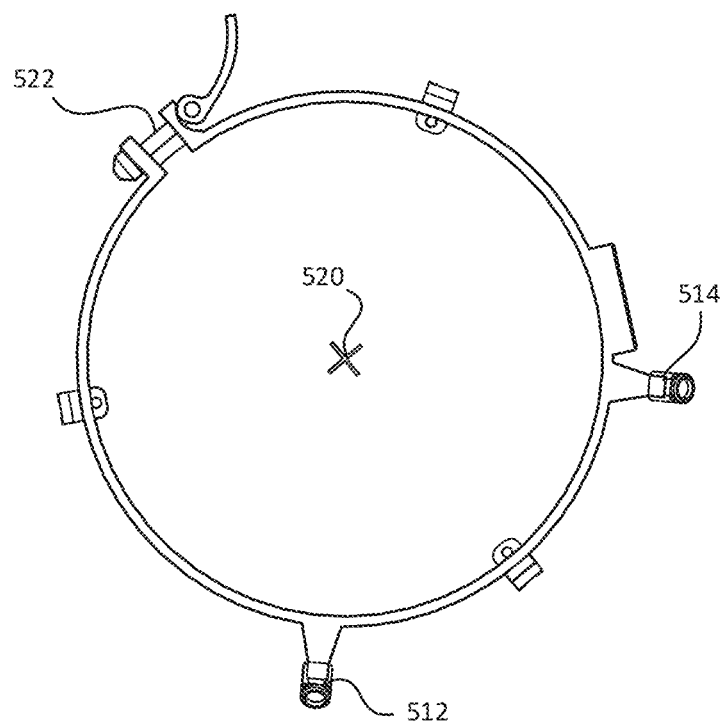

Referring to FIGS. 9A-9B, perspective and plan views, respectively, illustrate the system 510 of FIG. 8. As shown, the system 510 may include a first laser 512 and a second laser 514, both of which may be mounted to the image intensifier 516 via a fixture. In the system 510, the fixture may take the form of a ring 518, which may be concentric with the image intensifier 516 and secured to the image intensifier 516 via locking mechanisms such as screws, snaps, adhesives, or a quick-release mechanism 522. In known medical imaging devices, the image intensifier 516 may be expected to range from 9-11 inches in diameter; however, the image intensifier 516, and therefore the ring 518, may be larger or smaller than this. The ring 518 may extend about the entire circumference of the image intensifier 516 or may be a split ring or other structure that extends around a portion of the circumference of the image intensifier 516.

The first laser 512 and the second laser 514 may be attached to the ring 518, and the orientations of the first laser 512 and the second laser 514, relative to the ring 518, may be manually and/or electronically adjustable, as described in connection with the exemplary embodiments of FIGS. 6 and 7. In addition, the distance between first laser 512 and the second laser 514 along the ring 518 may be adjustable, as long as an accurate measurement of such distance can be obtained and accounted for in the angle calculation algorithm.

The system 510 may also include additional light sources, which may be additional lasers. Whether two or more lasers are used, the lasers may be mounted around the image intensifier 516 in such a way that the intersection of the light emitted by the lasers produces the targeting line. The targeting line may be coincident with the central axis of the imaging device but is not limited to this configuration. The first laser 512 and the second laser 514 may be used to visualize the planned trajectory via projection of the targeting line, and a third laser at oblique angles to the first two lasers may be used to further specify an angle of rotation about the targeting line, a depth of insertion of a surgical instrument along the visualized trajectory, or the like. A third laser may also be used in combination with the first laser 512 or the second laser 514 to produce a second targeting line coplanar with the first targeting line. The second targeting line may be positioned to intersect the first targeting line to specify a single point in three-dimensional space. If a fourth laser is added, then two separate (not necessarily coplanar) targeting lines may be produced simultaneously. The latter example can also be used to specify the angle of rotation around a first targeting line, and depth of insertion along the first targeting line, simultaneously. A marker 520, which may be radio-opaque, may optionally be centered over the image intensifier 516 and secured to the ring 518. This marker 520 may help to identify the center of the image intensifier 516 and may be aligned with the axis of the X-ray tube.

The light sources may be either fixed in place relative to the image intensifier 516, or movable relative to the image intensifier 516. Fixed lasers, based on the example derived from the system 510, may be placed 90 degrees apart from each other to increase accuracy. Movable lasers may also be used with C-arm based CT scanners. These systems may rely on the principle of cone-beam CT scanning and may swing the C-arm through 180 degrees to obtain an accurate three-dimensional dataset. Some C-arm based CT scanners are portable and some are fixed to the room they are installed in. The laser guidance system can be attached to part of the C-arm (e.g., flat panel detector, image intensifier, X-ray tube, or the arm itself). The 3-D dataset can be used to plan the trajectory. Based on knowledge of spatial location of the C-arm and the desired trajectory, the orientations of the first laser 512 and the second laser 514 can be calculated to reproduce the desired trajectory in physical space.

Figure 10:
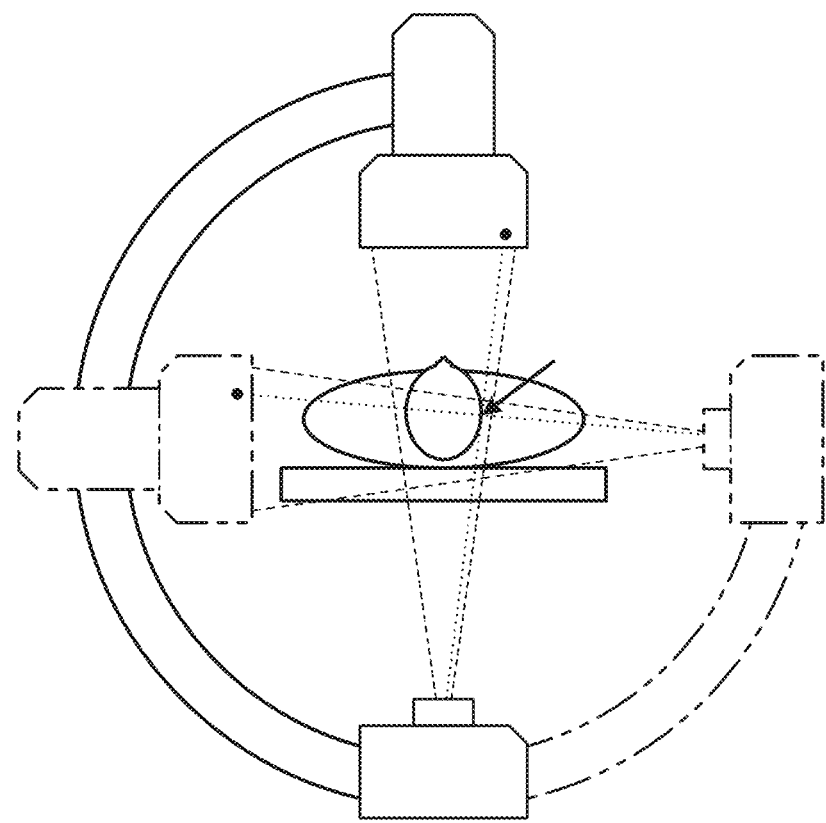
FIG. 10 is a front elevation view of an operating table, patient, and a trajectory to be visualized with a targeting system attached to a C-arm fluoroscopy unit. The C-arm fluoroscopy unit is illustrated in two orthogonal imaging positions.

Referring to FIG. 10, a front elevation view illustrates an operating table and patient with a trajectory to be visualized with a targeting system attached to an imaging device in the form of a C-arm fluoroscopy unit, illustrated in two orthogonal imaging positions. As an extension of the embodiment of the laser targeting system in the setting of planar imaging modality, methods for trajectory planning and angle calculation are developed. The imaging device in the form of a C-arm fluoroscopy unit is used for illustration purposes, but the concept can be generalized to any planar imaging modality utilizing penetrating radiation (e.g., monoplane or biplane angiography units). The solid black outline shows the imaging device taking an image at one position. The phantom outline shows the imaging device taking a second image after rotating 90 degrees. The patient is illustrated here in supine position with feet pointed into the page. The cross at the center of the image marks the idealized center of rotation of the imaging device. The two planar image projections are related to each other via the common center of rotation. Thus, during image acquisition, the imaging device may only be allowed to undergo pure rotation.

The dashed lines show the extent of radiation field captured by the image intensifier. The intersection of the two cones of radiation (triangles in FIG. 10 due to lack of 3-D perspective) marks the space (also referred to as the navigable space) that is used by the targeting system for trajectory planning and angle calculation. The solid black arrow simulates an external pointer with a tip pointing at an idealized entry site, which may represent a trajectory to be visualized. The dotted lines show the back projections of the pointer tip at each C-arm position extending from the radiation source to the image intensifier. The intersection of the two lines marks a unique point in the navigable space. Slight errors in the imaging device (structural deformation, epicyclic center of rotation, vibration, etc.) may result in the dotted lines not meeting at a point, in which case a point in the navigable space that is the shortest distance to both of the lines can be used with an error term appended.

In a similar fashion, a second point in the navigable space (for example, another point on the trajectory) can be chosen to fully define the trajectory. The trajectory may be defined with respect to the imaging device. Likewise, the orientation calculations for the first laser and the second laser may also be carried out with respect to the imaging device once proper attachment and calibration is performed for the system. In at least one embodiment, no visual reference is needed during this planar imaging modality and accuracy should not be affected as long as the patient is not moved between image acquisition and trajectory visualization.

Figure 11A:
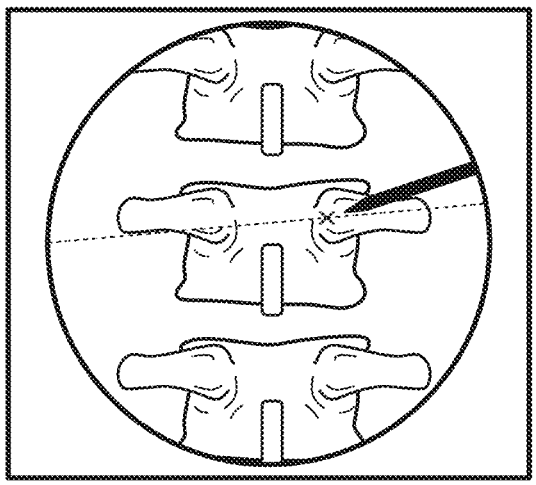
FIGS. 11A-11B are dorsal and lateral views, respectively, of a spinal procedure using a planar imaging modality that illustrate how orthogonal images can be used for trajectory planning and visualization.
Figure 11B:
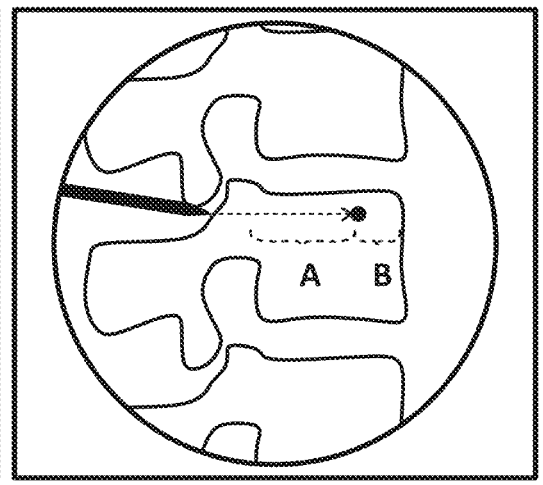

Referring to FIGS. 11A-11B, dorsal and lateral views, respectively, illustrate how orthogonal images can be used for trajectory planning and visualization with a targeting system for a spinal procedure using a planar imaging modality. FIGS. 11A and 11B illustrate the planning of a trajectory of a pedicle screw insertion. Two orthogonal images of the spinal column—dorsal and lateral—are taken and shown on the left and right screens. The black pointer rests at the ideal entry site—in this case at the lateral posterior margin of the pedicle. On the lateral projection, the ideal depth may be chosen and marked by the black dot. The dashed arrow shows the trajectory on the lateral projection. As an example, the ratio of A:B can be set to 2:1 to prevent anterior breach of the vertebral body. The dot may be back projected on the dorsal view as a dotted line.

To fix the target point, the user may choose the ideal target on the dorsal view, which is shown here as the medial edge of the pedicle (the X). This may be done to prevent medial breach of the pedicle. With entry and target points defined, the targeting system (such as the system 510 described previously) now has enough information to calculate the orientations of the first laser 512 and the second laser 514 needed to project a targeting line indicative of the desired trajectory. The imaging device may be locked at a particular angle (0 degrees, 90 degrees, or any angle in between) and this measurement may be provided to the system 510 to finalize the laser orientation calculation.

Figure 12A:
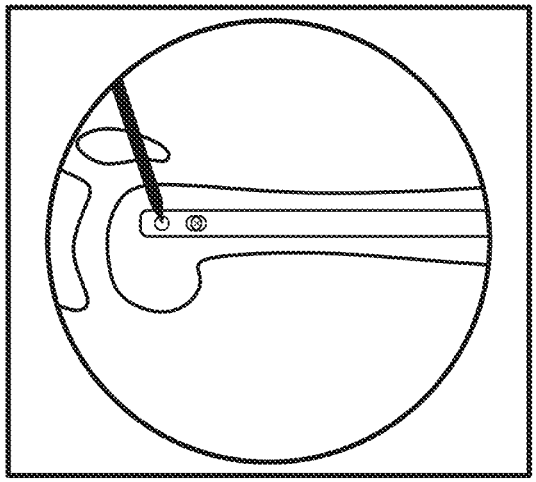
FIGS. 12A-12B are lateral and dorsal views, respectively, of an orthopedic procedure using a planar imaging modality that illustrate how orthogonal images can be used for trajectory planning and visualization in a laser targeting system.
Figure 12B:
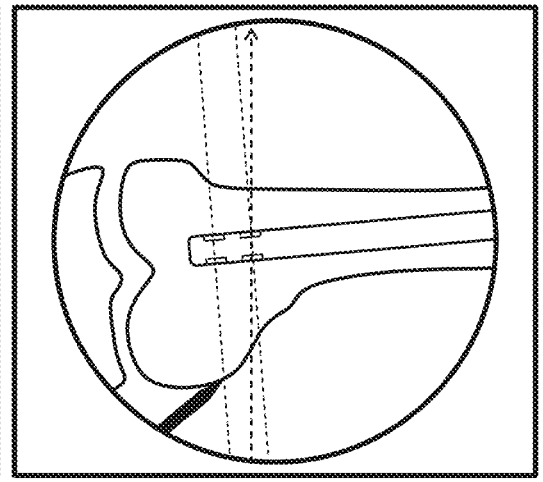

Referring to FIGS. 12A-12B, lateral and dorsal views, respectively, illustrate how orthogonal images can be used for trajectory planning and visualization with a laser targeting system for an orthopedic procedure using a planar imaging modality. FIGS. 12A-12B illustrate an orthopedic procedure involving distal locking of an intramedullary nail. Two orthogonal images may be taken. The image on the left shows an "ideal hole" next to a shifted hole as is often the case due to divergent radiation paths from the beam source. The black pointer may rest at the center of the ideal hole. The back projection through the hole, from the radiation source to the image intensifier, may provide the ideal path for the distal locking screw. This back projection can be digitally added to the image on the right, as is shown by the dashed line. The dashed line may go through the tip of the black point, and any discrepancy can be added to the error term.

Based on the available information, a trajectory may be formed, and laser angles can be calculated. However, the trajectory of the adjacent hole can also be obtained to save procedural time and reduce radiation exposure to patient and house staff. The left image may be used again, and the center of the shifted hole can be selected (e.g., via the centroid method, represented by the X). The back projection is shown on the right image as the dashed arrow. Since the holes are parallel to each other, the trajectory from the previous hole may be used. The intersection of the two trajectories (dashed arrow and dashed line) at the midline of the screw (lengthwise) on the right allows for accurate targeting of the second hole. The imaging device may be locked at a particular angle (0 degrees, 90 degrees, or any angle in between) and this measurement may be provided to the targeting system (for example, the system 510) to finalize the calculation of the orientations of the first laser 512 and the second laser 514.

Figure 13:
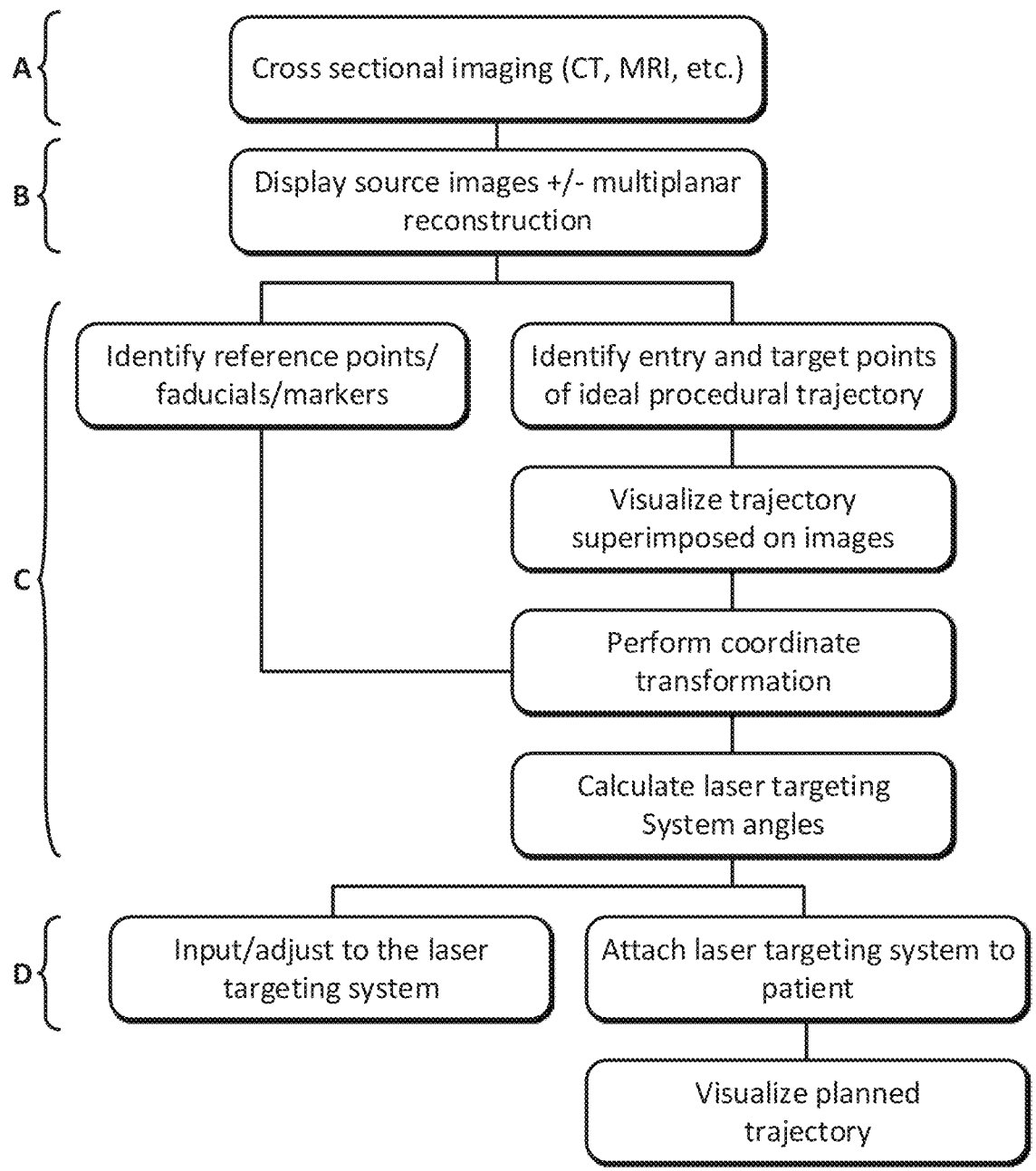
FIG. 13 is a block diagram illustrating a method of using a targeting system in a cross-sectional imaging modality with one or more visual references or reference markers attached to a patient.

Referring to FIG. 13, a block diagram illustrates one method of using a targeting system in a cross-sectional imaging modality. The method will be described in connection with the system 10 of FIGS. 1-3C but may be carried out with any targeting system within the scope of the present disclosure. The method may commence with obtaining the image with or without visual reference(s) attached to the patient (step A). The source images, as well as any multi-planar reconstructions, may be displayed. There are a number of options for this step, including but not limited to: an imaging device terminal such as a CT suite (e.g., CT suite), a diagnostic unit such as a Picture Archiving and Communication System (PACS) unit, or a computer or electronic device (e.g., a tablet) capable of displaying Digital Imaging and Communications in Medicine (DICOM) format images (step B).

A software interface may be employed by the user to perform trajectory planning and angle calculations. This can be done either on the same system as step B or on a different system capable of displaying the acquired images. The software interface may be set up to facilitate the flow of image registration (which may also be referred to as reference identification), entry/target point identification, trajectory planning/visualization, and finally laser angle calculation (step C).

One example of the software embodiment of step C may involve the identification of either visual references or baseplate markers such as the posts 234 of FIGS. 5A-5B by the software. The software may automatically calculate the transformation matrix required to perform a coordinate transformation of the image space onto the laser targeting system space. The operator may select the entry point and the target on the cross-sectional image. Multi-planer reconstruction views may be presented to facilitate identification of the most optimal entry/target points. Once the two points are selected, a line in the 3-dimensional image space may be constructed which represents the desired trajectory. This line may be transformed into the targeting space of the system 10 using the previously derived transformation matrix. The software may calculate the unique combination of orientations of the first laser 12 and the second laser 14 such that the first light 18 and the second light 20 intersect to produce the targeting line 22 in 3-D space representing the desired trajectory.

Another example of the software embodiment of step C may involve generation of a trajectory from a set of orthogonal X-ray images. For many orthopedic procedures such as hip/knee arthroplasty or trauma surgery, cross-sectional imaging, such as CT scanning, may not be routinely available. However anterior-posterior (AP) and lateral X-rays may be a routine part of the workup for many patients, and intraoperative fluoroscopy can take films in views which are 90 degrees apart. After attaching the visual reference (fiducials or baseplate), two X-rays may be taken 90 degrees apart. The end user may identify target points on both X-rays. Once this is done, a set of x, y, z values may be calculated. An additional rotational and scaling transformation may be applied to one of the films in order to generate a truly orthogonal coordinate system in the targeting space of the system 10. The ideal trajectory projections may be identified by the end user on the two films, bearing in mind that the trajectory lines identified on the two films are projections of a unique 3-D trajectory onto 2-D space. The backward projections of the two 2-D lines form two planes perpendicular to each of their reference planes and the intersection of these two planes form a unique trajectory line in 3-D space. The unique trajectory line in 3-D space may then be coordinate transformed into the targeting space of the system 10 and calculations of the laser angles can be carried out as previously discussed.

This method enables the calculation of a trajectory in 3-D space based on projections identified on two 2-D X-rays films orthogonal to each other. It does not specify the projection at any other arbitrary angle of view. For procedures that routinely use plain film X-rays for follow-up, this is adequate to meet the user's needs since views at other angles are not routinely considered. Step D represents the last step required to visualize the target trajectory.

Figure 14:
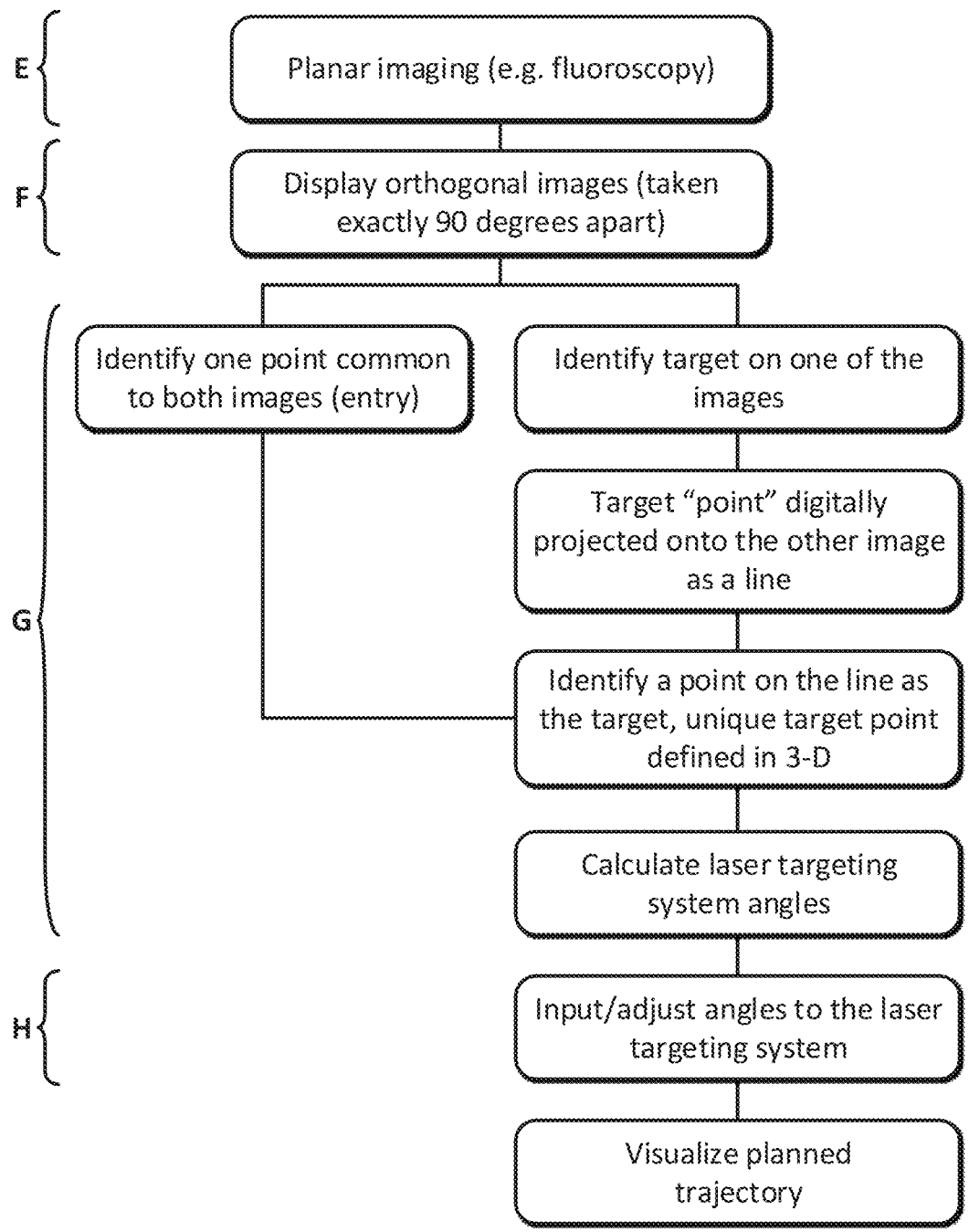
FIG. 14 is a block diagram illustrating a method of using a targeting system in penetrating planar imaging modalities with two or more images taken from orthogonal viewpoints.

Referring to FIG. 14, a block diagram illustrates one method of using a targeting system in penetrating planar imaging modalities with a minimum of two images taken from orthogonal viewpoints. A minimum of two orthogonal images of the anatomical area of interest may first be obtained as described in FIGS. 10-12 (step E).

The images may be displayed and options for display include but are not limited to the imaging device terminal (e.g., fluoroscopy screen), a diagnostic unit (e.g., PACS), a computer or electronic device (e.g., tablet) capable of displaying DICOM format images (step F).

A software interface may be used to perform trajectory planning and angle calculations. This can be done either on the same system as step F or on a different system capable of displaying the acquired images. The software interface may be setup to facilitate the flow of entry/target point identification, trajectory visualization, and finally laser angle calculation (step G). Examples of step G are provided in FIGS. 11 and 12 in accordance with their respective exemplary embodiments. Step H represents the last step for visualizing the target trajectory for the planar imaging modality. To help visualize the targeting line(s) and/or the appropriate depth of travel for a surgical instrument, a visualization guide may be used. Such a visualization guide may be used to facilitate viewing of the targeting line and/or guiding of a surgical instrument along the desired trajectory.

Figure 15:
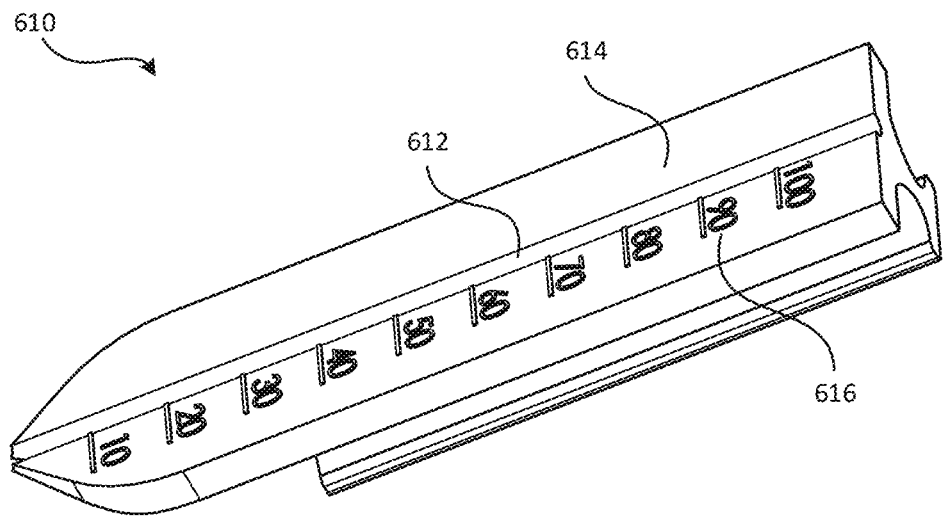
FIG. 15 is a perspective view of a visualization aid in the form of a grooved instrument guide with depth measurements.

Referring to FIG. 15, a perspective view illustrates a visualization aid 610 in the form of a grooved instrument guide with depth measurement, according to one embodiment. The visualization aid 610 will be described in conjunction with the system 10 of FIGS. 1-3C but may be used with a targeting system according to any embodiment within the scope of this disclosure, including those designed for cross-sectional imaging modalities, and those designed for planar imaging modalities.

The visualization aid 610 may further be a simple open-channel trajectory guide. The visualization aid 610 may thus have a guide surface 612 in the form of an open channel that may be used to conduct a surgical instrument, such as a needle, trocar, cannula, depth probe, implant, or the like, along the desired trajectory. The visualization aid 610 may further have a visualization surface 614 that extends on either side of the guide surface 612 with a widened shape on which the first light 18 and the second light 20, by way of example, may be projected and viewed.

The visualization surface 614 may optionally have a matted or otherwise textured surface that facilitates visualization of reflected light from a wide range of viewing angles. Further, the visualization surface 614 may optionally have depth markings 616 etched, scored, painted, or otherwise marked on the visualization surface 614 to facilitate proper insertion of the surgical instrument. The visualization surface 614 may optionally be white in color to provide for enhanced visibility of reflected light. In alternative embodiments, any color may be used. If the visualization surface 614 is colored, the color of reflected light by the visualization surface 614 may or may not match that of the light emitted by the first laser 12 or the second laser 14. The visualization surface 614 may alternatively be black to reduce glare from light interference. In such an event, the luminance provided by the first laser 12 and the second laser 14 may need to be increased to compensate for the increased light absorption of the black color. Additionally, the visualization aid 610 may be opaque, translucent, and/or transparent.

For embodiments with an opaque construction, the first light 18 and the second light 20 may reflect off of the visualization surface 614. Thus, the first light 18 may be visible on the visualization surface 614 as a first line, and the second light 20 may be visible on the visualization surface 614 as a second line with a color different from that of the first line. If the first and second lines are nonparallel, this may indicate that the visualization aid 610 needs to be reoriented. If the first and second lines are parallel, but displaced from each other, this may indicate that the visualization aid 610 needs to be translated toward or away from the first laser 12 and/or the second laser 14. As the first and second lines converge (i.e., the linear displacement and/or angular displacement between the first and second lines is reduced as needed), the targeting line 22 may become visible on the visualization surface 614 and/or the guide surface 612. Due to the additive properties of light, the targeting line 22 may have a color different form that of the first line and the second line. Thus, the convergence of the first and second lines and/or the appearance of the targeting line in the additive color may indicate that the visualization aid 610 is in the position and orientation of the desired trajectory.

For embodiments with a transparent or translucent construction, the first light 18 and the second light 20 may penetrate the body of the visualization aid 610 and, when the visualization aid 610 is aligned with the desired trajectory, this may cause the visualization aid 610 to glow in the additive color to confirm proper alignment of the visualization aid 610 with the desired trajectory. Thus, the visualization aid 610 may improve the visualization of the first light 18, the second light 20, and the targeting line 22, thereby easing the process of aligning a surgical instrument with the desired trajectory.

In addition, the guide surface 612 may also help to guide the insertion of devices. The depth markings 616 may allow the visualization of depth information during the insertion process. The visualization aid 610 may additionally or alternatively include features such as an enclosed tube, rail, channel, or other mechanical fitting that interacts with implants and/or surgical instruments to align those implants and/or surgical instruments with the desired trajectory.

In processes in which sterility is not of a critical importance, a device capable of atomizing water droplets, saline solutions, ringer's lactate, tissue, or other suspended particulates in the air or fogs or fog-like states may be used. An ultrasonic transducer (not shown) submerged in sterile water or saline can create a cloud and a fan located above the ultrasonic transducer device can move the small water droplet across specially designed channels and ducts. This may create laminar airflow with a uniform volume of droplets to reflect the laser light. Such procedures may enable direct visualization of the targeting line 22 in the suspended particulates or vapor without the need for a flat surface to reflect the light.

To further aid the visualization process, one or more fiber optic features can be incorporated into the guide surface 612. The light from the targeting line 22 may be directed down the fiber optic tract to further aid visualization. Additional electronic components can also be incorporated into the trajectory guide to analyze the light intensity and colors. For example, a photo diode, charged couple device (a rectangular grid or line-type CCD), or other CMOS sensor(s) may be used to monitor incoming light. The signal output can provide feedback to the user regarding accuracy of trajectory alignment. Furthermore, in alternative embodiments, the visualization aid 610 may be incorporated into other medical devices, such as the body of an ultrasound probe or surgical instrumentation set (e.g., drill, screwdriver, rod holder etc.) to provide direct visualization of the trajectory.

Figure 16:
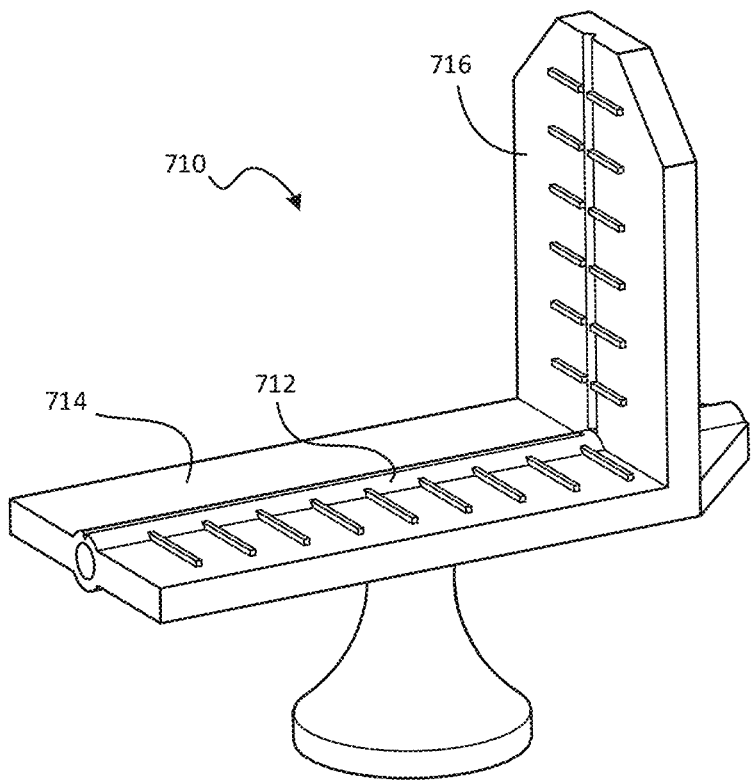
FIG. 16 is a perspective view of another visualization aid in the form of an enclosed channel and depth control for one or more targeting lines.

Referring to FIG. 16, a perspective view illustrates another visualization aid 710 in the form of an enclosed channel and depth control, which may help visualize the primary targeting line as well as a secondary targeting line projected from one or two additional light sources of the targeting system. As shown, the visualization aid 710 may take the form of a trajectory guide with a guide surface in the form of the bore of an enclosed tube 712 with a visualization surface 714 on either side of it. Further, the visualization aid 710 may have an orthogonal alignment piece 716 that may be used for visualization of a secondary targeting line or other feature projected by one or more additional light sources (for example, a third and/or fourth laser).

The visualization surface 714 may function in a manner similar to that of the visualization surface 614 of the visualization aid 610 of the previous embodiment. The enclosed tube 712 may be used to guide surgical instruments such as catheters, needles, drills, and the like. The orthogonal alignment piece 716 may be perpendicular to the tube 712 and may provide visualization of a third and/or fourth light source.

For example, a third laser that projects light nonparallel to the first light 18 and nonparallel to the second light 20 can be used. The intersection of this third laser with the targeting line can be visualized on the orthogonal alignment piece 716. This alignment may define the degree of rotation along the desired trajectory, thereby fixing another degree of freedom. The amount of rotation along the planned trajectory can be planned on the cross-sectional or planar imaging, and the third light source can be moved accordingly once the appropriate calculations are performed.

If a fourth laser is added, then the intersection of the third and fourth lasers may form a second targeting line. The orientations of the light sources can be calculated such that this second targeting line intersects with and/or is orthogonal to the first (primary) targeting line formed by the first laser 12 and the second laser 14. This may not only lock in rotation but may also provide depth visualization. This may also add control of another degree of freedom in the depth direction along the desired trajectory.

Figure 17:
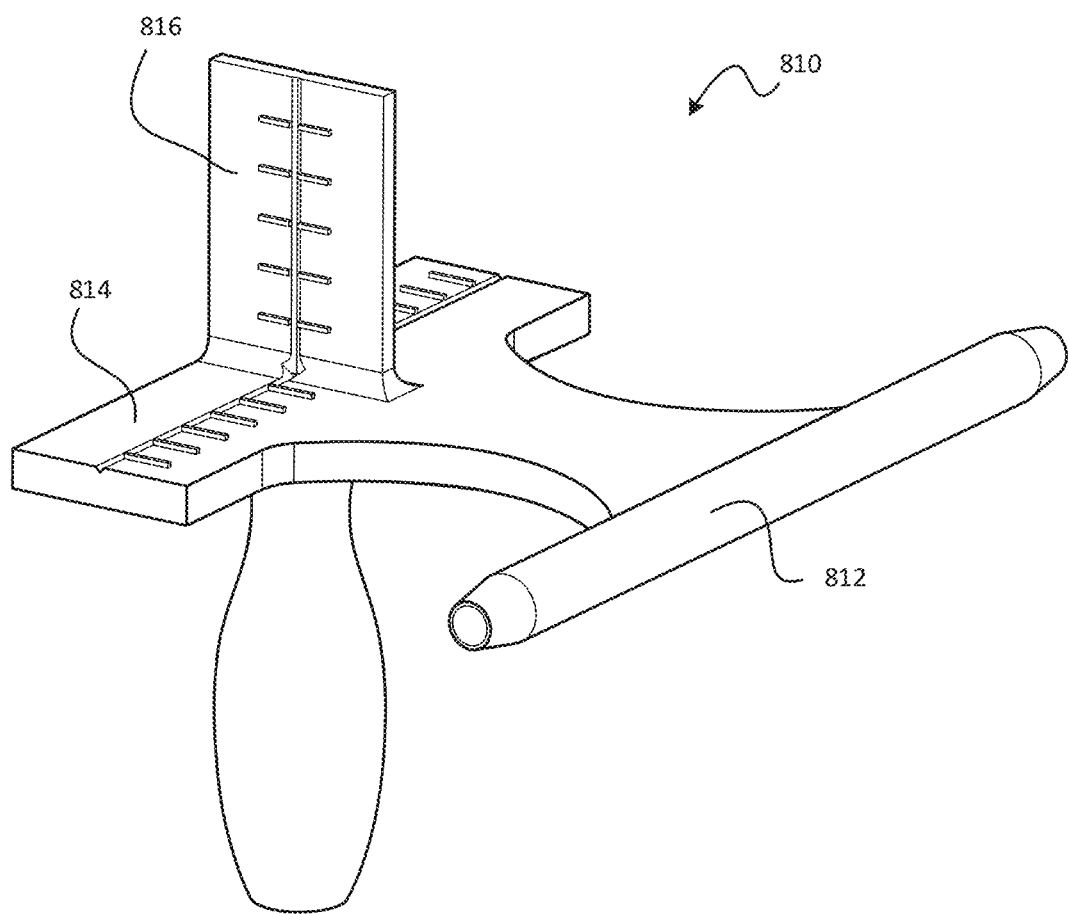
FIG. 17 is a perspective view of another visualization aid in the form of an offset enclosed channel and depth control for one or more targeting lines.

Referring to FIG. 17, a perspective view illustrates another visualization aid 810 in the form of an offset enclosed channel and depth control. The visualization aid 810 may facilitate visualization of the primary targeting line as well as a secondary targeting line projected from one or two additional light sources of the targeting system, while providing an actual trajectory offset from the targeting line(s).

The visualization aid 810 may have a guide surface including a bore of an enclosed channel 812. In alternative embodiments, the visualization aid 810 may instead have a guide surface with an open channel, a series of rings, and/or or any number of features that allow the visualization aid 810 to be used to guide instruments and/or implants. The visualization aid 810 may be similar to that of FIG. 16 in that the targeting line 22 may be visualized in addition to a secondary targeting line or other features that provide visualization of orientation and/or depth control, depending on the number of light sources used in the targeting system. The visualization aid 810 may thus have a visualization surface 814 and an orthogonal alignment piece 816, which may function in a manner similar to their counterparts of FIG. 16.

The visualization aid 810 may position the enclosed channel 812 at any desired distance and/or orientation with respect to the visualization surface 814 and the orthogonal alignment piece 816, as long as this orientation is known beforehand and factored into the calculations. In alternative embodiments, the angular and/or linear displacement between the guide surface and the visualization surface may be made adjustable, and the relative positioning of the visualization and guide surfaces can be accurately measured and accounted for in the calculations. If any adjustment to the relative orientation and/or position of the guide surface and the visualization surface occurs after performance of the calculations, a new set of measurements may be taken, and calculations may be performed again.

Any of the visualization aids disclosed herein may be made to attach to the patient or a targeted object in a wide variety of ways. Various attachment mechanisms may be employed, depending on the surface properties of the attachment site, including adhesives, hook and loop fasteners such as Velcro™, pins, screws, clamps, jaws, etc.

Alternatively, or additionally, a separate stand and/or support arm may be provided to hold the visualization aid in place. This may be a standalone unit with its own stand and adjustable arm to aid positioning and/or keep the visualization aid in place. Alternatively, or additionally, such an adjustable support arm can be made attachable to an operating room table, an imaging device (e.g., a C-arm), or any suitable feature on the targeted object.

Such a support arm can be further motorized and integrated with a robotic control system to provide a semi-automated or fully-automated alignment process. Such systems can be connected to the controller mentioned above to allow communication with the user. Additionally, or alternatively, such a support arm can be incorporated into a robot-assisted procedure as outline above.

The visualization aid may be further adjustable with respect to the attachment base/arm system. A locking mechanism may be provided, and may have a set screw, thumb screw, clips, quick release mechanism, and/or other mechanism that provides releasable locking to secure the visualization aid in the desired configuration once the appropriate alignment is obtained. This may free the hand(s) of the operator from holding the visualization aid securely at all times to allow the operator to focus on the procedure itself.

Figure 18:
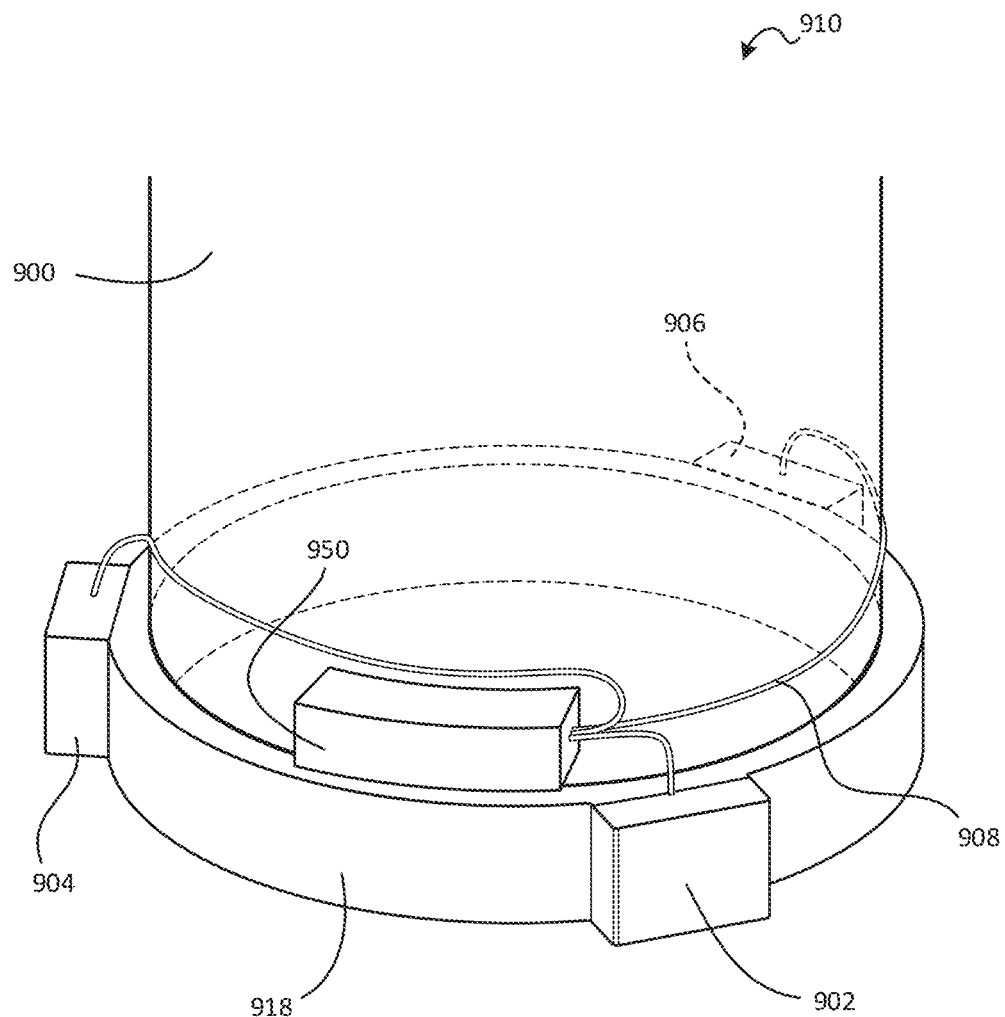
FIG. 18 is a perspective view of a targeting system according to another embodiment of the present disclosure.

Referring to FIG. 18, a perspective view illustrates a targeting system, or system 910, according to another alternative embodiment of the disclosure. Like the system 510 of FIGS. 8-9B, the system 910 may be designed for attachment to a medical imaging device, such as the imaging intensifier 900 of a C-arm fluoroscopy unit. The system 910 may include a first light source in the form of a first light component 902, a second light source in the form of a second light component 904, and a third light source in the form of a third light component 906. The system 910 may also include a fixture in the form of a ring 918, and a controller 950.

The first light component 902, the second light component 904, and the third light component 906 may each be fixedly secured to the ring 918. The first light component 902 may contain a first light source (not shown) such as a first laser and may also contain a first set of motors (not shown) capable of changing the orientation of the first laser. Similarly, the second light component 904 may contain a second laser (not shown) and a second set of motors capable of changing the orientation of the second laser. Further, the third light component 906 may contain a third laser (not shown) and a third set of motors capable of changing the orientation of the third laser. Hence, although the first light component 902, the second light component 904, and the third light component 906 may be substantially rigidly attached to the ring 918, the corresponding light sources may be oriented at the necessary orientations to provide visualization of a desired trajectory.

As shown, the controller 950 may be electrically coupled to the first light component 902, the second light component 904, and the third light component 906 via wires 908. The controller 950 may receive data from the first light component 902, the second light component 904, and the third light component 906, including data representative of the actual orientations of the first, second, and third lasers. Additionally, or alternatively, the controller may transmit signals to the first light component 902, the second light component 904, and the third light component 906 to activate the first, second, and third lasers and/or set the orientations of the first, second, and third lasers.

As mentioned previously, the use of more than two light sources may allow additional visualization to shown, such as the desired orientation and/or depth of a surgical instrument at the desired trajectory. Alternatively, the use of more than two light sources allows the optimal two light sources to be used. Thus, in the event that a light source is blocked or is not optimally positioned to provide accurate visualization of the desired trajectory, other light sources may be used instead. Positioning the first light component 902, the second light component 904, and the third light component 906 at an even distribution about the periphery of the image intensifier 900 may enhance the likelihood that at least two light sources of the system 910 will be unobstructed and positioned for accurate projection of the targeting line. In other embodiments, more than three light sources may be used.

Figure 19:
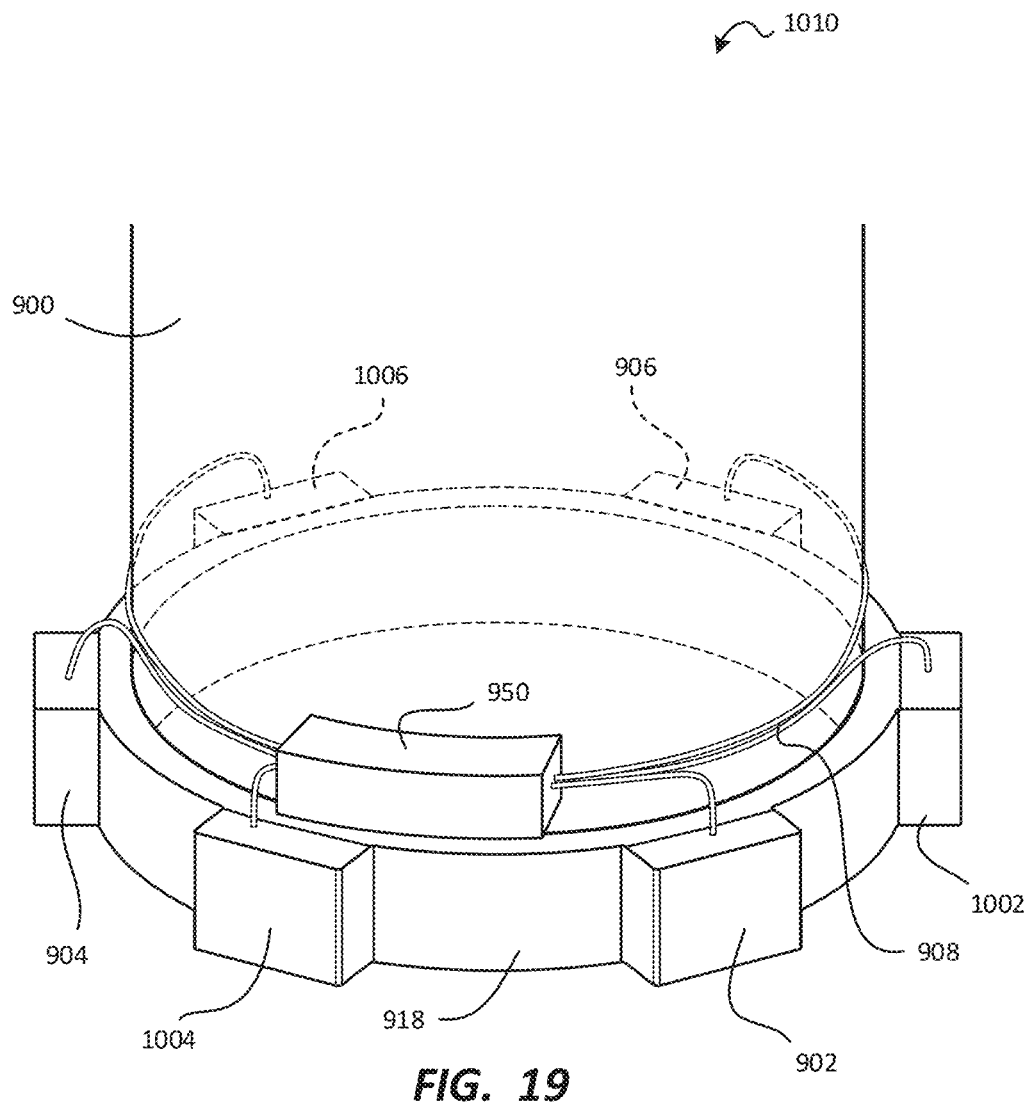
FIG. 19 is a perspective view of a targeting system according to yet another embodiment of the present disclosure.

Referring to FIG. 19, a perspective view illustrates a targeting system, or system 1010, according to another alternative embodiment of the disclosure. The system 1010 may have a configuration similar to that of the system 910, except that the system 1010 may have additional light sources. More specifically, in addition to the first light component 902, the second light component 904, and the third light component 906, the system 1010 may have a fourth light component 1002, a fifth light component 1004, and a sixth light component 1006. These may be fixedly attached to the ring 918, but may contain fourth, fifth, and sixth light sources, which may be fourth, fifth, and sixth lasers that are movable relative to the ring 918.

The use of six light sources may enable the projection of additional features and/or lines. Further, the use of six light sources may further enhance the likelihood that at least two light sources of the system 1010 will be unobstructed and positioned for accurate projection of the targeting line.

Figure 20:
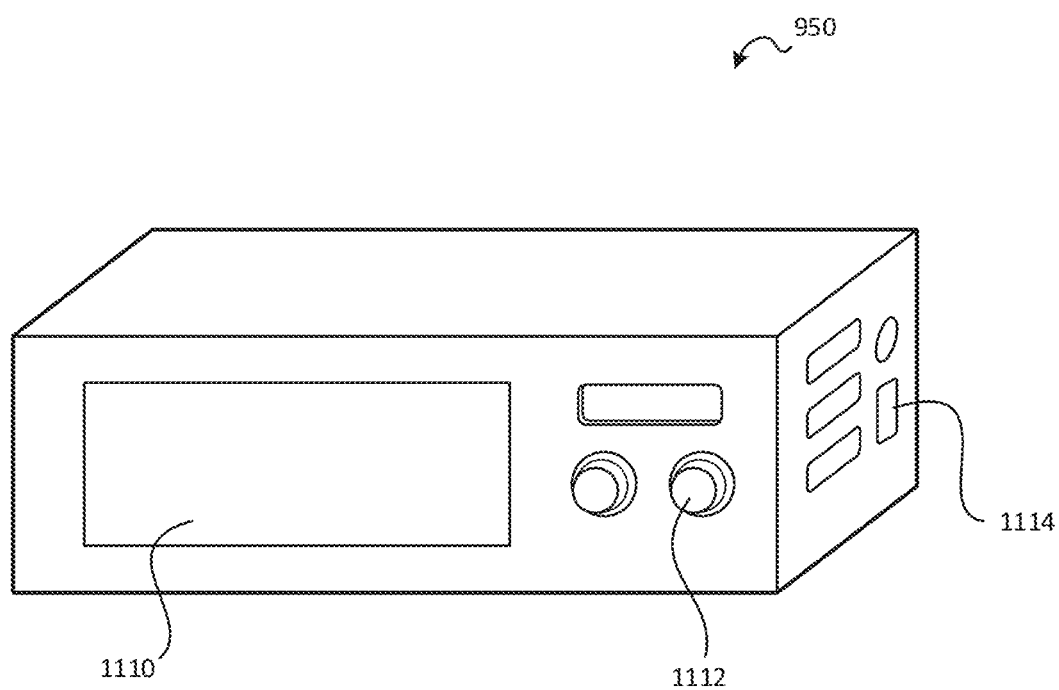
FIG. 20 is a perspective view of the controller of FIGS. 18 and 19.

Referring to FIG. 20, a perspective view illustrates the controller 950 of FIGS. 18 and 19 in greater detail. As shown, the controller 950 may have a display 1110, a control interface 1112, and connection ports 1114. The display 1110 may, for example, display the angulation of any or all of the light components connected to it. Such data may come from the light components. Additionally, or alternatively, the controller 950 may have a built-in gyroscope, encoder or other measurement device that indicates the angle at which the controller 950 is positioned. When used on a mobile platform such as a movable medical imaging device, the mobile platform may be moved back to a datum position (for example, the first position at which imaging data was captured) in order to provide a meaningful indication of orientation. Furthermore, should such controller be mounted on an X-ray image intensifier, the planar X-rays could be position-locked to the orientation of the system to facilitate both calibration and trajectory planning/targeting.

The control interface 1112 may be used by the user to change the settings of the system 910, the system 1010, or manually key in the orientations of the light sources, turn light components on or off, manually enter the position and/or orientation of the desired trajectory, or the like. The connection ports 1114 may be used to connect the controller 950 to other components such as the light components, the medical imaging device to which it is attached, an external computer, or the like. If desired, the controller 950 may receive orientation data for the light components and/or the desired trajectory directly from the medical imaging device or an external computer. Thus, the controller 950 may be designed to operate independently of any direct user input.

Figure 21A:
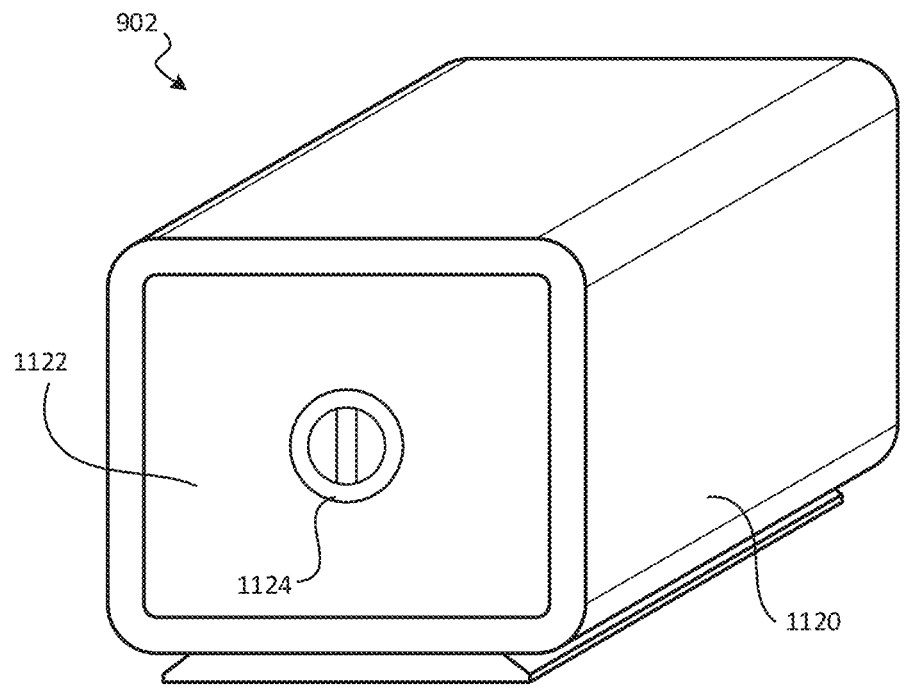
FIGS. 21A and 21B are perspective and front elevation section views, respectively, of the first light module or component of FIGS. 18 and 19.
Figure 21B:
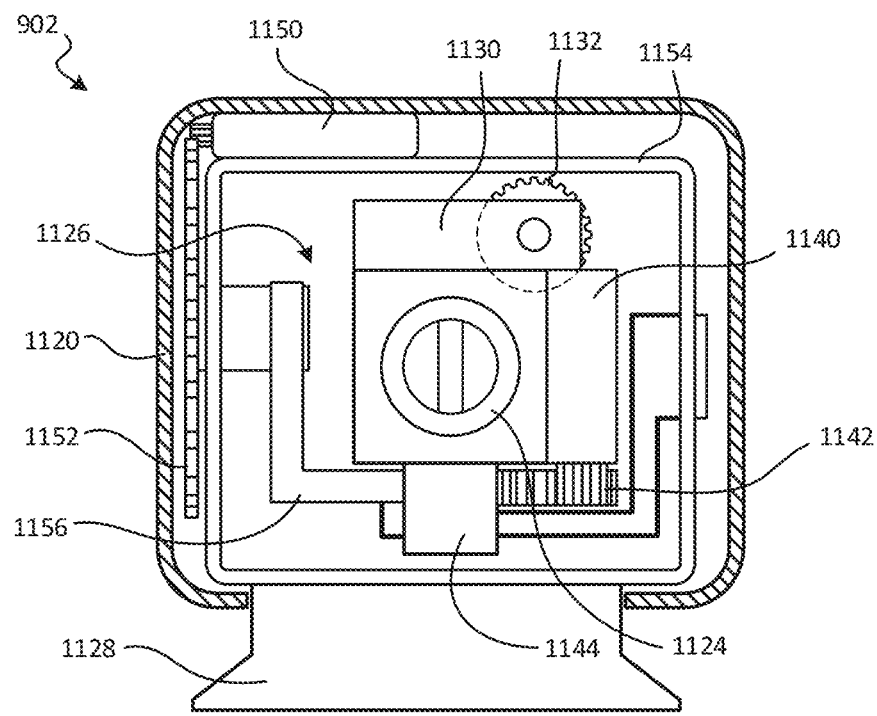

Referring to FIGS. 21A and 21B, perspective and front elevation views, respectively, illustrate the first light component 902 of FIGS. 18 and 19 in greater detail. The first light component 902 may be substantially the same as the other light components, i.e., the second light component 904, the third light component 906, the fourth light component 1002, the fifth light component 1004, and the sixth light component 1006.

The first light component 902 may have a housing 1120 with the overall shape of a rectangular prism. The housing 1120 may be formed of a polymer if desired, for the purpose of limiting the weight of the targeting system. The housing 1120 may be hollow, and may contain a first light source, which may be a first laser 1126 as mentioned previously. The first laser 1126 may have a slotted cap 1124 that causes the light emitted by the first laser 1126 to propagate along a plane, i.e., the first plane as discussed in connection with FIG. 1.

The first light component 902 may also have a window 1122 that is translucent to permit light from the first laser 1126 to exit the housing 1120. If desired, the window 1122 may be tinted to act as a filter. Thus, the window 1122 may, if desired, be used to determine the wavelength(s) of light that form the first light emitted by the first light component 902. The window 1122 may only permit light of a certain wavelength range to exit the housing 1120. Alternatively, the first laser 1126 may be designed to emit light of the desired color. In such a case, the window 1122 may not be tinted, and need not act as a filter.

As shown in FIG. 21B, the first light component 902 may also have an attachment interface 1128 designed to facilitate removable, yet secure attachment of the first light component 902 to the ring 918. The attachment interface 1128 may take the form of a dovetail base that mates with a corresponding undercut slot (not shown) formed in the ring 918. In alternative embodiments, other fastening systems may be incorporated into an attachment interface, including but not limited to screw-mounted systems, slidable quick-release systems, and the like.

The first light component 902 may have a first set of motors that controls the orientation of the first laser 1126 within the housing 1120. For example, the first set of motors may include a roll control motor 1130, a yaw control motor 1140, and a pitch control motor 1150. The roll control motor 1130 may adjust the "roll" orientation of the first laser 1126, the yaw control motor 1140 may adjust the "yaw" orientation of the first laser 1126, and the pitch control motor 1150 may adjust the "pitch" orientation of the first laser 1126.

The pitch control motor 1150 may be positioned adjacent to an internal frame 1154 within the housing 1120. The internal frame 1154 may contain a swivel bracket 1156 that is pivotably connected to the internal frame 1154 such that the swivel bracket 1156 can rotate within the internal frame 1154 to permit adjustment of the pitch of the first laser 1126. The pitch control motor 1150 may be coupled to the swivel bracket 1156 via pitch control gearing 1152, so that rotation of an output shaft of the pitch control motor 1150 causes the swivel bracket 1156 to angle the first laser 1126 upward or downward, relative to the view of FIG. 21B.

The yaw control motor 1140 may be positioned on the swivel bracket 1156, adjacent to the first laser 1126. The first laser 1126 may be pivotably coupled to the swivel bracket 1156 via a transverse shaft 1144. The transverse shaft 1144 may rotate to permit the first laser 1126 to rotate leftward or rightward, relative to the view of FIG. 21B. The yaw control motor 1140 may be coupled to the transverse shaft 1144 and/or the adjacent portion of the swivel bracket 1156 via yaw control gearing 1142. Rotation of an output shaft of the pitch control motor 1150 may cause the first laser 1126 to rotate relative to the swivel bracket 1156.

The roll control motor 1130 may be positioned above the first laser 1126. The roll control motor 1130 may be coupled to the first laser 1126, or to just the slotted cap 1124, via roll control gearing 1132. Thus, rotation of an output shaft of the roll control motor 1130 may cause the first laser 1126 and/or the slotted cap 1124 to roll about an axis perpendicular to the page, with respect to the view of FIG. 21B.

As mentioned previously, a light source need only have an adjustable orientation about two orthogonal axes. However, providing orientation adjustment about all three axes may provide for additional flexibility in the operation of the targeting system. If desired, any one of the roll control motor 1130, the yaw control motor 1140, and the pitch control motor 1150 may be omitted, if desired, to immobilize the first laser 1126 as applied to rotation about the corresponding axis.

Figure 22A:
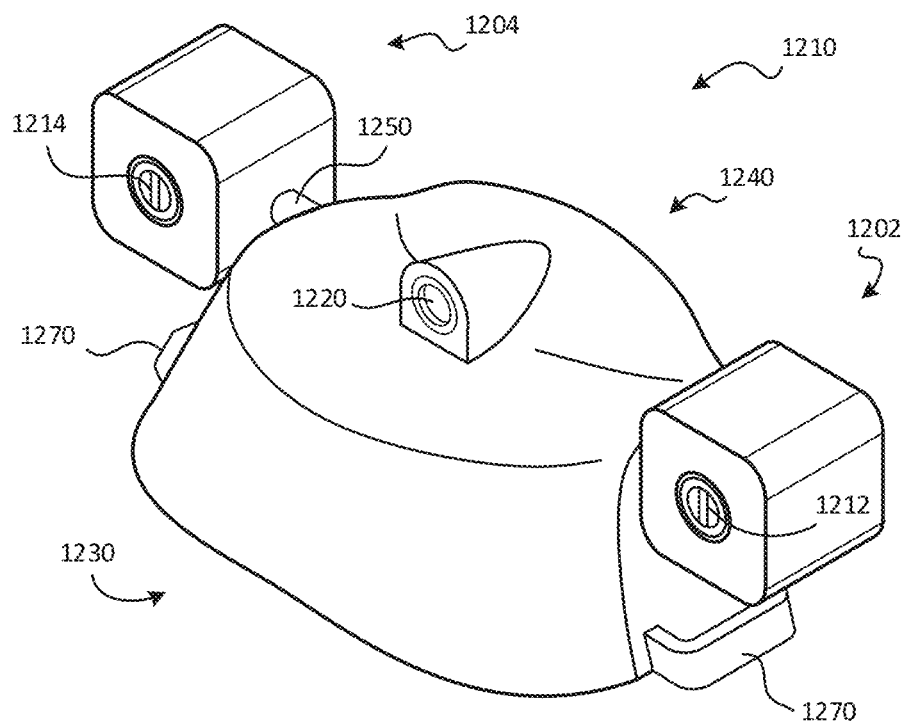
FIGS. 22A and 22B are perspective and front elevation section views, respectively, of an alternative targeting system embodiment of the present disclosure including an image-capture device.
Figure 22B:
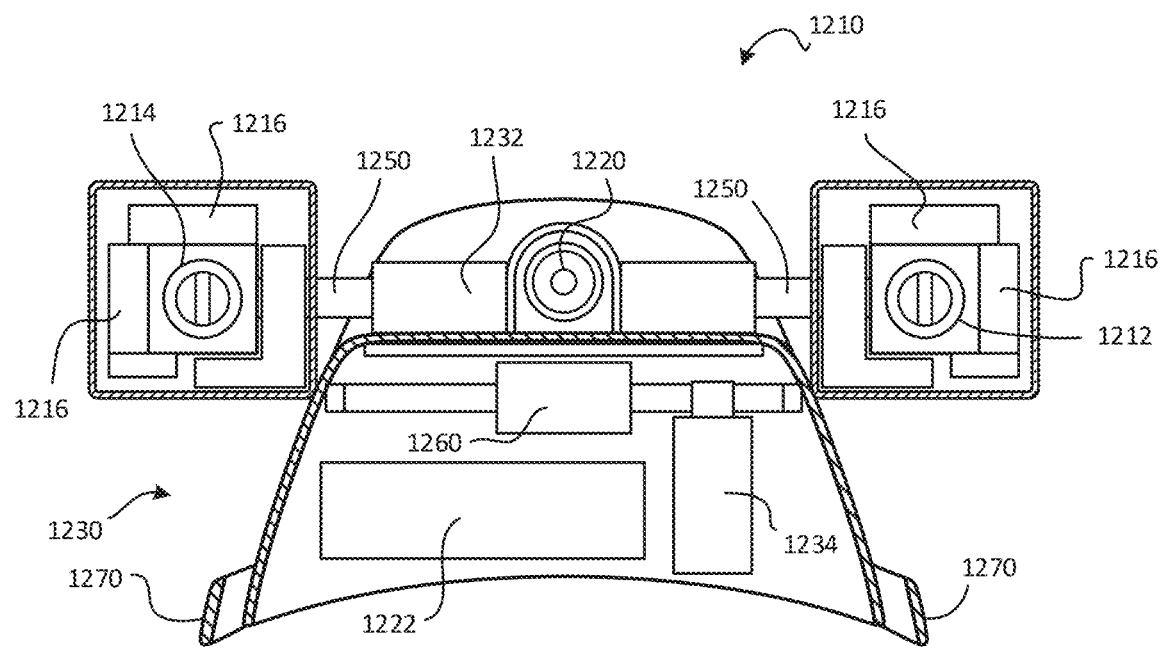

Referring to FIGS. 22A and 22B, perspective and front elevation, section views, respectively, illustrate a targeting system, or system 1210, according to another alternative embodiment of the disclosure. An image-capture device may be integrated into the system 1210. The image capture device may take the form of a camera 1220 mounted to the body of the system 1210. The camera 1220 may include various imaging technologies, including but not limited to CCD (charge coupled display) sensors, CMOS (complementary metal-oxide-semiconductor) sensors, and the like. Digital output from the camera 1220 may facilitate the operation of the system 1210, but in alternative embodiments, analog and/or film-based cameras may be used. For procedures that require a targeting system to be mounted on the patient, the system 1210 depicted in FIGS. 22A and 22B may represent a fiducial-free method of obtaining accurate registration.

Additionally, the system 1210 may have a fixture in the form of a base unit 1230, an armature 1240, and laser mounting posts 1250 on the armature 1240, on which a first laser component 1202 and a second laser component 1204 may be mounted. The camera 1220 may be coupled to the armature 1240, which may be movable relative to the base unit 1230. The first laser component 1202 may have a first laser 1212 that is rotatable within the first laser component 1202 about at least two of the roll, pitch, and yaw axes described previously. Similarly, the second laser component 1204 may have a second laser 1214 that is rotatable within the second laser component 1204 about at least two of the roll, pitch, and yaw axes. Motion of the first laser 1212 and the second laser 1214 within the first laser component 1202 and the second laser component 1204 may be accomplished through the use of motors 1216, as shown in FIG. 22B.

The base unit 1230 may be securable to an external structure adjacent to the patient, including but not limited to armature, pole, platform, and the like. The base unit 1230 may also be securable to a portion of the patient's anatomy. Where the system 1210 is to be used for a cranial procedure, such as installation of an EVD, the base unit 1230 may be secured to cranial anatomy, such as the forehead. For other procedures, the system 1210 may be attached to a different location on the patient. As mentioned before, locations with relatively little soft tissue covering the underlying bone may provide optimal locations for registration. This may facilitate the use of attachment features in the form of non-invasive attachment mechanisms 1270 to attach the system 1210 to the patient, such as straps, grips, adhesives, and/or the like. Additionally, or alternatively, if desired, the system 1210 may be secured through soft tissue to underlying bone through the use of screws or other devices.

The camera 1220 may be positioned at a known distance from the first laser component 1202 and the second laser component 1204. The first laser component 1202 and the second laser component 1204 may project first light and second light (not shown) along first and second planes (not shown), respectively to provide a targeting line. When projected onto a surface, such as a portion of the patient's anatomy, the first light, the second light, and/or the targeting line may reflect off of the surface of the patient's anatomy. The reflection, including any attendant distortion, may be captured by the camera 1220. Through triangulation, given the known positions of the first and second planes relative to the camera 1220, the system 1210 may determine the coordinates, in three-dimensional space, of the anatomical features intersecting the first light and the second light. Thus, at a given angle between the first laser 1212 and the camera, the triangulation process produces a line of information in 3-D space. By scanning the laser line across an object and capturing images at each angle increment, a full three-dimensional dataset can be built-up that accurately represents a 3-D surface.

In FIG. 22A, the first laser component 1202 may be connected to a controller 1222. The system 1210 may use the first laser component 1202 and/or the second laser component 1204 to scan across the patient's anatomical region of interest. The laser light may be rotated about a single axis at set degree intervals (for example, yaw at 5 degree intervals) and the camera 1220 may capture an image at each such interval. The controller 1222 may generate a three-dimensional map of the surface of the patient's anatomical region. This may be done, for example, by comparing the reflection of the first light, the second light, and/or the resulting targeting line to a pre-defined set of reference images saved in a database. This three-dimensional surface may then be matched to the three-dimensional surface generated from patient imaging (e.g., CT/MRI scans, or any other 3-D surface images). The trajectory planned, utilizing such imaging, may be used in conjunction with the three-dimensional surface information to calculate the pitch, yaw and/or roll orientations of the first laser 1212 and the second laser 1214. The first laser component 1202 and the second laser component 1204 may be set at the proper orientations and activated to produce a targeting line at the desired trajectory without the need of any fiducials attached to the patient.

One laser component (i.e., either the first laser component 1202 or the second laser component 1204) is sufficient to capture the necessary 3-D surface data from the patient. Both the first laser component 1202 and the second laser component 1204 may be used to improve the accuracy of the system and reduce "blind spots." When the first laser component 1202 and the second laser component 1204 are both used, the first laser 1212 may be scanned across the patient's anatomical region, followed by the second laser 1214. The images may be captured and processed, and the distortions of the reflections of the first light and the second light from the patient's anatomy can be matched to the respective databases of the first and second laser lines. The resulting cloud-point data can be added together, or reconstructed, to generate the final 3-D surface map.

In FIG. 22B, the controller 1222 may be connected to one or more motors that move the armature 1240 relative to the base unit 1230. The motors may include, for example, a pitch motor 1232 that controls the pitch of the armature 1240 relative to the base unit 1230, and a yaw motor 1234 that controls the yaw of the armature 1240 relative to the base unit 1230. The armature 1240 may be rotatably coupled to the base unit 1230 via a bearing 1260. The pitch motor 1232 may cause the laser mounting posts 1250 to rotate relative to the armature 1240. The first laser component 1202, the second laser component 1204, and the camera 1220 may be secured to the laser mounting posts 1250 such that rotation of the laser mounting posts 1250 causes the pitch of the first laser component 1202, the second laser component 1204, and the camera 1220 to change. The system 1210 may cause the pitch and/or yaw of the camera 1220, the first laser component 1202, and/or the second laser component 1204 to change and position the camera 1220 at the most optimal vantage point relative to the anatomical region of interest. This may improve the quality of the 3-D surface map and thence, improve the accuracy of registration of the system 1210 on the relevant anatomy and projection of the targeting line.

The system 1210 may also use image subtraction to further increase contrast of the laser line scan. The camera 1220 may first take an image of the anatomical area of interest without the first laser 1212 and/or the second laser 1214 turned on, thereby acquiring a baseline image. The first laser 1212 and/or the second laser 1214 may then be activated, and image acquisition may proceed at set degree intervals as described above. The baseline image may be subtracted from the acquired set of images to effectively eliminate background pixels, leaving only the reflected light from the first laser 1212 and/or the second laser 1214. To maximize registration accuracy, the patient's anatomical area of interest should have distinctive 3-D features. Since the facial area has many such distinctive features, the system 1210 is well adapted to cranial applications.

Figure 23:
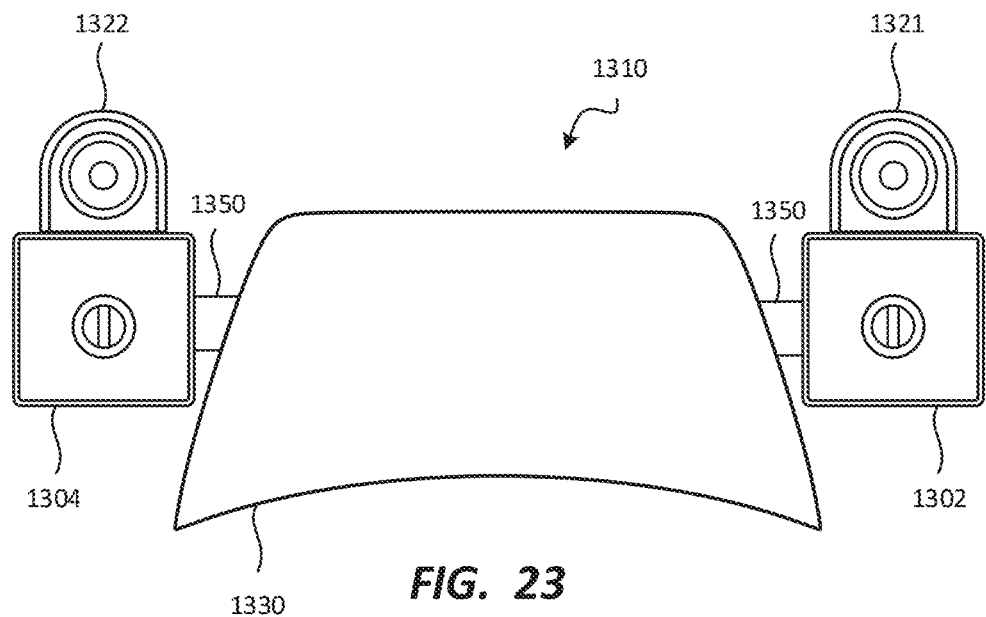
FIG. 23 is a front elevation view of a targeting system including multiple image-capture devices according to another embodiment of the present disclosure.

FIG. 23 illustrates a targeting system 1310 for providing visualization of a trajectory for a medical instrument, according to another alternative embodiment of the present disclosure. The targeting system 1310 may include an image capture system configured to capture image data or medical imaging data of anatomical features of a patient at a first location in space. The targeting system 1310 may also include an illumination system configured to project light to indicate the trajectory. In at least one embodiment, the illumination system may include a first laser component 1302 and a second laser component 1304. The first laser component 1302 may also be referred to as the first light source and a second laser component 1304 may also be referred to as the second light source. The targeting system 1310 may also include a base unit 1330, laser mounting posts 1350, a controller (not shown) and, in at least one embodiment, a rotatable armature (not shown) that couples the first laser component 1302 and the second laser component 1304 to the base unit 1330.

In the embodiment shown in FIG. 23, the image capture system includes a first camera 1321 and a second camera 1322. The first camera 1321 and the second camera 1322 can be mounted a certain distance apart from each other to provide stereo-vision. The first camera 1321 and the second camera 1322 can be mounted to the first laser component 1302 and the second laser component 1304 as shown in FIG. 23. The first camera 1321 and the second camera 1322 may be attached to the support bracket of each laser component such that it remains fixed as the yaw and roll motors of the laser component rotate the laser to the desired position. The cameras in this instance would only move in the pitch direction. Alternatively, the first camera 1321 and the second camera 1322 can move with the laser components in the yaw direction as well.

In at least one embodiment, the first camera 1321 may be coupled to the base unit 1330 and configured to capture first medical imaging data of anatomical features of the patient at a first location in space. The second camera 1322 may also be coupled to the base unit 1330 and configured to capture second medical imaging data of the anatomical features of the patient at the first location in space. The second camera 1322 may also be spaced apart from the first camera 1321 by a predetermined distance to form a stereoscopic camera system.

In alternative multi-camera embodiments (not shown), the cameras can be mounted on the control module, main frame, or any other fixed or moveable part of the system. This may entail mounting cameras to the base unit 1330, similar to the system 1210 of FIGS. 22A and 22B, except that multiple cameras may be mounted to the base unit 1330 at a fixed distance apart in place of the single camera of FIGS. 22A and 22B. This may allow the cameras to remain stationary while the lasers move in pitch, yaw, and/or roll. The distance between the cameras may be known precisely. Thus, images taken by the cameras may be combined together with existing calibration information to generate precise three-dimensional surface maps of objects in the field of view (FOV) of the cameras.

A fixed or semi-fixed camera relationship as described above (i.e., with the cameras mounted on a fixed part of the system as described above, or with the cameras mounted to the laser components for motion with the lasers in one direction) may be better suited for stereo vision applications. This may be particularly desirable for tracking an object in real-time. The object to be tracked can have certain features on it that allows a machine-vision algorithm to easily extract such features and calculate orientation information from photo and/or video data captured from each camera. The information from both cameras may be combined to fully calculate the three-dimensional position and orientation of the object. The information can be passed to a computer and used in a manner that best facilitates trajectory visualization. This process may be used to facilitate procedures including, but not limited to:

Setting a new entry point for the desired target and recalculating the trajectory;

Inputting a trajectory and comparing it to the planned trajectory in a training scenario (i.e., comparing the present trajectory to an ideal trajectory);

Tracking a pointer, catheter guide, probe etc. and constantly updating the position and orientation of such a device on a display screen (in essence providing navigation mode in a traditional image guidance system);

Allowing the laser to follow the pointer, catheter guide, probe, etc. as it is moved over the patient's navigational space; and/or If registration using laser scanning is unsuccessful, using a probe as a tracing or tracking device to capture surface information for the purpose of image registration between different medical imaging data sets.

The configuration described earlier, whereby the camera moves with the laser in yaw and pitch, may be better suited for laser-line scanning. The addition of yaw movement allows more flexibility in positioning the laser/camera system to achieve the greatest accuracy. Two or more cameras may also allow scanning from multiple directions, thereby reducing the number of "blind spots" that can be a problem with a single camera system.

Another alternative embodiment of the camera system with a single or multiple cameras is the addition of said camera(s) to the control unit, laser component, or separate camera housing on part of an X-ray system, such as the image-intensifier of a fluoroscopic C-arm, etc. This allows for tracking of movement of X-ray tube with respect to the patient. The trajectory planning technique mentioned in FIG. 10 above relies on the use of isocentric orthogonal set of x-ray images for calculation. Certain obstacles may prevent true isocentric rotation of X-ray system including but not limited to patient positioning, equipment, environment etc. In addition, design of X-ray systems (e.g., C-arm's) may cause a small amount of shift/angulation of principle image axis due to deformation of structure and/or gravity as the X-ray is rotated from AP to Lateral positions. One way to correct for these additional movements may be to position-lock the X-rays taken by keeping tracking of rotation and translation of the X-ray unit with respect to the patient.

The camera system mounted on the X-ray unit could track a visual reference (see FIG. 31 below) and may work in conjunction with the position sensing system (e.g., gyroscopic or encoder based) amount in the control unit described in FIG. 20. Two or more planar X-ray images can be used that do not have to be isocentric or even orthogonal, so long as the X-ray tube positions can be recorded along with the images (position-locked). With knowledge of rotation and translation, the images can be transformed according to calibration data obtained beforehand, and trajectory planning and targeting can be performed. This may further speed up the workflow of using planar X-ray units for targeting/guidance since the restriction on image acquisition can be removed.

The targeting system controller may be configured to receive medical imaging data and indicate the trajectory relative to the anatomical features of the patient. In at least one embodiment, the controller may be configured to receive the first medical imaging data and the second medical imaging data and generate a three-dimensional map of the anatomical features of the patient at the first location in space and based on the three-dimensional map, determine a first orientation of the first light source and a second orientation of the second light source at which the first targeting line indicates the trajectory.

The image capture systems of the targeting system 1310 may be configured to capture medical imaging data of anatomical features of the patient (for registration with image space data taken pre/intra-operatively) in various ways. For example, medical imaging data (e.g., first medical imaging data and second medical imaging data) collected by the image capture system may indicate reflections of ambient light from the anatomical features of the patient. In another example, medical imaging data collected by the image capture system may indicate reflections of laser light (e.g., first light and second light projected from the first laser component 1302 and the second laser component 1304, respectively) from the anatomical features of the patient. In yet another example, medical imaging data collected by the image capture system may indicate reflections of a light pattern projected from a structured light reflecting off the anatomical features of the patient, as will be described in more detail below.

In at least one embodiment, the first camera 1321 may be configured to capture third medical imaging data of the anatomical features of the patient at a second location in space and the second camera 1322 may be configured to capture fourth medical imaging data of the anatomical features of the patient at the second location in space. In this embodiment, the controller may be configured to receive the third medical imaging data and the fourth medical imaging data and generate a three-dimensional map of the anatomical features of the patient at the second location in space and based on the three-dimensional map, determine a third orientation of the first light source and a fourth orientation of the second light source at which a second targeting line indicates an updated trajectory. In this manner, the targeting system 1310 may be able to continuously track the patient's movements and update the targeting line trajectory accordingly to improve accuracy and robustness of the medical procedure. Moreover, 3-D scanning of the patient's anatomical features with the methods described above does not require the application of fiducials to the patient prior to medical scans (CT, MRI, etc.) in order to facilitate registration. This results in "fiducial free" registration, which helps speed up the overall medical procedure.

Figure 24:
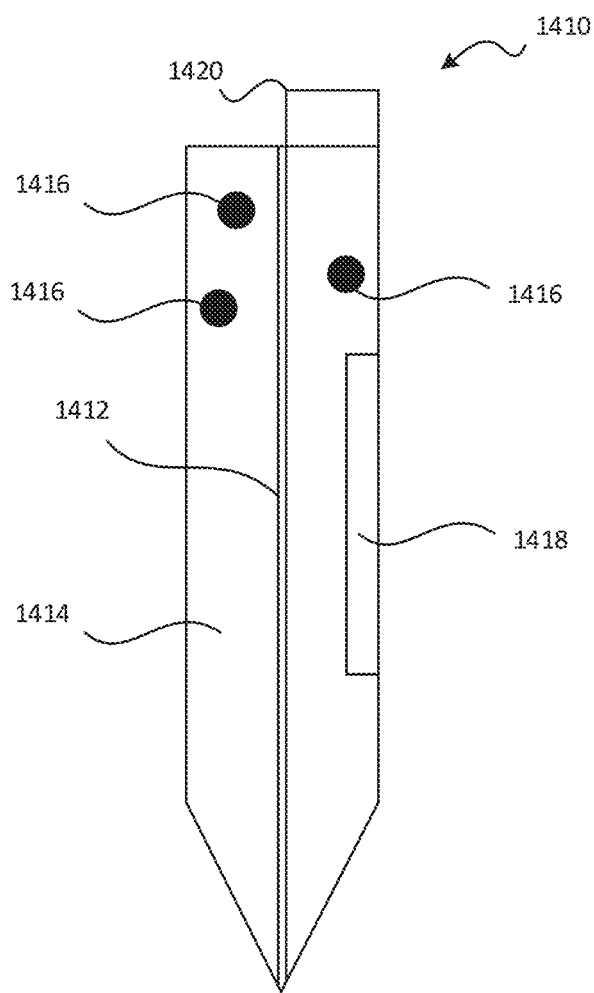
FIG. 24 is a side elevation view of a visualization aid including optical markers and geometrical features.

FIG. 24 illustrates an embodiment of a visualization aid in the form of a grooved instrument or guide probe 1410 with embedded features that allow the camera to easily visualize the position and orientation of the guide probe 1410. This may involve using one or more features with well-defined geometrical information. The guide probe 1410 may include a guide surface 1412, a visualization surface 1414 on which the first targeting line may be projected, one or more optical markers 1416 or unique patterned surfaces, and one or more geometrical features, such as notch 1418 and projection 1420. The camera may allow for tracking of the guide probe 1410 in the patient's space and translate this position information into the image space. This may allow for updating of anatomical information, as well as input from the user to select different entry and/or target point(s).

The guide surface 1412 may be in the form of an open channel that may be used to conduct a surgical instrument, such as a needle, trocar, cannula, depth probe, implant, or the like, along the desired trajectory. The guide surface 1412 may be positioned such that, with the first targeting line projected on the visualization surface 1414, the medical instrument may be slidable along the guide surface 1412 to move along the trajectory. The visualization surface 1414 may extend on either side of the guide surface 1412 with a widened shape on which the first light 18 and the second light 20, by way of example, may be projected and viewed.

In the embodiment shown in FIG. 24, the optical markers 1416 include three shaded or colored circles. However, it is understood that the optical markers on the guide probe 1410 can be any shape or color (e.g., square, triangle, rectangle, line, etc.), and may be present in any number. Furthermore, they can even be a patterned surface, such as that shown in FIG. 31. By comparing the distortion (for example, linear transformation with rotation, shearing and scaling) to predefined geometrical information, position and orientation information may be calculated. This can be performed with a single camera provided that the shape diameter and size is known and used in the calculation. Accordingly, such a guide probe may be used in conjunction with a single-camera system, similar to that shown in FIGS. 22A and 22B. However, using two or more cameras, as shown in FIG. 23, may improve the accuracy of such calculations. The optical markers may advantageously provide high contrast (for example, through the use of black-white interfaces, saturated colors, infrared reflective coatings, and/or the like). In addition to or in the alternative to the optical markers, the guide probe 1410 may also have unique geometrical features, as described previously. Such geometrical features may include a variety of positive and/or negative features (e.g., projections, holes, notches, and/or the like) that are recognizable by the camera. These geometrical features may facilitate determining the position of the guide probe 1410.

In at least one embodiment, the targeting system 1310 may be configured to track the position/orientation of the guide probe 1410 and update the entry point to a new desired entry point based on the position/orientation of the guide probe 1410. For example, the operator may decide that a planned trajectory entry point is not desirable (e.g., because the current trajectory and/or current entry point of the planned trajectory is located over a wound, a sore, or some other kind of obstruction, such as a bandage, etc.). The operator may wish to relocate the entry point to another location on the patient's skin away from the wound, sore, or obstruction. However, relocating the entry point will require a trajectory update to keep the operator aligned with the target deep inside the patient. Accordingly, in this embodiment, the targeting system 1310 may track the position/orientation of the guide probe 1410 via the optical markers and/or geometrical features. The targeting system 1310 may then receive an indication from the operator that the guide probe 1410 is now pointing at the new desired entry point. The targeting system 1310 may then recalculate the trajectory based on the position of the new desired entry point in order to keep the operator aligned with the target deep inside the patient. The targeting system 1310 may then project the new trajectory through the first and second light sources to help the operator align the guide probe 1410 to the updated trajectory.

In other embodiments, active visualization aids (not shown) are contemplated. For example, guide probes can be made active via the addition of electronic components. This may be advantageous when the intersection of laser light sources may not be directly visualized. In this scenario, the addition of photo-detectors, such as a CCD sensor, to sense the incoming laser light can be used to provide feedback to the operator. The guide probe could alert the operator if the light sensor is not illuminated in a way that lines up with the center line. This feedback may be provided in any manner, including via simple LED lights, via a small LCD display with a "bulls-eye" display to aim the operator in adjustment, etc. Another issue that may potentially arise is when the tool is thick. For example, the screwdriver for pedicle screw insertion can be about 5 mm to 6 mm thick. A guide probe with a hollow middle tube to accommodate this thickness may not be accurate if the lasers converged on the tube surface since the trajectory will be offset by the tool's radius (e.g., about 2.5 mm to 3 mm). In this case, the addition of electronics can help improve accuracy. For example, the visualization guide may have built-in gyroscopes to "lock in" a trajectory. The guide tube can also have a transparent section that allows the operator to line up the centerline accurately with the lasers. Once this occurs, the gyroscope can be used to lock in the trajectory. In this manner, the gyroscope can provide information for small adjustments in trajectory and help the operator stay in alignment. Similarly, in this example feedback can be provided to the operator via LED's, a small LCD display, etc.

Figure 25:
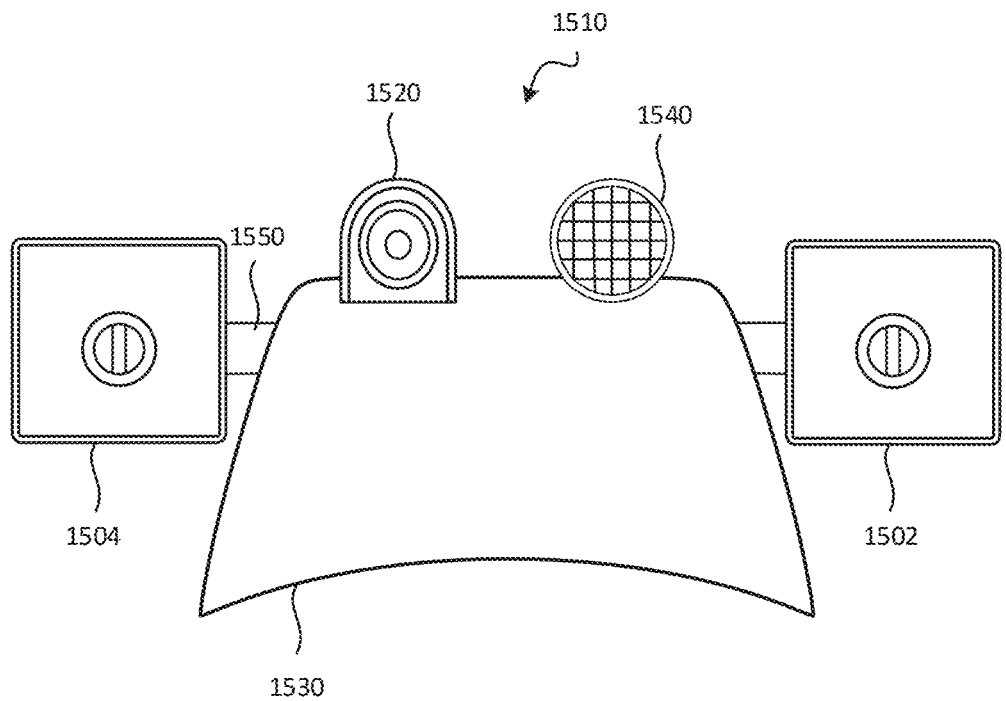
FIG. 25 is a front elevation view of a targeting system including an image-capture device and a structured light device, according to another embodiment of the present disclosure.
Figure 26:
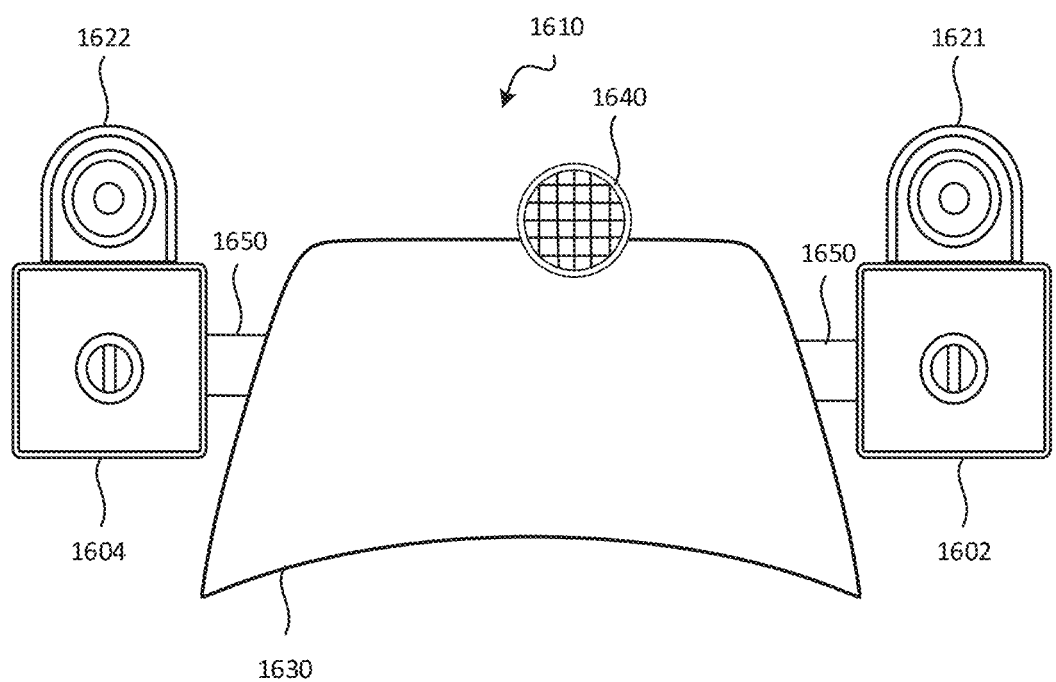
FIG. 26 is a front elevation view of a targeting system including multiple image-capture devices and a structured light device, according to another embodiment of the present disclosure.

FIGS. 25 and 26 illustrate targeting systems 1510, 1610 for providing visualization of a trajectory for a medical instrument, according to alternative embodiments of the present disclosure. The targeting systems 1510, 1610 may be similar to the targeting system 1310 discussed above and may include image capture systems including cameras 1520, 1621, 1622, illumination systems including laser components 1502, 1504, 1602, 1604, base units 1530, 1630, laser mounting posts 1550, 1650, controllers (not shown), and rotatable armatures (not shown). The targeting systems 1510, 1610 may also include structured light sources 1540, 1640.

Figure 27:
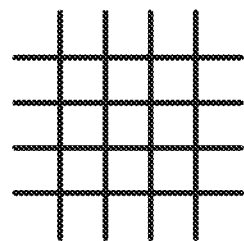
FIG. 27 illustrates an example of structured light pattern—a grid with predefined spacing and orientation.
Figure 28:
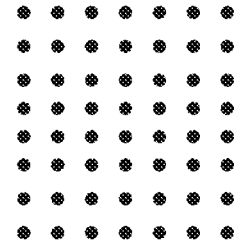
FIG. 28 illustrates an alternative example structured light pattern—a dot matrix with predefined spacing and orientation.

The structured light sources 1540, 1640 may be configured to emit structured light patterns to facilitate 3-D mapping of the anatomical features of the patient. An undeformed structured light pattern (e.g., the structured light pattern projected on a flat surface) may be used as calibration data, and the image captured of the patient's anatomy with a deformed structured light pattern can be used to quickly generate a 3-D surface map. This technique has the advantage of speed since few (sometimes even a single) images are needed to map a 3-D surface. FIGS. 27 and 28 illustrate two example structured light patterns that may be emitted by the structured light sources 1540, 1640 shown in FIGS. 25 and 26. These include but are not limited to: FIG. 27 structured light "grid" pattern with predefined grid spacing and orientation and FIG. 28 structured light "dot matrix" pattern with predefined dot density and spacing.

Figure 29:
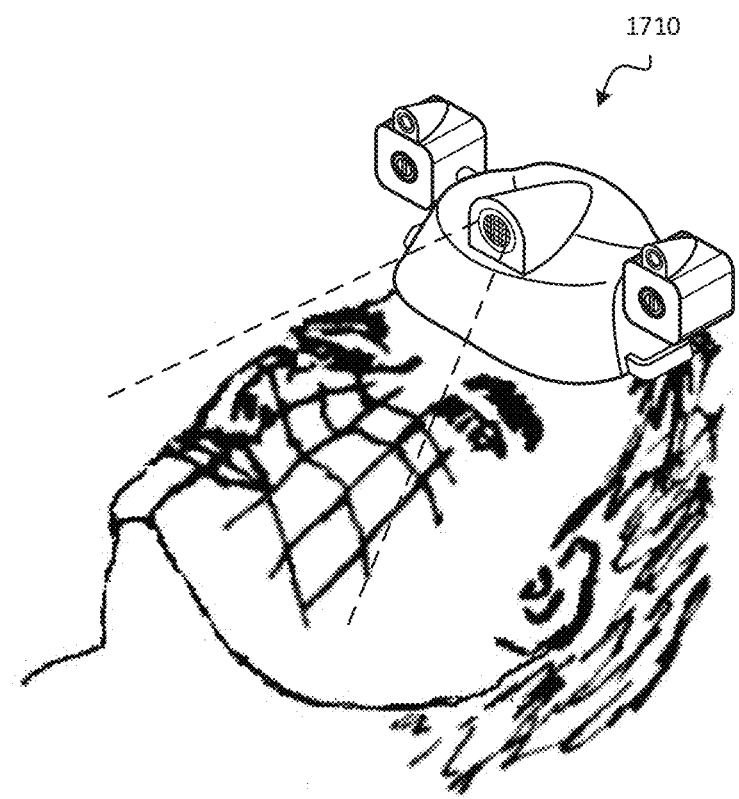
FIG. 29 illustrates a targeting system with embodiments of camera system and structured light source attached to part of a patient's anatomy.

FIG. 29 illustrates how a structured light source associated with a targeting system 1710 may be configured to shine down on the anatomical features of a patient, (e.g., the patient's face), causing the structured light pattern to conform itself to the patient's facial anatomical features. In FIG. 29, the targeting system 1710 is shown attached to the forehead of the patient. However, the targeting systems described herein may also be detached from the patient, as will be shown in FIGS. 32-34. The image capture system of the targeting system 1710 shown in FIG. 29 may capture images of the reflections of structured light patterns that are reflected from the patient's face. Image processing software may then be used to analyze the images and create a 3-D surface map of part of the patient's anatomy. This 3-D map may be combined with other 3-D images to register the patient's actual physical space with pre-operative 3-D images that were taken of the patient (e.g., CT scans, MRI scans, etc.) without the need for pre-scan fiducials.

Figure 30:
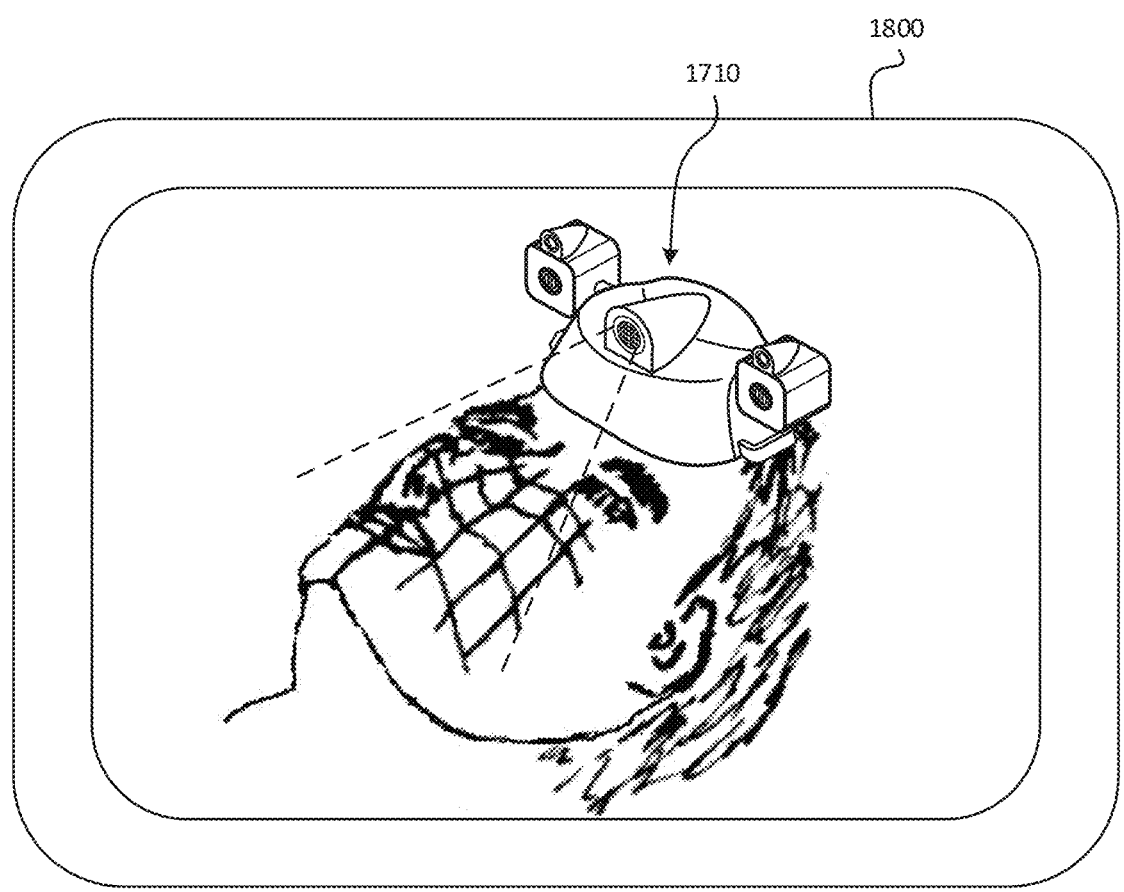
FIG. 30 illustrates a camera/display device such as a smartphone or tablet, displaying the targeting system and patient of FIG. 29.

FIG. 30 illustrates a mobile display device with a camera, or a screen device 1800 displaying the targeting system 1710 and patient shown in FIG. 29. The screen device 1800 may be any device that includes a camera and a display including, but not limited to: a smart phone, a tablet, a workstation, a computer, a laptop, a PDA, a smart watch, a handheld device, and the like. The screen device 1800 may also include at least one camera (not shown) which may be located on the back side of the screen device 1800 to enable the user to point the camera toward the patient and take images of the patient while simultaneously viewing a display of the patient on the screen device 1800.

The screen device 1800 may also include software that can interpret the reflections of the structured light that are contained in the images of the patient's face and then create 3-D maps of the patient's facial anatomical surface from these images. The screen device 1800 may also utilize the 3-D maps (either taken from targeting system control unit or generated on its own) for registration with other 3-D images of the patient (e.g., CT/MRI scans) in order to create and display augmented virtual images of the patient with overlays of segmented anatomical features or structures hidden deep inside the patient on to a live video feed. For example, the CT/MRI scans of the patient may be segmented to show the patient's brain ventricle structures. These segmented ventricle structures may then be overlaid on the display relative to the patient's facial skin/outer anatomy in such a manner that these ventricle structures appear at the proper depth and location inside the patient relative to the patient's facial skin/outer anatomy. This helps the operator visualize, target, and plan trajectories for structures inside the patient.

Figure 31:
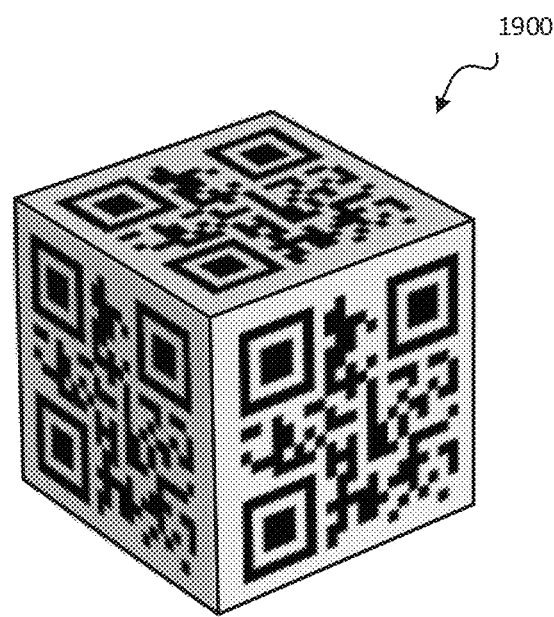
FIG. 31 is a perspective view of a specific embodiment of a visual reference or fiducial marker that can be used by one or more cameras for tracking, containing one or more visible sides of known dimension and high-contrast surface patterns.

FIG. 31 shows an example visual reference, according to one embodiment of the present disclosure, which may be used with targeting systems disclosed herein. The visual reference may be a structure with patterned surfaces of known geometric dimensions with at least one surface visible to the image capture system. The visual reference 1900 may be a cube, or may have any other shape (planar square, rectangle, triangle, tetrahedral, etc.) with at least one surface visible by the camera system. Such surface(s) may include high contrast patterns. In at least one embodiment, the surfaces of the visual reference 1900 may include a highly distinctive QR code pattern with unique patterned surfaces which may include alternating designs. A checkerboard pattern would be another possible embodiment of the aforementioned concept (not shown). The patterns may generally be formed of two high contrast colors, such as black and white, red, and green, etc. However, it is understood that any number of colors and patterns are contemplated herein. Moreover, visual references of shapes other than cubes are contemplated, as well as visual references having special reflective coatings, radio opaque materials, and/or any other suitable properties are contemplated herein.

Figure 32:
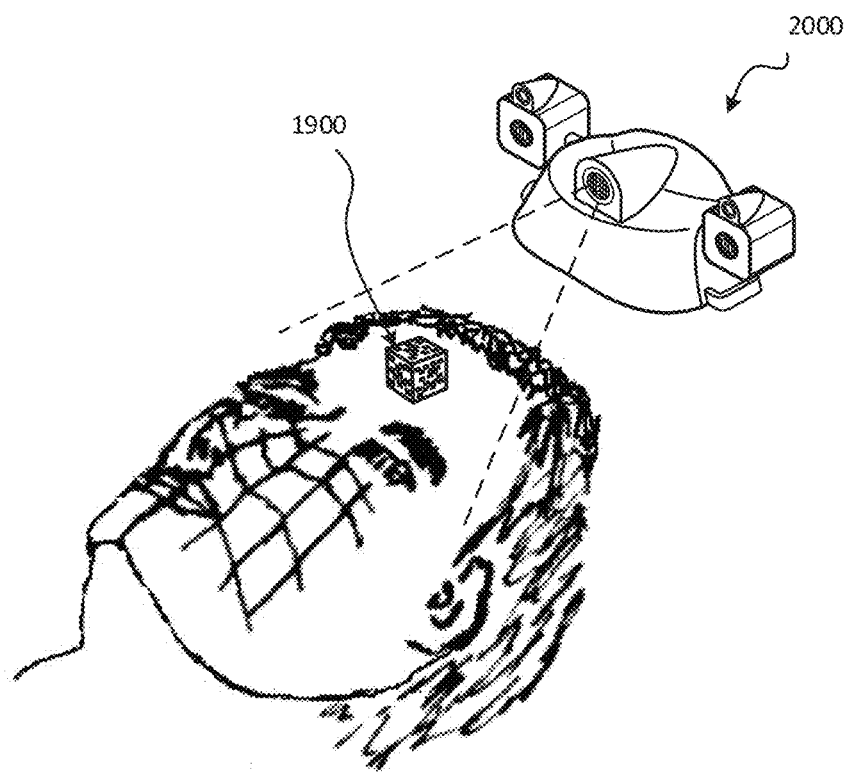
FIG. 32 illustrates a targeting system detached from a patient with the visual reference or fiducial marker of FIG. 31 attached to part of a patient's anatomy for tracking which can be done after the initial medical scan, during or even after the registration step.
Figure 33:
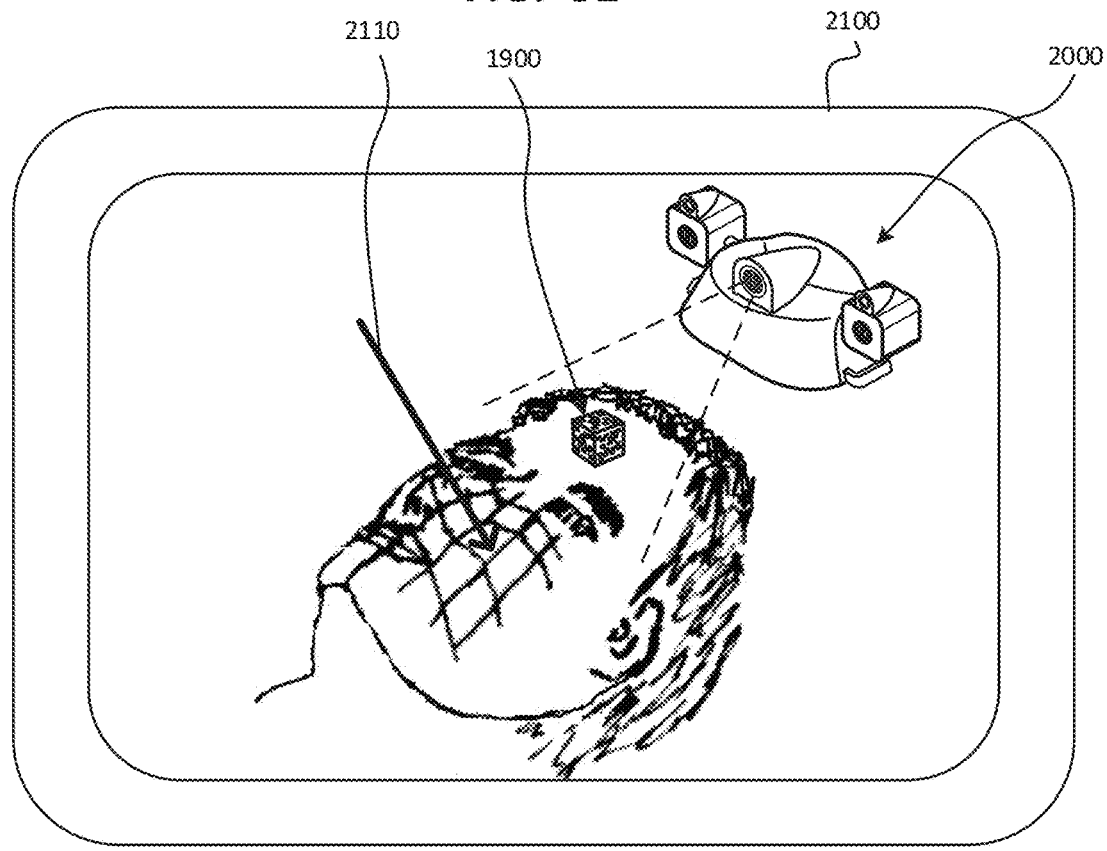
FIG. 33 illustrates a mobile camera/display device displaying the targeting system, patient anatomy, and visual reference or fiducial marker of FIG. 32 allowing for image overlay of targeting information and planned trajectory onto a live video feed.

FIG. 32 illustrates a targeting system 2000 that is detached from the patient with the visual reference 1900 (which may also be referred to as a fiducial marker, cube, or fiducial maker cube) of FIG. 31 coupled to the patient's forehead. The visual reference 1900 may have any shape (e.g., a cube, a pyramid, etc.) and may be used in place of, or in addition to, a structured light pattern reflected from the patient's face in order to track the relative orientation and position of a 3-D map of the patient's anatomy in actual physical space as the patient moves relative to the targeting system 2000 and/or the screen device 2100, as shown in FIG. 33 and discussed in more detail below. The use of a visual reference to track the patient's anatomy as it moves around in actual space may be faster than using the structured light pattern to track the patient's movements. This is due to the well-defined nature, high-contrast, and simple geometry of the visual reference 1900 in this example. Accordingly, in at least one embodiment, a first camera and a second camera may be configured to capture medical imaging data of the visual reference 1900 and a controller may be configured to receive the medical imaging data of the visual reference 1900 and continuously update the orientation of a three-dimensional map in space based on a current position of the visual reference 1900, and, based on the orientation of the three-dimensional map, determine an updated orientation of a first light source and a second light source to indicate an updated targeting line and an updated trajectory.

Another embodiment of the concept shown in FIG. 32 is to employ the aforementioned visual reference for tracking the position of the patient relative to an X-ray unit such as a fluoroscopic C-arm. The targeting system 2000 or its derivative with the camera system and structured light source can be mounted on part of the X-ray system as mentioned before, with the visual reference placed on part of the patient's anatomy that can be easily seen by the camera as the X-ray moved from AP to lateral position. To further help with position-locking and calibration of planar X-ray images, the visual reference could incorporate radio-opaque material of known geometry (a circle or sphere being the simplest geometry, however other geometries are contemplated) simultaneously with surface patterns. A particular embodiment would be an X-ray opaque sphere placed concentrically inside a cube. The X-ray tube tracked by the camera system can then be reference with the X-ray images of radio-opaque marker to further improve targeting accuracy.

FIG. 33 illustrates a screen device 2100 displaying the targeting system 2000, visual reference 1900, and patient shown in FIG. 32, including a virtual trajectory 2110, targeting line, or virtual planned trajectory. The screen device 2100 may be similar to the screen device 1800 of FIG. 30 and may include software that can interpret images of the cube to orient the 3-D map of the patient's surface anatomy in actual space as the anatomy part moves around relative to the screen device 2100. The screen device 2100 may also utilize the 3-D map for registration with other 3-D images of the patient (e.g., CT/MRI scans) in order to create and display augmented virtual images of the patient with overlays of planned trajectories and segmented anatomical structures hidden deep inside the patient onto an image or live video stream. This can help the operator visualize, target, and plan trajectories for structures deep inside the patient. FIG. 33 also shows an overlay of a virtual trajectory 2110 targeting a structure (not shown) inside the patient with the entry point of the trajectory on the outer surface of the patient (as can be seen by the tip of the virtual trajectory 2110 touching the face of the patient in FIG. 33). The virtual trajectory 2110 can help the operator visualize where/how to insert the medical instrument during the trajectory planning phase before the procedure begins and/or allow the operator to help monitor the procedure from a remote position while another physician performs the procedure, giving his/her guidance and confirmation to the physician that is performing the procedure.

Figure 34:
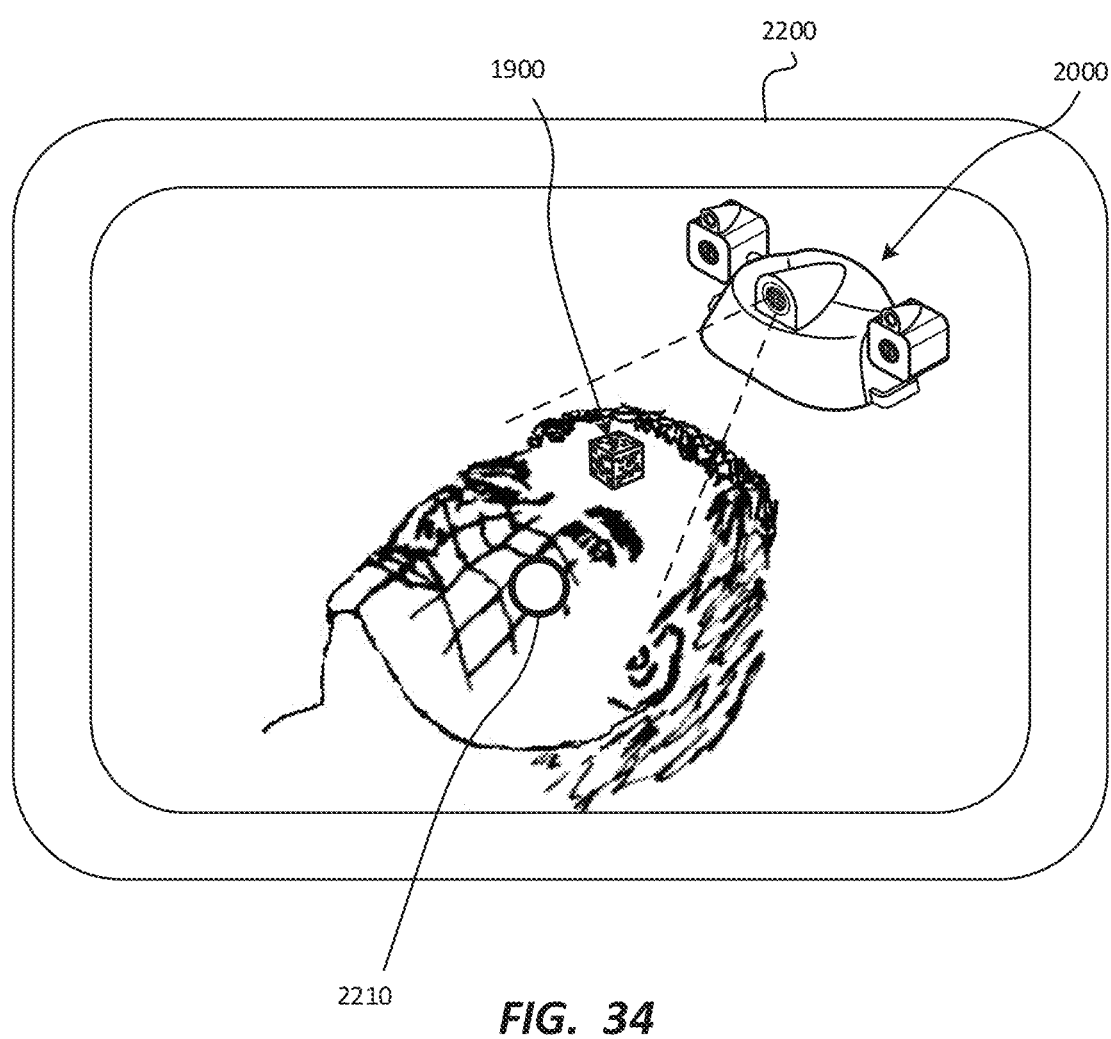
FIG. 34 illustrates a mobile camera/display device displaying the targeting system, patient anatomy, and visual reference or fiducial marker of FIG. 32 showing a "probe's eye view" of an aligned trajectory via manually positioning of the mobile device.

FIG. 34 illustrates a screen device 2200 displaying the targeting system 2000, patient, and visual reference 1900 of FIG. 32 showing a "probe's eye view" of an aligned trajectory over a guide probe 2210. In this embodiment, the operator may take the screen device 2200 and align the screen device 2200 directly over the trajectory such that the screen device 2200 is looking straight down the trajectory to the target inside the patient. This may be referred to as the "probe's eye view" of the trajectory, where the principal axis of the camera is aligned with the planned trajectory and/or the end of the guide probe 2210 (as indicated by the circle in FIG. 34). In the "probe's eye view," the tip and end of the guide probe 2210 line up with the planned trajectory, allowing additional guidance check capabilities. The software of the screen device 2200 may be configured to indicate to the operator when the screen device 2200 is positioned in the "probe's eye view" orientation (e.g., a visual indication may be generated on the display screen and/or a sound may be generated by the screen device 2200 to indicate when the screen device 2200 is positioned in the "probe's eye view" orientation). Once the screen device 2200 is positioned in the "probe's eye view" orientation, the operator may use this information to confirm that the guide probe 2210 is correctly oriented before proceeding with the surgical operation after visual feedback from laser reflections are obtained. This may also enable the operator to help monitor and teach other physicians during training sessions from a remote position.

Figure 35:
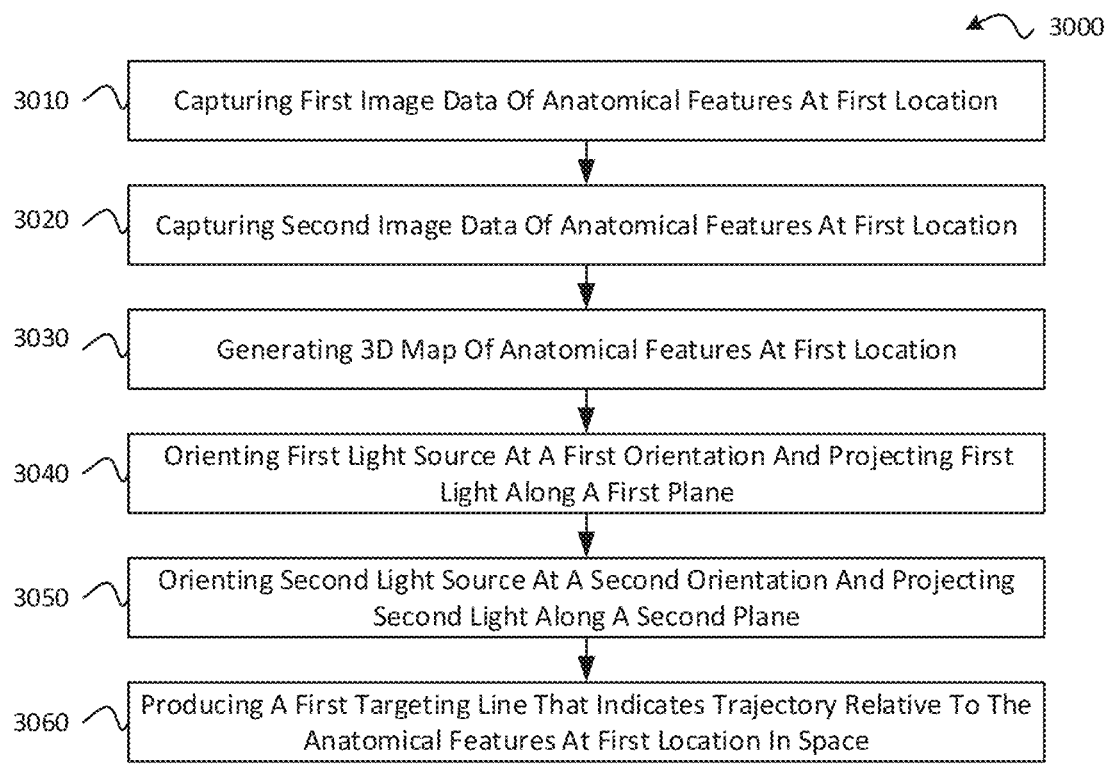
FIG. 35 is a block diagram of a method for providing visualization of a trajectory for a medical instrument, according to an embodiment of the present disclosure.

FIG. 35 is a block diagram of a method 3000 for providing visualization of a trajectory for a medical instrument, according to one embodiment of the present disclosure. The method 3000 may begin at a step 3010 in which first medical imaging data of anatomical features of a patient at a first location may be captured, and second medical imaging data of anatomical features of the patient at the first location may also be captured in a step 3020 of method 3000. Once the first and second medical imaging data have been captured, the method 3000 may then proceed to a step 3030 in which a 3-D map of the anatomical features of the patient at the first location in space may be generated. The 3-D map may then be registered with other medical imaging data and/or used to orient a first light source at a first orientation to project first light along a first plane in a step 3040, as well as orient a second light source at a second orientation to project second light along a second plane in a step 3050. The method 3000 may then proceed to a step 3060 in which a first target line is produced that indicates the trajectory relative to the anatomical features of the patient at the first location in space, and the method 3000 may end.

Figure 36:
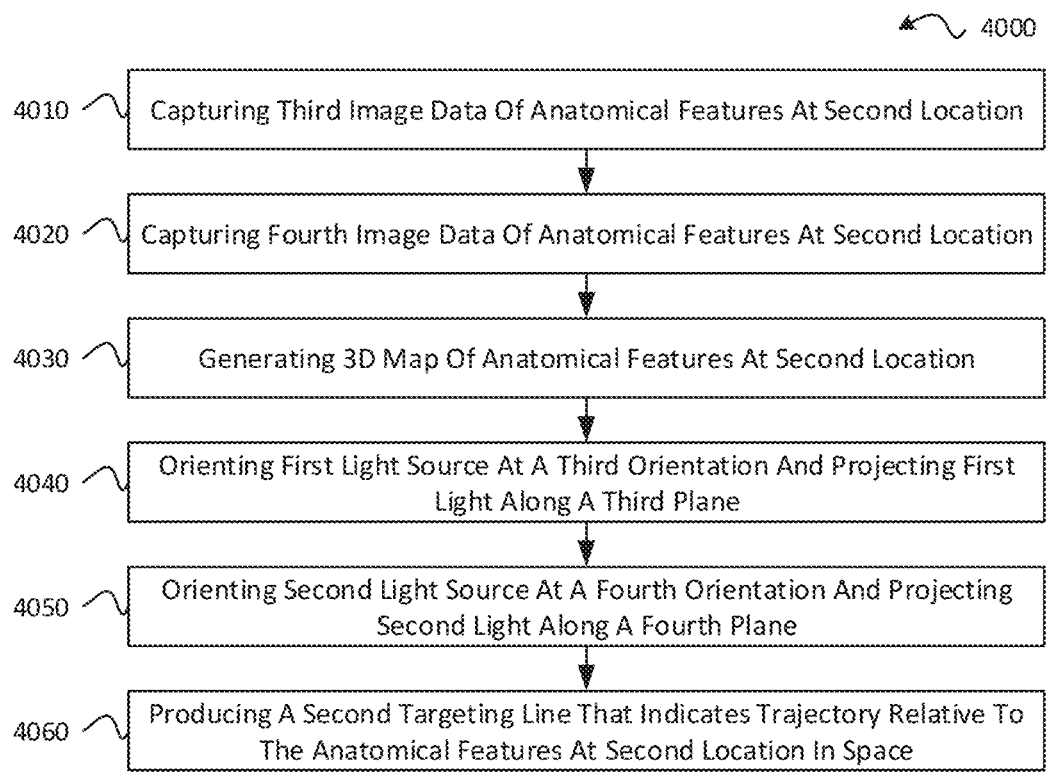
FIG. 36 is a block diagram of a method for providing visualization of an updated trajectory for a medical instrument, according to another embodiment of the present disclosure.

FIG. 36 is a block diagram of a method 4000 for providing visualization of an updated trajectory for a medical instrument, according to another embodiment of the present disclosure. The method 4000 may begin at a step 4010 in which third medical imaging data of anatomical features of a patient at a second location may be captured, and fourth medical imaging data of anatomical features of the patient at the second location may also be captured in a step 4020 of method 4000. Once the third and fourth medical imaging data have been captured, the method 4000 may then proceed to a step 4030 in which a 3-D map of the anatomical features of the patient at the second location in space may be generated. The 3-D map may then be registered with other medical imaging data and/or used to orient a first light source at a third orientation to project third light along a third plane in a step 4040, as well as orient a second light source at a fourth orientation to project fourth light along a fourth plane in a step 4050. The method 4000 may then proceed to a step 4060 in which a second target line is produced that indicates the trajectory relative to the anatomical features of the patient at the second location in space, and the method 4000 may end.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

General characteristics of targeting systems according to the present disclosure may include: light weight targeting systems (especially for image guidance system that rest upon a patient's skin or are otherwise attached to a patient); Lightweight materials, such as polymers, composites, lightweight metal alloys, or the like; Electronics miniaturization is also contemplated and on-board electronics may be surface-mounted with small footprints; Lightweight rechargeable batteries may also be used, such as lithium-polymer and/or lithium-ion batteries.

The disclosed technology is intended to be versatile and include a wide range of applications. The aforementioned examples are for illustration purposes only in order to facilitate understanding of concepts. They do not imply that the targeting systems and methods disclosed herein are restricted to only those procedures specifically described herein. Other applications are contemplated and include, but are not limited to, any other medical applications whereby the system may be utilized to target anatomical structures. This includes procedures such as: biopsy of tissues where an entry and target can be specified and the trajectory is planned to avoid critical neurovascular structures; Ablations or electrical stimulation procedures to target an area that cannot be directly visualized (e.g., rhizotomies, neuromodulation procedures, etc.); Joint injections such as knee/hip/shoulder or facet joint injections; Guidance and/or alignment of implants, etc.

For example, alignment of a hip prosthesis can be performed either with pre-operative cross-sectional imaging such as CT scanning or planar imaging taken intraoperatively using fluoroscopy. The system can provide trajectory information for alignment of an acetabular cap and femoral shaft, for example. Similarly, alignment of a knee replacement can be performed whereby the system guides the osteotomy cuts on the tibial or the femoral ends. Appropriate planning can be carried out on cross-sectional imaging preoperatively or intraoperatively on the fluoroscopy images. Other joint replacement procedures that can benefit from trajectory visualization include ankle, elbow, or shoulder replacements. Artificial intervertebral discs can be aligned using the targeting system to maintain anterior-posterior orientation, lateral orientation, and/or true midline position. For spinal fusion procedures, the targeting system can be used to align implants such as contact cages, bone grafts, anterior cervical plates, lateral spinal plates, pedicle screws, pars screws, facet screws, and the like.

The targeting systems and methods disclosed herein can also be used to guide other instruments. Examples include catheter placement procedures, whereby a rigid or semi-rigid catheter is directed at an anatomical target. Planning can be carried out on cross-sectional or planar imaging to define entry points, targets, and safe trajectories.

An external ventricular drain (EVD) for neurosurgical patients is an example of a catheter placement procedure that may benefit from trajectory visualization and planning to avoid injury to critical structures. Port planning for rigid endoscopes is another example of trajectory visualization of surgical instruments. The view through a rigid endoscope can be quite different depending on the placement of the endoscope port and the angle of the shaft. For hip or knee scopes, the ideal view can be planned ahead of time on either cross-sectional or planar imaging. The endoscope trajectory can then be calculated, and the entry port marked precisely.

The targeting systems and methods disclosed herein can also be used with ultrasound probes to integrate multiple imaging modalities. This allows the user to take advantage of the most optimal tissue visualization for a given procedure. For example, initial planning can be carried out via bony landmarks on X-ray or CT scans. Once a trajectory is defined, the soft tissue along that trajectory can be further visualized using an ultrasound probe with the probe's central axis directly along the planned trajectory.

The targeting systems and methods disclosed herein can also be used with existing image guidance systems. The laser components and controller may be mounted in various ways including, but not limited to, on the camera of image guidance systems, externally on fixed support structures, directly on the patient, and the like. The controller may interface with image guidance systems. Software integration may allow the image processing terminal (for optical based systems, this is usually a workstation connected to the camera) to be used for planning trajectories and laser position calculations. The data may then be output to the control unit to steer the light sources to their proper positions. In this configuration, the targeting system may augment the functionality of existing image guidance systems while ensuring the surgeon has his or her "eyes on patient" at all times.

Furthermore, the targeting systems and methods disclosed herein can be used with a variety of robot-assisted procedures. This may help the surgeon or surgical team visualize the planned trajectory, especially where a particular step must be performed manually. The manual step can be carried out using the targeting system in addition to the robotic arm's positioning to improve accuracy and speed.

Alternatively, a targeting system as described herein may be mounted on the end of a robotic arm. The robotic arm can be used to position the targeting system in the most optimal position. The rotation of the lasers (for example, roll and yaw) may allow additional degrees of freedom to position the robotic arm such that it will not get in the way of the user while maintaining trajectory visualization accuracy. An example includes robot-assisted hip replacement whereby a trajectory line can be projected before a specific step is carried out (e.g., reaming of the acetabulum). The surgeon can visually confirm the trajectory without the robotic arm blocking the view. The reamer can then be attached to the robotic arm, or the surgeon can carry out the reaming process manually with direct visualization of the ideal trajectory. Again, robot-assisted hip replacement is used here to illustrate the general concept, but this concept can be used in any robotic assisted procedures or processes.

The targeting systems and methods disclosed herein can also be used for non-medical applications to provide trajectory visualization. Examples include dental applications such as alignment of implant posts. Preoperatively taken panoramic X-rays or focused CT scans can be performed and planning may be carried out based on the images obtained from the X-rays or CT scans. Once the trajectories are planned, the targeting system, mounted on an X-ray arm or on the patient, can be used to visualize the trajectories. Other dental procedures include defining root canal trajectories and finding dental fractures.

The targeting systems and methods disclosed herein can be further expanded to industrial applications where certain manufacturing processes cannot be fully automated. In situations where an operator is required to perform a task and where trajectory alignment is critical, the targeting system can be used to provide trajectory visualization. The targeting system can be used with manual procedures such as drilling, welding, finishing, and fastening, to align the tool with a predefined trajectory to improve the quality of the finished product.

Figure 37A:
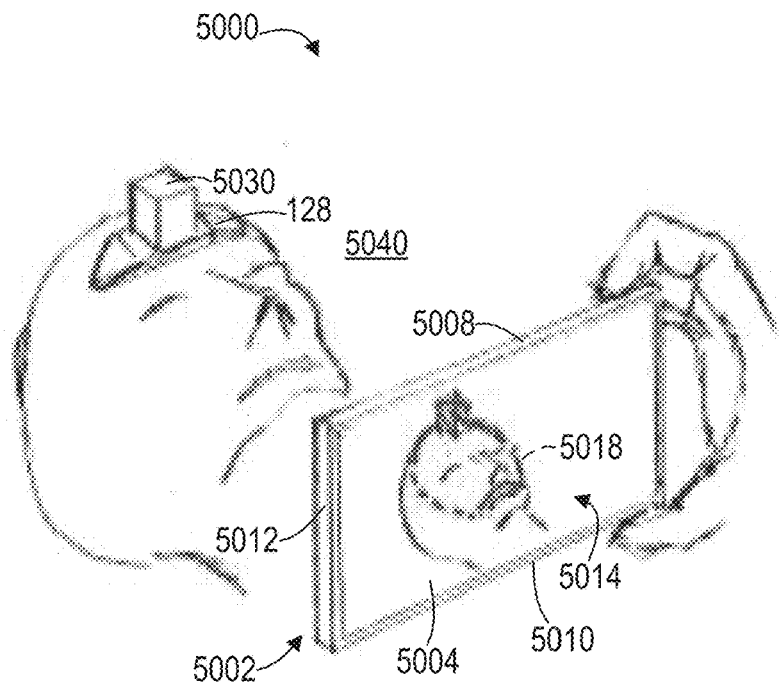
FIG. 37A illustrates an example of a portable/mobile imaging system scanning one or more anatomical features of a patient, according to an embodiment of the present disclosure.

FIG. 37A illustrates an example of a portable/mobile imaging system scanning one or more anatomical features of a patient, according to an embodiment. The portable imaging system 5000 may include a portable imaging device 5002.

In some embodiments, the portable imaging device 5002 may be a handheld screen device that may include a camera and a display. The portable imaging device 5002 may include, but not be limited to: a smart phone, a tablet, a workstation, a computer, a laptop, a PDA, a smart watch, etc., as previously described herein.

The portable imaging device 5002 may include a front surface 5004, back surface (not shown), top surface 5008, bottom surface 5010 and two side surfaces 5012.

The front surface 5004 may include a display device 5014 and the back surface may include one or more cameras (not shown). In some embodiments, the portable imaging system 5000 may include a visual reference 5030. The one or more cameras may be directed at the surgical field 5040 and/or the visual reference 5030. The visual reference 5030 may be placed on a patient within a surgical field 5040. In some embodiments, the visual reference 5030 may be positioned on a baseplate 128 similar to embodiments of a baseplate 128 described above.

FIG. 37A illustrates a user holding the portable imaging device 5002 in front of the patient, in this example, the head is the anatomy of interest. The visual reference 5030 is attached to the baseplate 128 and an optical camera of the portable imaging device 5002 on the back surface recognizes the high contrast surface features of the visual reference 5030 and automatically identifies the vertices. This is indicated by the red color outlining of the visual reference 5030 in FIG. 37A. Based on the location, position, and/or orientation of the visual reference 5030, a region of interest 5018 (shown by the red dashed lines). The region of interest 5018 may define an area within which to perform surface mapping.

In some embodiments, the portable imaging device 5002 may utilize machine vision, machine learning, and/or artificial intelligence technologies to define and/or identify the region of interest 5018 and/or any anatomical feature(s) of interest of the patient.

In some embodiments, the portable imaging device 5002 may utilize machine vision, machine learning, and/or artificial intelligence technologies to learn from user inputted trajectories for a particular procedure. After a sufficient training dataset has been obtained, the system may provide "recommended" trajectories for that particular procedure (e.g., EVD insertion). In some embodiments, the user may provide some degree of input to guide the portable imaging device 5002 in generating the recommended trajectories (e.g., via a semi-automated machine vision, machine learning, and/or artificial intelligence process).

In some embodiments, the portable imaging device 5002 may present a drop-down menu to a user that enables the user to select different anatomical structures of interest that can be used to define the region of interest 5018. Alternatively, or in addition, the portable imaging device 5002 may autodetect a closest matching anatomy within a field of view and suggest this anatomy to the user.

In some embodiments, the surface mapping operation may result in generation of a 3-D surface map. The 3-D surface map may provide a topography of anatomical parts, anatomical features, and/or other structures within, connected to, or including the region of interest 5018. Once surface mapping is completed, the portable imaging device 5002 may register the surface map to a patient's medical scan (i.e., medical imaging) using registration methods described herein. In some embodiments, the 3-D surface map may be generated based on surface data determined by the portable imaging device 5002.

Figure 37B:
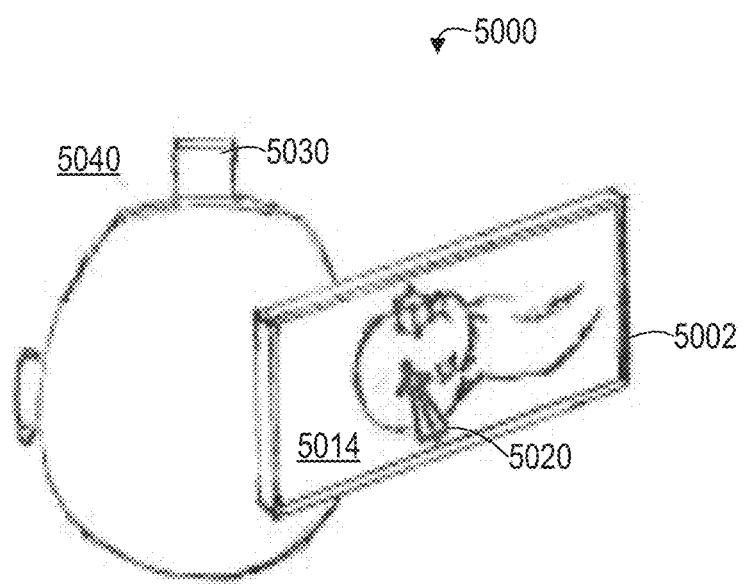
FIG. 37B illustrates an example of the portable/mobile imaging system FIG. 37A providing an augmented reality visualization, according to an embodiment of the present disclosure.

FIG. 37B illustrates an example of the portable/mobile imaging system of FIG. 37A providing an augmented reality visualization. FIG. 37B illustrates a stage in which a 3-D surface map of a patient's head has been generated and this 3-D surface map has been registered with one or more other medical imaging scans, for example by medical image processing. Suppose, for example, that preoperative medical imaging scans include a CT scan that identifies a lesion within the patient's head. Because the CT scan is registered to the 3-D surface map, as a user points the portable imaging device 5002 at the patient, the portable imaging device 5002 can display an indicator 5020 that identifies where the legion is within the patient via an image of the patient captured during a surgical procedure. In the illustrated embodiment, the indicator 5020 is implemented as arrow.

In some embodiments, the image may be a still image captured by one or more cameras of the portable imaging device 5002 during the operation. In some embodiments, the image may be a series of images taken in time sequence, or a video or a live video feed that shows the patient and the anatomical part together with an augmented reality overlay visualization of the indicator 5020 that may point to, or identify, where the lesion is within the patient's head. In some embodiments, the indicator 5020 may be an arrow, with the arrowhead positioned on the location of a lesion and the arrow tail extending from the lesion. In another embodiment, the indicator 5020 may be an arrow indicating a trajectory for a surgeon to use as an entry way for conducting a step of a surgical procedure. In another embodiment, the indicator 5020 may be an arrow indicating a targeting line for a surgeon to use for conducting a step of a surgical procedure. In still other embodiments, the indicator 5020 may be a visual representation of the lesion positioned in the live video feed at the proper location within the head of the patient.

In some embodiments, by continuously tracking the visual reference 5030, the indicator 5020 (e.g., targeting line) which may have been derived from a preoperative plan based on the patient's medical CT image, can be overlaid in the correct position and perspective on the display device 5014 of the portable imaging device 5002. Alternatively, or in addition, the visual reference 5030 may be removed and replaced by a laser guidance system (e.g., system 10, 310, 410, 510, or 910 discussed above), which may be attached to the baseplate 128 to provide direct optical visualization of a trajectory in real 3-D space for a step in a surgical procedure.

Figure 38:
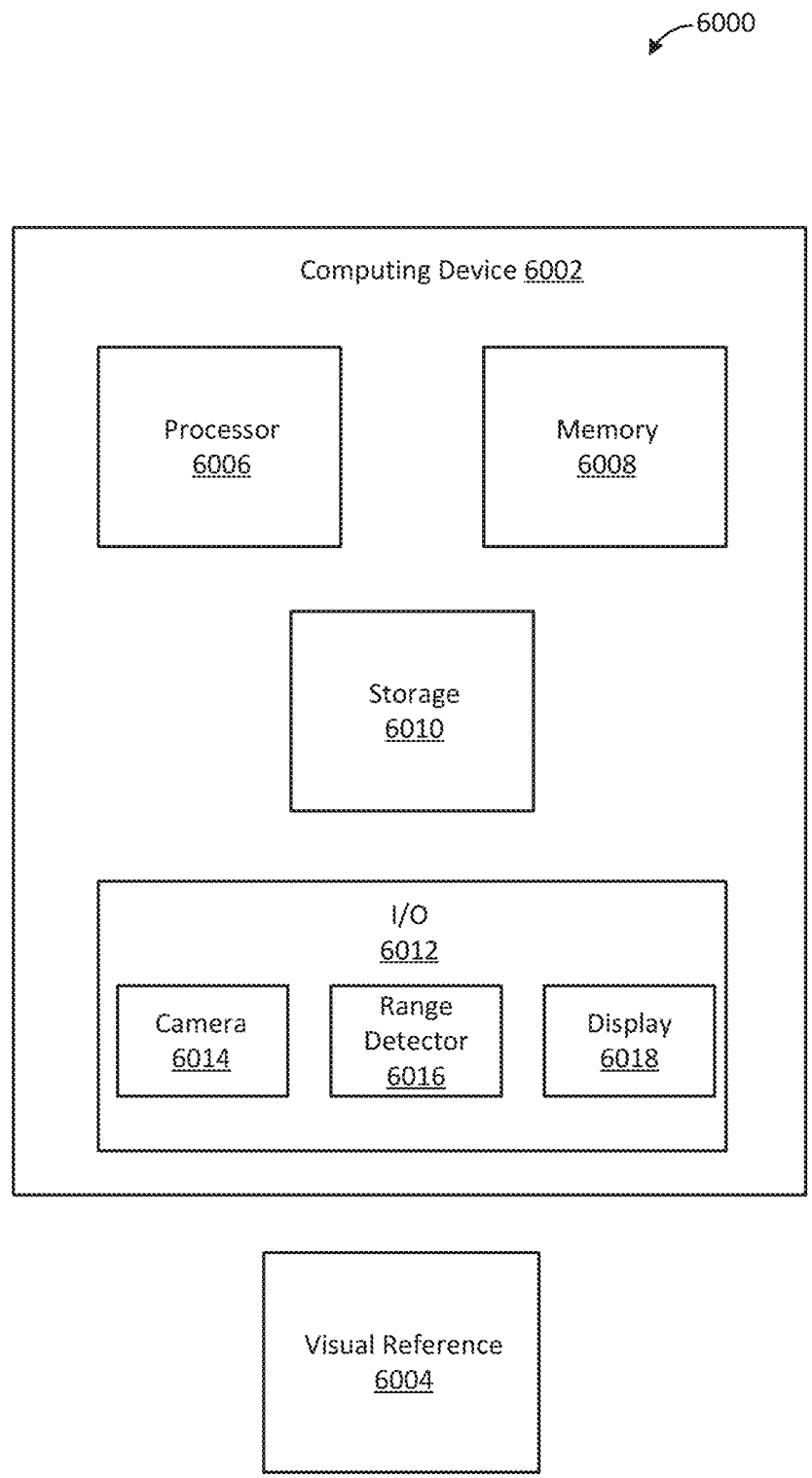
FIG. 38 is a schematic block diagram illustrating an embodiment of a portable imaging system, according to an embodiment of the present disclosure.

FIG. 38 is a schematic block diagram illustrating an embodiment of a portable imaging system 6000 according to an embodiment of the present disclosure. The portable imaging system 6000 may include a computing device 6002 and a visual reference 6004.

In various embodiments, the computing device 6002 may refer to any electronic device capable of computing by performing arithmetic or logical operations on electronic data. For example, the computing device 6002 may be the portable imaging device 5002, a server, a workstation, a desktop computer, a laptop computer, a tablet, a smartphone, a control system for another electronic device, a network attached storage device, a block device on a storage area network, a router, a network switch, or the like. In certain embodiments, the computing device 6002 may include a non-transitory, computer readable storage medium that stores computer readable instructions configured to cause the computing device 6002 to perform steps of one or more of the methods disclosed herein.

In the depicted embodiment, the computing device 6002 may include a processor 6006, a memory 6008, storage 6010, and an input/output module 6012. The processor 6006 may be coupled to a system bus. In various embodiments, a processor 6006 may refer to any electronic element that carries out the arithmetic or logical operations performed by the computing device. For example, in one embodiment, the processor 6006 may be a general-purpose processor that executes stored program code. In another embodiment, a processor 6006 may be a field-programmable gate array (FPGA), an application-specific integrated circuit (ASIC), or the like, that operates on data stored by the memory 6008 and/or the storage 6010. In a certain embodiment, a processor 6006 may be a controller or medical image processor designed specifically for performing medical image processing.

In some embodiments, the memory 6008 may be coupled to the processor 6006 by a memory bus. In certain embodiments, the memory 6008 may store data that is directly addressable by the processor 6006. In various embodiments, a memory 6008 may include one or more types of memory media for storing data, such as dynamic random access memory (DRAM), MRAM, or the like. The storage 6010, in one embodiment, is coupled to the processor 6006 by a storage bus. In certain embodiments, the storage bus may be a peripheral bus of the computing device 6002, such as a peripheral component interconnect express (PCI Express or PCIe) bus, a serial Advanced Technology Attachment (SATA) bus, a small computer system interface (SCSI) bus, a FireWire bus, a Fibre Channel connection, a Universal Serial Bus (USB), a PCIe Advanced Switching (PCIe-AS) bus, or the like. In various embodiments, the storage 6010 may store data that is not directly addressable by the processor 6006, but that may be accessed via one or more storage controllers. In certain embodiments, the storage 6010 may be larger than the memory 6008. In various embodiments, a storage 6010 may include one or more types of storage media for storing data, such as a hard disk drive, NAND flash memory, MRAM, or the like.

In some embodiments, the input/output module 6012 may be coupled to the processor 6006 by a system bus. The input/output module 6012 (I/O) may include one or more of hardware, software, firmware, and/or logic devices configured to receive input (e.g., data) from outside the computing device 6002 and convey output (e.g., data) to a system, network, network device, component, module, computing device, or user outside the computing device 6002. A variety of components, systems, subsystems, units, and/or devices may connect to or be included in the input/output module 6012. Examples of these I/O devices include, but are not limited to, a touch screen, a keyboard, a mouse, a visual display, a printer, a camera, a range detector, a button, a joystick, a game controller, and the like.

The input/output module 6012 may include one or more cameras 6014, a range detector 6016, and a display device 6018. The one or more cameras 6014 may be similar to the one or more cameras described above. In one embodiment, the one or more cameras 6014 may be optical cameras similar to those used in mobile phones and other mobile devices. For example, the one or more cameras 6014 may include a variety of features, such as: optical zoom up to 5×, digital zoom up to 12×, optical zoom in to 2.5×, a 4× optical zoom range, a telephoto lens with f/2.2 aperture, a wide lens with f/1.6 aperture, an ultra-wide lens with f/2.4 aperture and 120 degree field of view, capture 12 MP of image data, and the like. These features may be implemented using one camera or a collection of two or more cameras. In addition to one or more optical cameras, the one or more cameras 6014 may also include a variety of other sensors and/or devices to support the features of the one or more cameras 6014. For example, the one or more cameras 6014 may include an infrared camera, a near-infrared (NIR) camera, an ambient light sensor, a dot projector, a proximity sensor, an accelerometer, and the like. The one or more cameras 6014 may capture images and/or video and/or produce a live video feed for use in generating a 3-D surface map and processing image data within a surgical field.

The range detector 6016 may be implemented using one or more sensors. In one embodiment, the range detector 6016 may be a LiDAR sensor that emits an infrared laser and calculates depth information for objects in a field of view based on reflections of infrared light. The range detector 6016 can determine a distance between the range detector 6016 and the visual reference 6004 and other anatomical features in a field of view. In addition to determining this distance, the range detector 6016 may also be configured to identify the visual reference 6004 within medical imaging data.

The display device 6018 may display visual information including graphics, images, video, live streaming video as well as user interface features. The display device 6018 may comprise a display screen integrated into the computing device 6002. Alternatively, or in addition, the display device 6018 may be a display device external to the computing device 6002 such as a monitor or large screen display. In certain embodiments, the display device 6018 may include a touch screen sensor that enables a user to interact with user interface elements to manage and/or control the computing device 6002.

The visual reference 6004 may be utilized to facilitate registration by placing the visual reference 6004 in a known predetermined location relative to the patient or anatomical part of the patient in a surgical field. The visual reference 6004 may have a variety of shapes. In certain embodiments, the visual reference 6004 may include one or more visual reference 6004 objects or markers. In certain embodiments, a visual reference 6004 may not be used and instead registration may be performed using other methods, systems, or structures.

Figure 39:
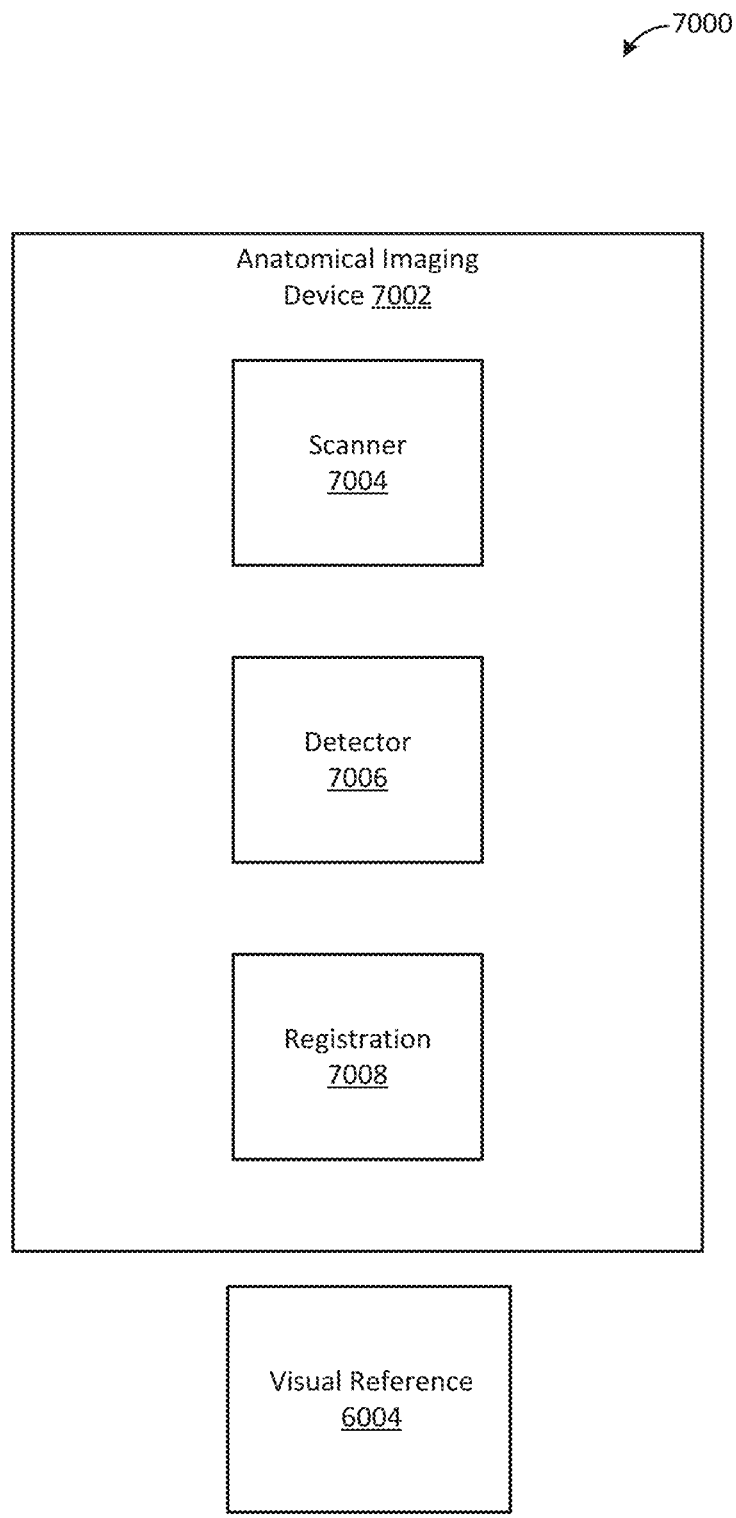
FIG. 39 is a schematic block diagram illustrating an embodiment of a portable imaging system, according to an embodiment of the present disclosure.

FIG. 39 is a schematic block diagram illustrating an embodiment of a portable imaging system 7000. The portable imaging system 7000 may include a variety of modules, hardware, software, and firmware that may operate on, in, or in connection with one or more of the hardware components described in relation to FIG. 38 and/or the portable imaging device 5002. The portable imaging system 7000 may include an anatomical imaging device 7002 that may include similar components and features to the computing device 6002 and/or the portable imaging device 5002. In one embodiment, the anatomical imaging device 7002 may be implemented using an iPhone® (e.g., such as the iPhone® 12 Pro/Pro Max available from Apple Computer, as one non-limiting example). Of course, other mobile phones or devices may also be used to implement the anatomical imaging device 7002, as previously described herein.

In one embodiment, the anatomical imaging device 7002 includes a scanner 7004, a detector 7006, and an image registration module 7008 which may cooperate to scan and register preoperative medical images to at least one anatomical feature of a patient. Each of the scanner 7004, detector 7006, and image registration module 7008 may use one or more of the processor 6006, memory 6008, storage 6010, input/output module 6012, one or more cameras 6014, range detector 6016, and/or display device 6018. Alternatively, or in addition, each of the scanner 7004, detector 7006, and image registration module 7008 may exchange medical imaging data with one or more servers, systems, or displays to scan and register preoperative medical images to at least one anatomical feature of a patient.

In one embodiment, the scanner 7004 may gather medical imaging data from a surgical field. In some embodiments, the scanner 7004 may emit any form of electromagnetic radiation (e.g., visible light, infrared light, etc.) to gather medical imaging data from the surgical field with a camera associated with the scanner 7004. A user may direct the one or more cameras or light detectors toward the surgical field in order to detect the electromagnetic radiation and gather the medical imaging data. In addition, a user may move the anatomical imaging device 7002 within the area of the surgical field to provide other views or perspectives of the patient and/or visual reference 6004. An example of this would be the technique of photogrammetry where 3-D mapping may be achieved using a series of 2-D images taken at different perspectives to the object of interest. Alternatively, or in addition, the anatomical imaging device 7002 may be mounted on stabilization equipment, such as a tri-pod or the like, as the scanner 7004 gathers medical imaging data.

The detector 7006 may detect one or more features. In some embodiments, the detector 7006 may comprise a camera, or may be in electronic communication with a camera and/or the scanner 7004. In one embodiment, the detector 7006 may determine at least one anatomical feature of the patient. In some embodiments, the detector 7006 may process the medical imaging data gathered by the scanner 7004 to determine the at least one anatomical feature. In some embodiments, the detector 7006 may apply a variety of techniques to isolate and confirm the at least one anatomical feature of the patient. Alternatively, or in addition, the detector 7006 can also serve as a visual reference detector that may identify a visual reference 6004 within the medical imaging data.

The image registration module 7008 may register one or more preoperative medical images to at least one anatomical feature of the patient based on the gathered medical imaging data. Due to proper registration between the location of the at least one anatomical feature and the preoperative medical images, the anatomical imaging device 7002 may then provide a variety of visual and/or guidance features to enhance a surgeon's skills, options, and capabilities during a surgical operation.

In certain embodiments, the image registration module 7008 may register a single medical image or medical scan. Alternatively, or in addition, the image registration module 7008 may register a plurality of medical images. The medical image(s) used for registration may be of a current patient earlier in time (both preoperative and/or intraoperative). Alternatively, the medical image(s) used for registration may be of one or more other subjects.

Figure 40:
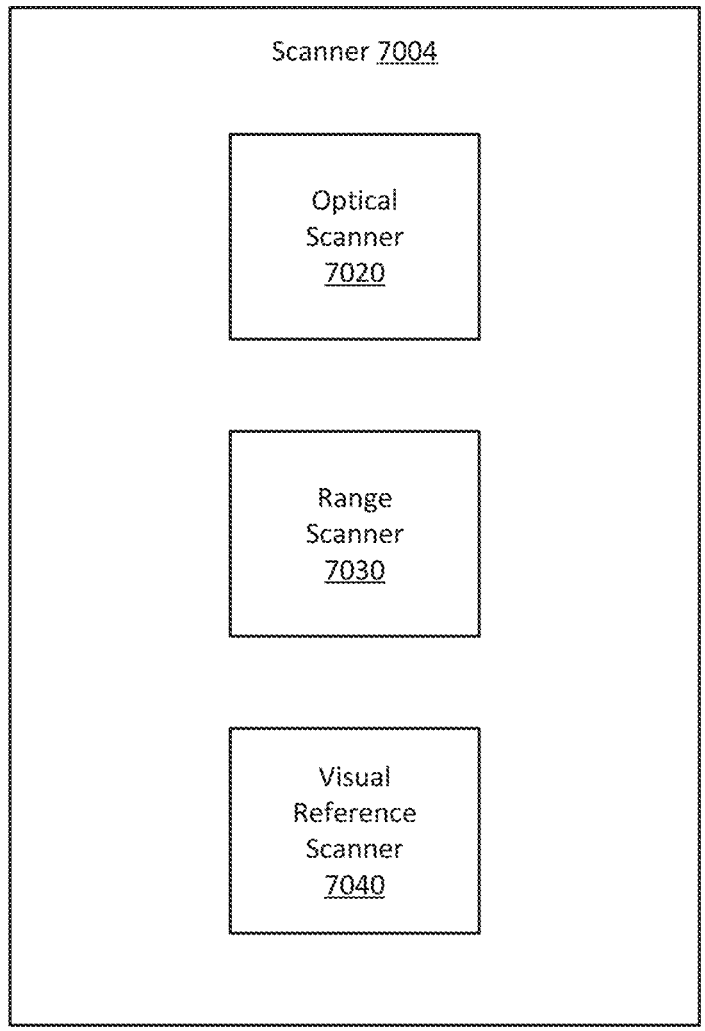
FIG. 40 is a schematic block diagram illustrating an embodiment of a scanner, according to an embodiment of the present disclosure.

FIG. 40 is a schematic block diagram illustrating an embodiment of a scanner 7004. The scanner 7004 may include a variety of cameras, sensors, and/or scanners that cooperate and coordinate to gather medical imaging data. In one embodiment, the scanner 7004 may include an optical scanner 7020, a range scanner 7030, and a visual reference scanner 7040.

The optical scanner 7020 may serve to capture images of a patient and other structures within a surgical field. The images may be visual to humans or may be invisible to humans but made visible by applying a filter or overlay to the image data. The optical scanner 7020 may capture a single image, a plurality of images, and/or video. The images or video may be captured using a variety of resolutions and may be in black and white, color, and/or a grayscale. Alternatively, or in addition, the optical scanner 7020 may also capture images produced using other wavelengths along the electromagnetic spectrum including infrared, near infrared, ultraviolet, x-rays, and the like. The optical scanner 7020 may include one or more cameras 6014, one or more processors, sensors, emitters, lasers, controllers, digital circuits, firmware, and/or software that cooperate to capture medical images.

The range scanner 7030 may serve to determine a distance between the scanner 7004 and one or more objects in the field of view, such as in a surgical field. The range scanner 7030 may include one or more cameras 6014, one or more processors, sensors, emitters, lasers, controllers, digital circuits, firmware, and/or software that may cooperate to gather depth information. The depth information may be used to determine a z-position for objects within the field of view. The depth information may also be referred to as range data. The range scanner 7030 may use one or more technologies to gather range data including LiDAR, sonar, radar, and the like.

The visual reference scanner 7040 may serve to locate, track, and/or identify one or more visual reference(s) within the field of view, such as in a surgical field. The visual reference scanner 7040 may include one or more cameras 6014, one or more processors, sensors, emitters, lasers, controllers, digital circuits, firmware, and/or software that cooperate to locate, identify, and/or track one or more visual references. The visual reference scanner 7040 can include calibration information and/or adjustment features such that the distance and position of a visual reference in the field of view can be determined to within an acceptable range of error. The visual reference scanner 7040 can be configured to provide coordinates for the visual reference and one or more parts of the visual references (e.g., vertices, surfaces, a midpoint, a center point) to other components of a portable imaging system 7000.

Figure 41:
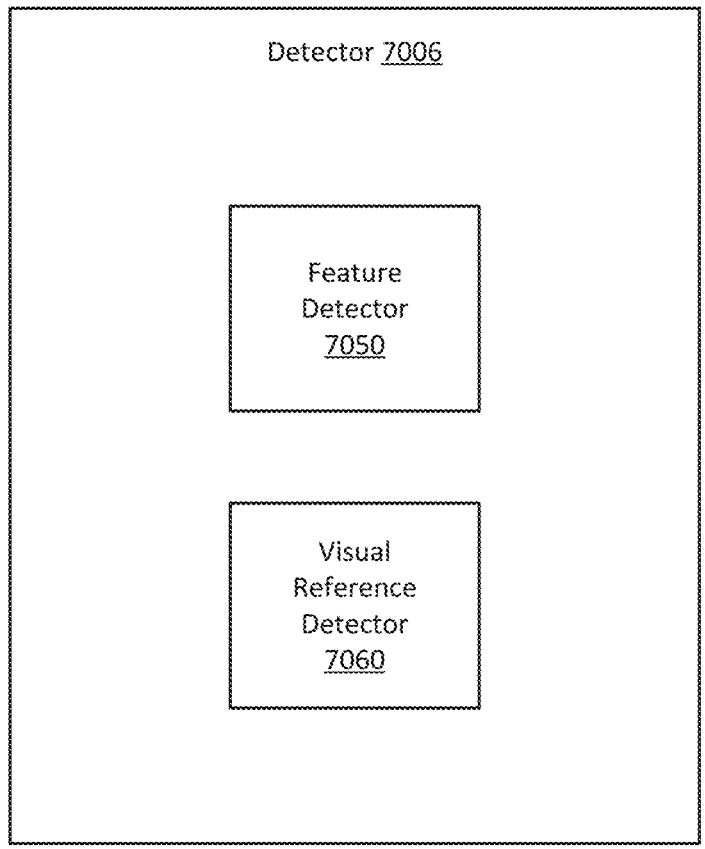
FIG. 41 is a schematic block diagram illustrating an embodiment of a detector, according to an embodiment of the present disclosure.

FIG. 41 is a schematic block diagram illustrating one embodiment of a detector 7006. The detector 7006 may include a variety of cameras, sensors, and/or scanners that cooperate and coordinate to detect or identify structures, features, or objects. In one embodiment, the detector 7006 may include a feature detector 7050 and a visual reference detector 7060.

The feature detector 7050 may serve to detect, identify, and/or determine one or more anatomical features of a patient or individual. The feature detector 7050 may analyze imaging data, such as medical imaging data. In certain embodiments, the medical imaging data may be a set of data that a computing device can display as a visual image. In addition, medical imaging data can include other data (metadata) that describes, relates to, or is associated with data of medical imaging data that can be displayed visually.

The feature detector 7050 may include one or more processors, controllers, digital circuits, firmware, and/or software that may cooperate to locate, determine, or identify one or more anatomical features. The feature detector 7050 can include calibration information and/or adjustment features such that the degree of error (e.g., false identification) of anatomical features may be kept at or below an acceptable level. The feature detector 7050 may provide a label, an outline, or other message to the portable imaging system 7000 to identify the anatomical features located/identified.

In some embodiments, the feature detector 7050 may communicate with a system or database configured to facilitate anatomical feature determination. Alternatively, or in addition, the feature detector 7050 may use machine learning or artificial intelligence methods to identify one or more anatomical features in the medical imaging data, as previously discussed.

The visual reference detector 7060 may serve to identify, determine, and/or detect one or more visual references within a field of view. In one embodiment, the visual reference detector 7060 may use techniques that compare intensity of waves, such as light waves, reflected off of surfaces of the visual references. The visual reference detector 7060 may coordinate with the range scanner 7030 to facilitate identification of visual references. The visual reference detector 7060 may process medical imaging data. The medical imaging data may come from preoperative medical images. The visual reference detector 7060 may include one or more processors, controllers, digital circuits, firmware, and/or software that cooperate to locate, determine, or identify one or more visual references.

Figure 42:
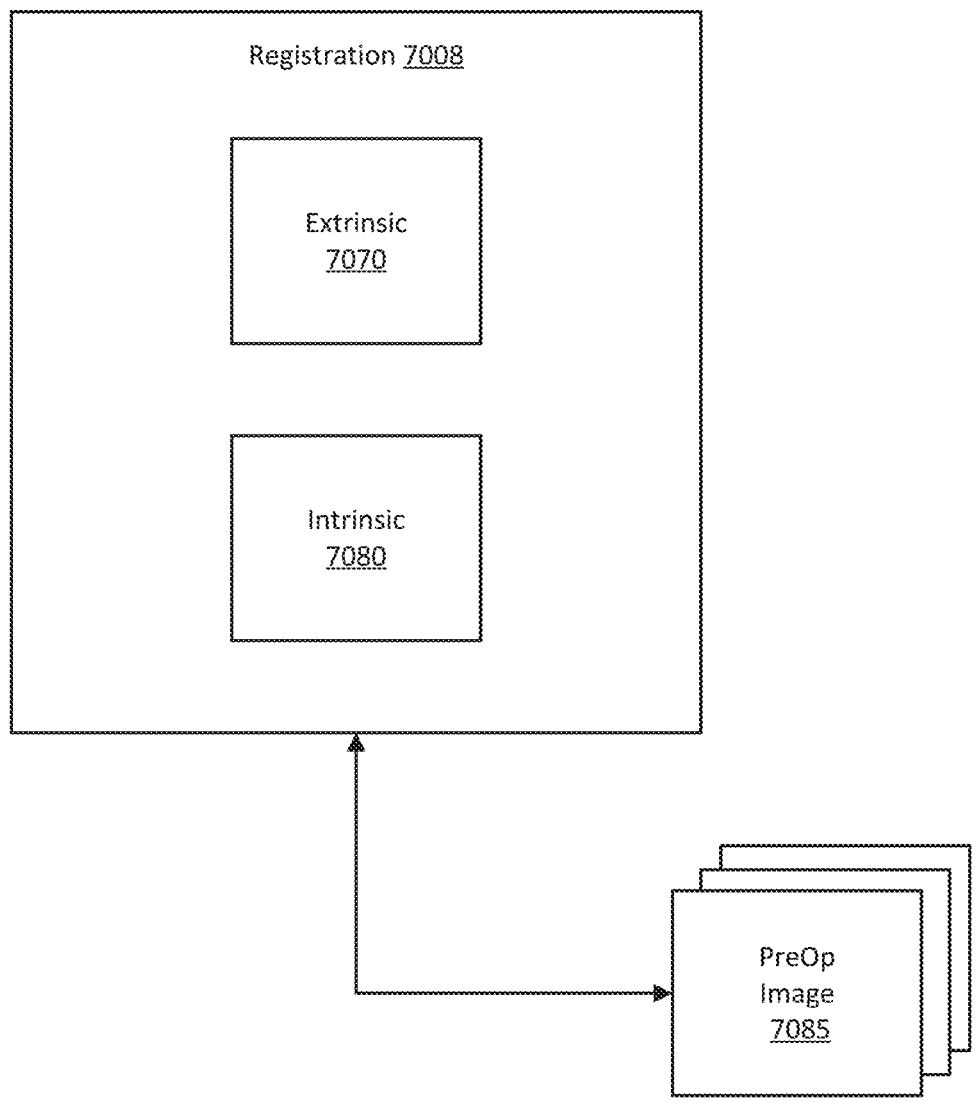
FIG. 42 is a schematic block diagram illustrating an embodiment of a registration module, according to an embodiment of the present disclosure.

FIG. 42 is a schematic block diagram illustrating an embodiment of an image registration module 7008. The image registration module 7008 may register one or more preoperative medical images to at least one anatomical feature of a patient based on medical imaging data, such as medical imaging data gathered by the scanner 7004. In one embodiment, the scanner 7004 may gather medical imaging data once and then the medical images may be registered in relation to the medical imaging data. In another embodiment, the scanner 7004 may continuously scan a surgical field and gather medical imaging data. This continuously updated set of medical imaging data may be used to enable intraoperative adjustments to the registration, for example to support such features are deformable registration to account for tissue shift (e.g., when fluid within a tissue accumulates and/or drains from the tissue causing deformation of the tissue's shape, etc.). The image registration module 7008 may include an extrinsic registration module 7070 and an intrinsic registration module 7080.

In some embodiments, the extrinsic registration module 7070 may perform some, or all, of the registration operation between the physical space that includes the patient (e.g., the surgical field) and one or more medical images. In one embodiment, the extrinsic registration module 7070 may leverage the existence of one or more visual references in the field of view. In particular, the extrinsic registration module 7070 may include information about the exact distance of the visual reference from the portable imaging system 7000 and/or position of the visual reference within the field of view and/or in relation to patient or anatomical features of the patient. For example, the extrinsic registration module 7070 may have information indicating that the visual reference is positioned on the forehead of the patient. Furthermore, the extrinsic registration module 7070 may have information about the size, shape, orientation, and/or any surface characteristics of the visual reference.

Given known information about the visual reference, the extrinsic registration module 7070 may determine a region of interest and/or identify anatomical (or other) landmarks on or about the patient. The extrinsic registration module 7070 may then use the known information and information within the medical images to register the coordinate system of the medical images to a coordinate system for the physical space that includes the patient. The extrinsic registration module 7070 may include, and/or communicate with, one or more processors, controllers, digital circuits, firmware, and/or software that cooperate to perform part or all of the registration of the physical space with the medical images.

The intrinsic registration module 7080 can perform some, or all, of the registration operation between the physical space that includes the patient (e.g., the surgical field) and one or more medical images. In one embodiment, the intrinsic registration module 7080 may leverage information present within the medical images to facilitate registration between the physical space of the patient and the medical images. For example, the intrinsic registration module 7080 may use facial recognition methods to detect such landmarks as a nose, eyes, mouth, etc., in the medical images. The intrinsic registration module 7080 may then use these landmarks to register the medical images amongst themselves and/or to the physical space of the patient.

In one embodiment, the intrinsic registration module 7080 may cooperate with the extrinsic registration module 7070 to perform, or complete, registration of the medical images to the physical space of the patient. For example, the extrinsic registration module 7070 may coordinate with the range scanner 7030 and the visual reference detector 7060 to determine a precise position of the visual reference within the field of view. The intrinsic registration module 7080 may automatically detect a patient's nose in the medical images and in the physical space.

With the known position of the visual reference and detection of the patient's nose, the intrinsic registration module 7080 and extrinsic registration module 7070 may together register the physical space to the medical images. Alternatively, or in addition, the intrinsic registration module 7080 and/or extrinsic registration module 7070 may also use other information about the physical space such as a position and orientation of the optical scanner 7020 and/or an age and gender of the patient which may assist in completing the registration.

FIG. 42 illustrates the image registration module 7008 accessing one or more preoperative medical images 7085. The preoperative medical images 7085 may reside within memory 6008 or storage 6010 of a computing device 6002 used to implement the portable imaging system 7000. Alternatively, or in addition, the preoperative medical images 7085 may reside within another suitable repository in communication with the image registration module 7008 such as for example a database, a server connected via a network, a PACS server, or the like. In certain embodiments, the image registration module 7008 may access DICOM files for a particular patient or a number of subjects and use these DICOM files as the medical images for registration.

Figure 43:
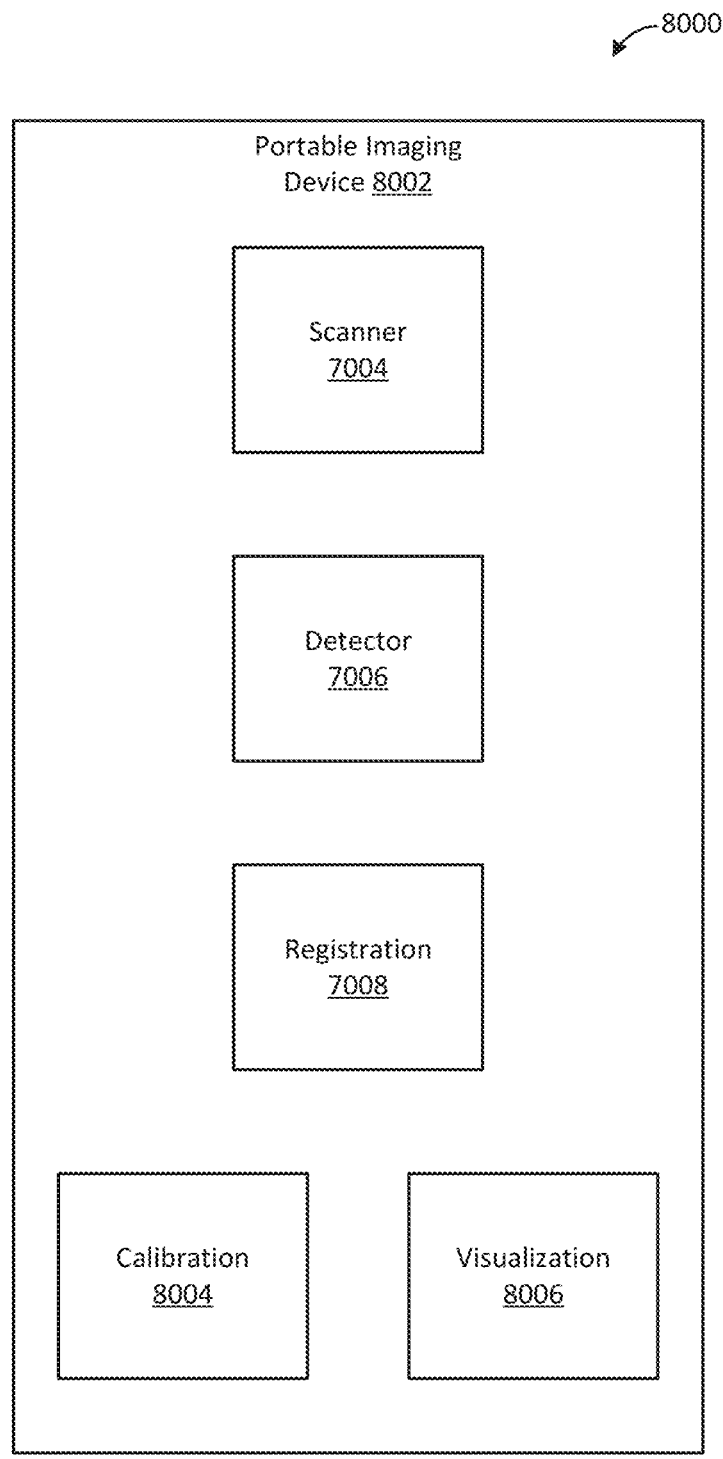
FIG. 43 is a schematic block diagram illustrating an embodiment of a portable imaging system, according to an embodiment of the present disclosure.

FIG. 43 is a schematic block diagram illustrating a portable imaging system 8000 according to an embodiment. The portable imaging system 8000 may include structures, features, modules, components, functions, operations, and a configuration similar to that of other portable imaging systems described herein. Where these aspects may be substantially similar, like numerals may be utilized to identify corresponding parts. For example, the portable imaging system 8000 may include a portable imaging device 8002 having a scanner 7004, detector 7006, and an image registration module 7008. In some embodiments, the portable imaging device 8002 may include similar features, hardware, and/or other components to the anatomical imaging device 7002.

In some embodiments, the portable imaging system 8000 may also include a calibration module 8004 and a visualization module 8006. The calibration module 8004 may measure the accuracy of the scanner 7004, the detector 7006, and/or the image registration module 7008 in relation to an industry standard for medical imaging standards and image registration. The calibration module 8004 may include data that identifies the position of each scanner, sensor, camera, emitter, transceiver, and component within the portable imaging device 8002 relative to each other component. This data may also identify the size, shape, orientation, and position (e.g., via global positioning satellite (GPS) sensors and/or accelerometers) of the portable imaging device 8002 relative to the patient and/or equipment the patient is on (an operating table).

The calibration module 8004 may determine whether any errors exist in the calculations, measurements, determinations, and sensed data gathered or determined by the portable imaging device 8002 by comparing this information with national standards, measures, or measurements taken with instruments having an accepted level of accuracy. The calibration module 8004 may then determine if any determined errors are outside an acceptable level. If so, the calibration module 8004 may provide adjustment instructions to the portable imaging device 8002 to correct for those errors such that registration of medical images using the portable imaging device 8002 may be as accurate as possible. In certain embodiments, the calibration module 8004 may include an instrument having a known accuracy and the calibration module 8004 may operate this instrument to get reference data that can be used to determine if measurements of the portable imaging device 8002 are of acceptable accuracy.

In determining accuracy of the portable imaging device 8002, the calibration module 8004 may operate certain sensors and other components of the portable imaging device 8002. For example, the portable imaging device 8002 may operate the one or more cameras 6014, the range detector 6016, the display device 6018, etc.

The visualization module 8006 may also operate the one or more cameras 6014, the range detector 6016, the display device 6018, etc., to enhance the visualizations, targeting, and/or trajectory information provided to a user. The visualization module 8006 can provide one or more indicators or markers to aid a surgeon in performing one or more steps in a procedure. For example, the visualization module 8006 can show a real time image of the patient and include an arrow indicating the position of a lesion or an arrow showing a predetermined entry point for a procedure, etc.

In certain embodiments, the visualization module 8006 can provide an augmented reality experience for the user by showing real time video of a patient in the surgical field overlaid with other visual imagery and/or data. The visual imagery may come directly from the medical imaging or may be based on data from the medical imaging.

In one embodiment, the visual imagery overlaid on a live view of the surgical field may include segmentation views or an anatomical feature positioned within the live view images in the correct location for the anatomical feature, even if the anatomical feature is hidden by other structures such as skin or bone. Furthermore, the visualization module 8006 may enhance the imagery of certain anatomical features within an augmented reality view. For example, a lesion may be outlined in red to facilitate its identification within the live view.

In one embodiment, an operator may operate the portable imaging device 8002 to scan the patient and display the patient and a surgeon manipulating instruments within the surgical field. In addition, the visualization module 8006 may overlay the video images being displayed of the patient with an augmented overlay showing trajectory, targeting, or guideline markers or indicators. The operator may then guide a surgeon as the surgeon performs a step in a procedure. Such guidance and cooperation between an operator and a surgeon can facilitate monitoring and/or teaching other physicians during training sessions. In addition, other trainers may see the same augmented reality video at a remote location and provide guidance to the surgeon performing the procedure from that remote location.

The visualization module 8006 may show a user trajectory information or markers, target indicators, guidelines, tactical data, and a variety of other visual information and data to facilitate proper completion of steps for a surgical procedure.

Figure 44:
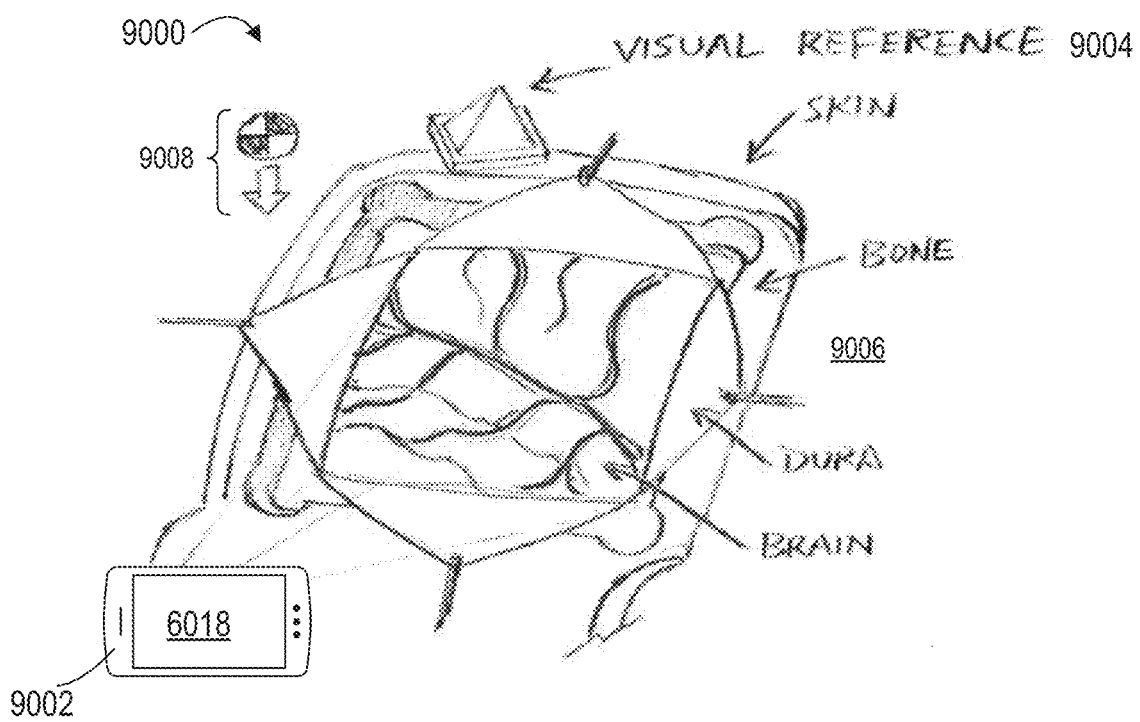
FIG. 44 illustrates an example of a portable/mobile imaging system scanning one or more anatomical features of a patient, according to an embodiment of the present disclosure.

FIG. 44 illustrates one example of a portable imaging system 9000 scanning one or more anatomical features of a patient, according to one embodiment. The portable imaging system 9000 may include structures, features, modules, components, functions, operations, and/or a configuration similar to that of the portable imaging systems described herein.

In some embodiments, the portable imaging system 9000 may include a portable imaging device 9002 and a visual reference 9004. The portable imaging device 9002 may be similar to the portable imaging devices described above and may include a handheld screen device or display device 6018. In the illustrated embodiment, the visual reference 9004 is a pyramid. However, the visual reference 9004 may have any size/shape. The surgical field 9006 illustrated includes a patient with the skull open and the dura layers retracted such that the surface of the brain is visible. Certain arteries or veins on the surface of the brain can be seen in FIG. 44. In some embodiments, the surgical field 9006 may include a gravity marker 9008 that may indicate the direction of gravity. The gravity marker 9008 may be used to provide a deformable (e.g., a non-linear) registration for the tissue. Such a deformable registration can be advantageous for surgical procedures on body parts subject to movement during the procedure (e.g., due to steps of the surgical procedure, etc.).

FIG. 44 illustrates use of the portable imaging device 9002 to capture medical imaging data. The medical imaging data can be used by the portable imaging system 9000 to accurately register preoperative medical images to the physical space within the surgical field 9006 where a procedure is being performed. The portable imaging device 9002 may be pointed so that the one or more cameras can gather medical imaging data. In some embodiments, the visual reference 9004 may be used to facilitate registration.

In some embodiments, the portable imaging system 9000 may be configured to provide deformable registration, which may also be referred to herein as non-linear registration. Deformable registration is registration that is capable of adapting the registration to account for movement of one or more anatomical features (e.g., such as brain shift, etc.).

In some embodiments, the portable imaging device 9002 may be placed in front of the surgical field 9006 and may constantly scans the field using the cameras and/or sensors. In some embodiments, the portable imaging device 9002 may capture both a 3-D surface map, as well as texture information. The portable imaging device 9002 may also capture regional information including the sulci/gyri, as well as the arteries and veins, etc. The portable imaging device 9002 may utilize the captured regional information to provide a reference and enable registration of the rest of the brain to account for deformation of the brain by the appropriate degree.

In some embodiments, the visual reference 9004 may be included to facilitate the scans, and the gravity marker 9008 may indicate a direction of gravity. Once cerebrospinal fluid (CSF) is released, the brain may deform under its own weight. Interaction between the brain and other rigid structures such as bone, falx, and tentorium may be accounted for using techniques that model the mechanical properties of the brain (e.g., finite element methods, etc.). These aspects can be provided to the image registration module of the portable imaging device 9002 such that the registration may be modified to correctly account for the shift in position of the brain within the surgical field 9006.

Figure 45:
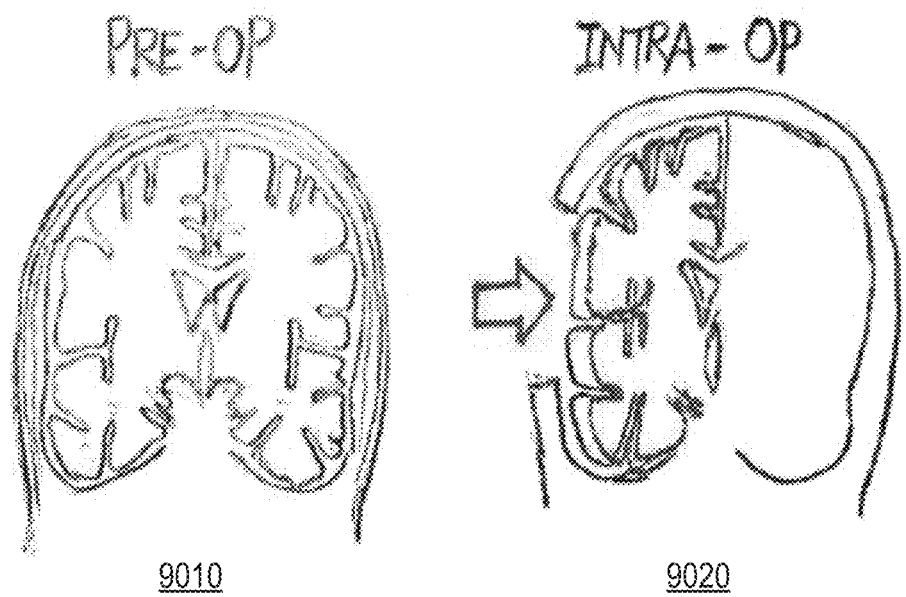
FIG. 45 illustrates example visualizations that a visualization module of a portable imaging device provides, according to an embodiment of the present disclosure.

FIG. 45 illustrates example visualizations that a visualization module of the portable imaging device 9002 may provide to a user. Visualization 9010 illustrates a preoperative anatomical scan (CT or MRI). Visualization 9020 illustrates the newly deformed brain structure, which may be displayed overlaid with the anatomical scans (CT or MRI). In addition, visualization 9010 and/or visualization 9020 may also include lesions and/or deeper targets that are correspondingly deformed to update targeting data and/or targeting visualizations and/or targeting trajectories.

In another embodiment (e.g., in the context of tumor resection), a resection cavity may be continuously monitored by the portable imaging device 9002. The portable imaging system 9000 may provide an estimate of the extent of resection and volume of tumor that has been removed. This information may be fed back to a deformable registration method to account for brain shift and changes due to removal of portions of the brain/tumor. Regional tumor resection may affect the mechanical structure of the brain and cause deformation to occur to a greater extent locally rather than globally. This deformable registration may provide surgeons with updated targeting information and provide an estimate of the extent of resection of a tumor.

Figure 46:
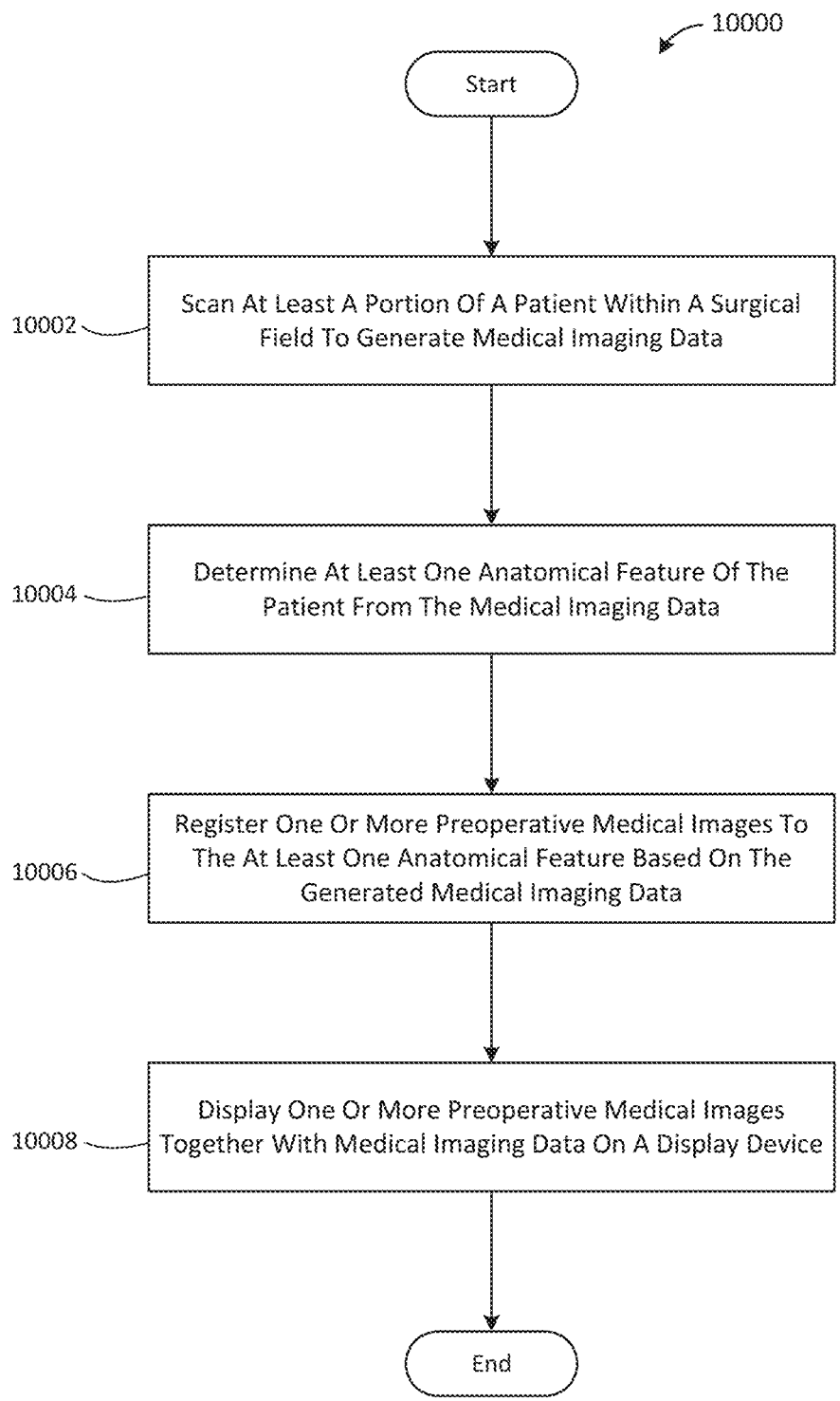
FIG. 46 is a flow chart illustrating a method of registering medical imaging, according to embodiments of the present disclosure.

FIG. 46 is a schematic flow chart illustrating a method of registering medical imaging, according to an embodiment. Referring to FIG. 39, the method 10000 may start with a user positioning the anatomical imaging device 7002 (or other imaging device disclosed herein) so that the scanner 7004 scans at least a portion of a patient within a surgical field to generate medical imaging data in a step 10002. The detector 7006 may then determine at least one anatomical feature of the patient from the medical imaging data in a step 10004. In certain embodiments, the detector 7006 may also detect a visual reference within the medical imaging field that was captured by the scanner 7004. The image registration module 7008 may then register one or more preoperative medical images to the at least one anatomical feature based on the generated medical imaging data in a step 10006. Finally, the anatomical imaging device 7002 may include a display device and the anatomical imaging device 7002 may display one or more preoperative medical images together with medical imaging data on a display device in a step 10008. In certain embodiments, the anatomical imaging device 7002 may display one or more preoperative medical images together with live images or video (e.g., using augmented reality overlays, etc.) of the patient within the surgical field together with the preoperative medical images and/or markers that show targets, trajectories, or other objects useful to a surgeon for completing subsequent steps of a surgical procedure.

Figure 47:
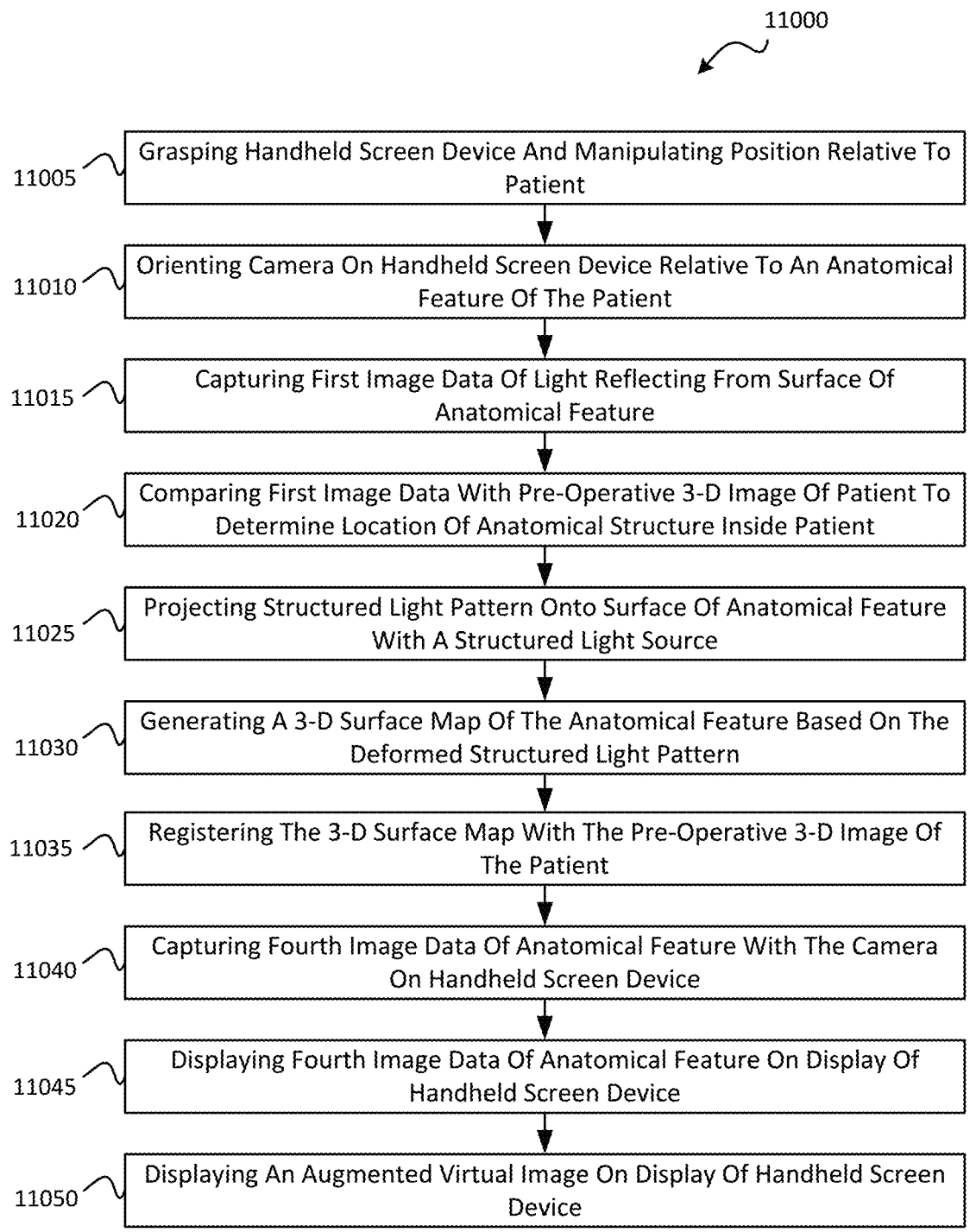
FIG. 47 is a flow chart illustrating a method for visualizing and targeting anatomical structures inside a patient utilizing a handheld screen device, according to embodiments of the present disclosure.

FIG. 47 is a flow chart illustrating a method 11000 for visualizing and targeting anatomical structures inside a patient utilizing a handheld screen device, according to embodiments of the present disclosure. The method 11000 may also utilize any of the imaging devices or systems described or contemplated herein.

In some embodiments, the method 11000 may include grasping the handheld screen device and manipulating a position of the handheld screen device relative to the patient in a first step 11005. In some embodiments, the handheld screen device may include a camera and a display. In a second step 11010, the method 11000 may also include orienting the camera on the handheld screen device relative to an anatomical feature of the patient by manipulating the position of the handheld screen device relative to the patient. In a third step 11015, the method 11000 may also include capturing first image data of light reflecting from a surface of the anatomical feature with the camera on the handheld screen device. In a fourth step 11020, the method 11000 may also include comparing the first image data with a pre-operative 3-D image of the patient to determine a location of an anatomical structure located inside the patient and positioned relative to the anatomical feature of the patient.

Alternatively, or in addition thereto, the method 11000 may also include projecting a structured light pattern onto the surface of the anatomical feature of the patient with a structured light source in a fifth step 11025. In some embodiments, the first image data may represent a deformed structured light pattern reflecting from the surface of the anatomical feature. In a sixth step 11030, the method 11000 may also include generating a 3-D surface map of the anatomical feature of the patient based on the deformed structured light pattern. In a seventh step 11035, the method 11000 may also include registering the 3-D surface map with the pre-operative 3-D image of the patient. In some embodiments, the pre-operative 3-D image may include second image data of the anatomical feature of the patient and third image data of the anatomical structure located inside the patient.

Alternatively, or in addition thereto, the method 11000 may also include capturing fourth image data of the anatomical feature of the patient with the camera on the handheld screen device in an eighth step 11040. In a ninth step 11045, the method 11000 may also include displaying the fourth image data of the anatomical feature of the patient on the display of the handheld screen device.

Alternatively, or in addition thereto, the method 11000 may also include displaying an augmented virtual image on the display of the handheld screen device in addition to the anatomical feature of the patient in a tenth step 11050. In some embodiments, the augmented virtual image may include at least one of: a virtual trajectory oriented with respect to the anatomical feature of the patient and the anatomical structure located inside the patient, and an overlay of the anatomical structure located inside the patient.

In some embodiments of the method 11000, the structured light pattern may include a structured light dot matrix pattern.

In some embodiments of the method 11000, the structured light dot matrix pattern may include at least one of: a predefined dot density, and a predefined spacing between adjacent dots forming the structured light dot matrix pattern.

In some embodiments of the method 11000, the structured light pattern may include a structured light grid pattern.

In some embodiments of the method 11000, the structured light grid pattern may include at least one of: a predefined orientation of lines forming the structured light grid pattern, and a predefined grid spacing between adjacent lines forming the structured light grid pattern.

In some embodiments of the method 11000, the handheld screen device may include a smart phone.

Figure 48:
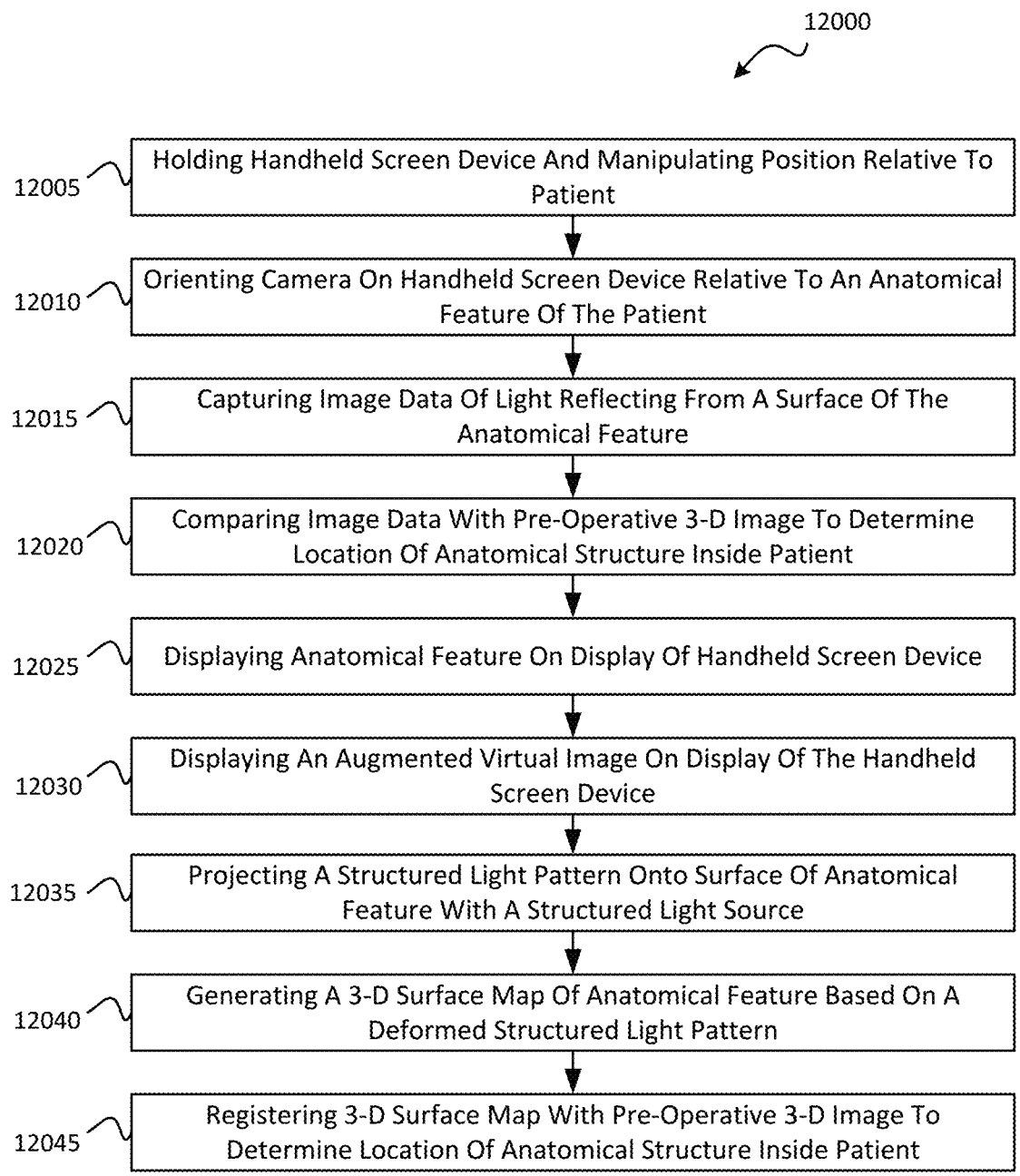
FIG. 48 is a flow chart illustrating a method for visualizing and targeting anatomical structures inside a patient utilizing a handheld screen device, according to embodiments of the present disclosure.

FIG. 48 is a flow chart illustrating a method 12000 for visualizing and targeting anatomical structures inside a patient utilizing a handheld screen device, according to embodiments of the present disclosure. The method 12000 may also utilize any of the imaging devices or systems described or contemplated herein.

In some embodiments, the method 12000 may include holding the handheld screen device and manipulating a position of the handheld screen device relative to the patient in a first step 12005. In some embodiments, the handheld screen device may include a camera and a display. In a second step 12010, the method 12000 may also include orienting the camera on the handheld screen device relative to an anatomical feature of the patient by manipulating the position of the handheld screen device relative to the patient. In a third step 12015, the method 12000 may also include capturing image data of light reflecting from a surface of the anatomical feature with the camera on the handheld screen device. In a fourth step 12020, the method 12000 may also include comparing the image data with a pre-operative 3-D image of the patient to determine a location of an anatomical structure located inside the patient and positioned relative to the anatomical feature of the patient. In a fifth step 12025, the method 12000 may also include displaying the anatomical feature of the patient on the display of the handheld screen device. In a sixth step 12030, the method 12000 may also include displaying an augmented virtual image on the display of the handheld screen device, in addition to the anatomical feature of the patient. In some embodiments, the augmented virtual image may include at least one of: a virtual trajectory oriented with respect to the anatomical feature of the patient and the anatomical structure located inside the patient, and an overlay of the anatomical structure located inside the patient.

Alternatively, or in addition thereto, the method 12000 may also include projecting a structured light pattern onto the surface of the anatomical feature of the patient with a structured light source in a seventh step 12035. In some embodiments, the image data may represent light from a deformed structured light pattern reflecting from the surface of the anatomical feature. In an eighth step 12040, the method 12000 may also include generating a 3-D surface map of the anatomical feature of the patient based on the deformed structured light pattern. In a ninth step 12045, the method 12000 may also include registering the 3-D surface map with the pre-operative 3-D image of the patient to determine the location of the anatomical structure located inside the patient.

In some embodiments of the method 12000, the handheld screen device may include a smart phone.

In some embodiments of the method 12000, the camera may be configured to capture infrared image data reflected from the surface of the anatomical feature of the patient.

In some embodiments of the method 12000, the structured light pattern may include a structured light dot matrix pattern.

Figure 49:
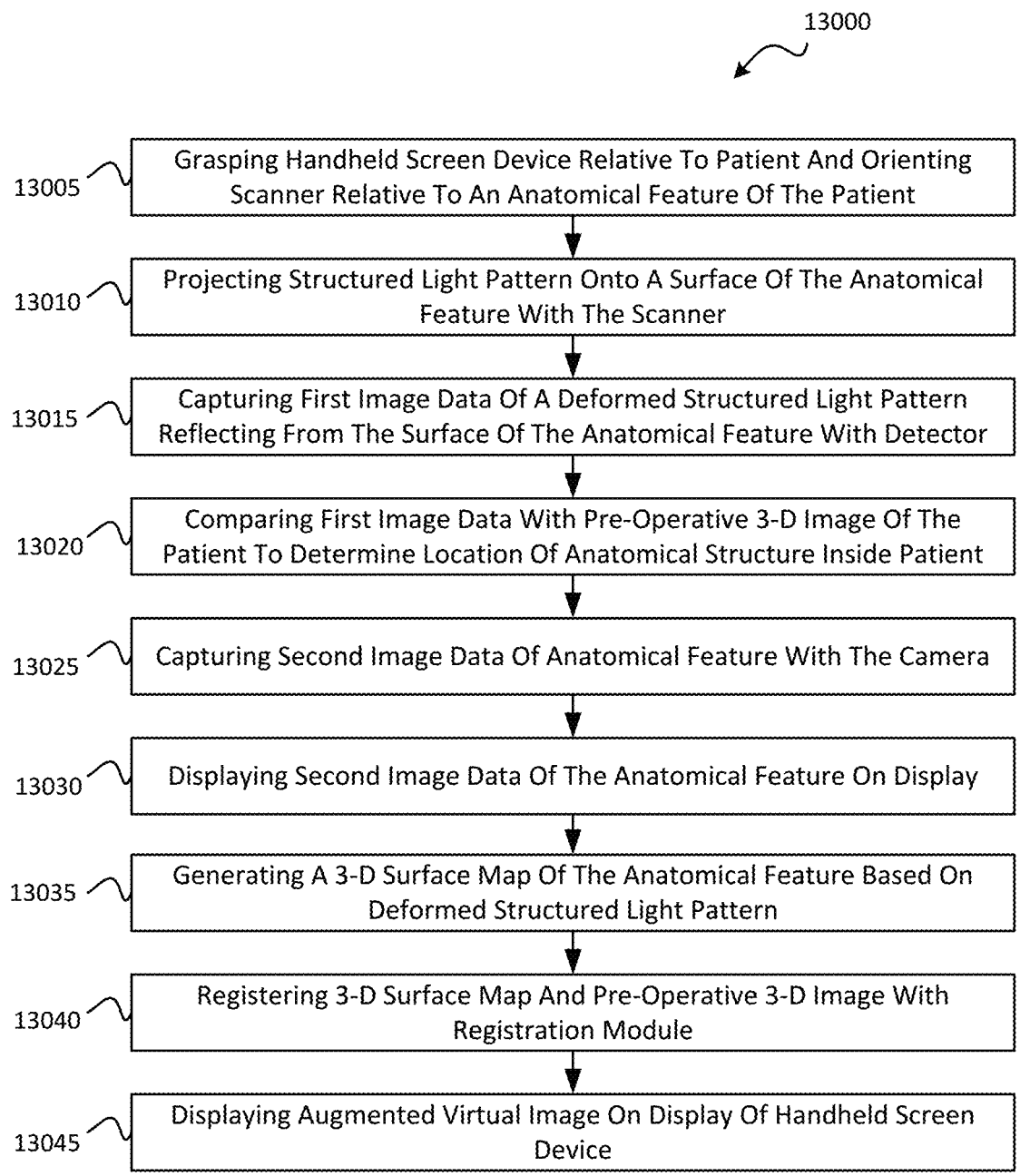
FIG. 49 is a flow chart illustrating a method for visualizing and targeting anatomical structures inside a patient utilizing a handheld screen device, according to embodiments of the present disclosure.

FIG. 49 is a flow chart illustrating a method 13000 for visualizing and targeting anatomical structures inside a patient utilizing a handheld screen device, according to embodiments of the present disclosure. The method 13000 may also utilize any of the imaging devices or systems described or contemplated herein.

In some embodiments of the method 13000, the handheld screen device may include a scanner, a detector, a registration module, a camera, and a display, as previously discussed herein. In some embodiments, the method 13000 may include grasping the handheld screen device relative to the patient and orienting the scanner of the handheld screen device relative to an anatomical feature of the patient in a first step 13005. In a second step 13010, the method 13000 may also include projecting a structured light pattern onto a surface of the anatomical feature with the scanner of the handheld screen device. In a third step 13015, the method 13000 may also include capturing first image data of a deformed structured light pattern reflecting from the surface of the anatomical feature with the detector of the handheld screen device. In a fourth step 13020, the method 13000 may also include comparing the first image data with a pre-operative 3-D image of the patient to determine a location of an anatomical structure located inside the patient and positioned relative to the anatomical feature of the patient. In a fifth step 13025, the method 13000 may also include capturing second image data of the anatomical feature of the patient with the camera of the handheld screen device. In a sixth step 13030, the method 13000 may also displaying the second image data of the anatomical feature of the patient on the display of the handheld screen device.

Alternatively, or in addition thereto, the method 13000 may also include generating a 3-D surface map of the anatomical feature of the patient based on the deformed structured light pattern in the first image data in a seventh step 13035. In an eighth step 13040, the method 13000 may also include registering the 3-D surface map and the pre-operative 3-D image of the patient with the registration module of the handheld screen device to determine the location of the anatomical structure located inside the patient.

Alternatively, or in addition thereto, the method 13000 may also include displaying an augmented virtual image on the display of the handheld screen device in addition to the anatomical feature of the patient in a ninth step 13045. In some embodiments, the augmented virtual image may include at least one of: a virtual trajectory oriented with respect to the anatomical feature of the patient and the anatomical structure located inside the patient, and an overlay of the anatomical structure located inside the patient.

In some embodiments of the method 13000, the handheld screen device may include a smart phone.

In some embodiments of the method 13000, the scanner may be configured to capture infrared image data reflected from the surface of the anatomical feature of the patient.

In some embodiments of the method 13000, the structured light pattern may include an infrared structured light dot matrix pattern.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Some embodiments of the present disclosure may operate with either cross-sectional imaging or planar (projection) imaging modalities. In one embodiment, a portable imaging system may be designed to be light weight and portable, so the portable imaging system can rest directly on the patient without distorting the local anatomy. To facilitate registration of the portable imaging system to patient imaging, a special fixture may be constructed that is attached to the patient prior to image acquisition. In one embodiment, the fixture may not only contain fiducial points (i.e., visual references) that are visible on imaging, but also points of attachment for the portable imaging system. This may allow direct registration of the portable imaging system to the patient by directly acquiring the fixture and the patient anatomy in a single scan/image. In another embodiment, the fixture may have attachment points for a visual reference that can be used with a portable imaging system to facilitate digital mapping of the surface contour of a particular anatomical part. This may allow for registration of patient anatomy to an existing scan without the need for dedicated fiducials placed prior to the scan.

To achieve registration, one embodiment of the portable imaging system may include an integrated optical camera, distance sensing camera (LIDAR), and screen paired with a visual reference. One example of a suitable portable imaging system may be a mobile device, such as an iPhone. In one embodiment, the visual reference can be a cube with 5 out of the 6 surfaces occupied by high contrast patterns (such as QR code, checkerboard pattern, etc.). In another embodiment, the visual reference can be a pyramid with a square base and equilateral triangles on the side. The triangular surfaces can include high contrast patterns. Each of the face(s) of the visual reference can be differently patterned in order for the portable imaging system to determine a unique orientation in three-dimensional space. The visual reference can first be attached via a baseplate to the patient. The visual reference may be small enough to not obscure a majority of the surrounding anatomy. For example, in a cranial application, the visual reference can be positioned on the forehead, leaving most of the patient's face open for surface mapping.

In certain embodiments, the portable imaging system may include or communicate with technology that preforms surface mapping of the patient anatomy and subsequent registration to an existing medical image. In one embodiment, the patient's anatomy of interest may be scanned using a range detector, such as a distance sensing camera, of the portable imaging system. The software may process the surface data and extract the area around the visualization reference. In one embodiment, the portable imaging system may include a medical image processor that determines surface data for at least one anatomical feature. An auto-detect method may be included in the software to identify the visualization reference. The patient's anatomy surrounding the visual reference may be scanned at the highest resolution possible while areas further away from the reference may be kept at a lower resolution to help improve processing time.

In another embodiment, the portable imaging system may detect a visual reference using an optical camera of the portable imaging system to read high contrast features on the visual reference. A range detector, such as a distance sensing camera of the portable imaging system, may be internally co-registered to the optical camera and the 3D scanned visual reference may be postprocessed using a feature extraction method. A secondary feature of the visual reference may be distance calibration. The range detector may have its own internal calibration. However, to improve accuracy the visual reference may have a known fixed geometry that can be cross-referenced to fine tune the geometrical accuracy of the surrounding surface mapping. The portable imaging system may include a zone or auto detected "region of interest" (ROI) for performing the surface mapping. This ROI can be adjusted by the user manually to expand or contract the area. A machine-vision, machine learning, or artificial intelligence technique can further augment the accuracy of anatomical ROI detection. In one embodiment, the software can auto-suggest the regions being mapped (e.g., head, hand, foot, etc.) and provide users with a predefined list of alternatives from which the user can then select. The software can also include further optimizations for a particular anatomical region of interest.

Once the portable imaging system generates and postprocesses a 3D surface scan, the portable imaging system may identify an existing anatomical scan and perform registration of the patient anatomy to an existing anatomical scan or imaging data. The portable imaging system can use artificial intelligence techniques and methods to orient the 3D surface map to facilitate identifying anatomical features. In one embodiment (e.g., for cranial application), a face detection technique may be implemented using an optical camera of the portable imaging system to help orient a model that the portable imaging system may generate in connection with the 3-D surface map. This model may then be matched to a patient's medical scan and registration can be performed between the visual reference and the range detector (such as a distance sensing camera of the portable imaging system, etc.).

The visual reference can remain stationary as an operator of the portable imaging system (i.e., a user) walks around the patient holding the portable imaging system between the patient and the user, aiming the camera(s) at the patient and/or the surgical field. One or more cameras of the portable imaging system may read the high contrast surface on the visual reference to provide orientation information. This orientation information can be further refined with the range detector (e.g., with a LIDAR device/subsystem, a structured light device/system, etc.) to provide a stable augmented reality (AR) overlay. In one embodiment, the portable imaging system can be used to facilitate education of medical students or resident trainees by overlaying of graphic information regarding a target location and/or a trajectory on a display device of the portable imaging system. While one operator is performing a surgical procedure, another person may utilize the portable imaging system with a display showing a live video feed that includes an AR overlay to help guide or correct the entry site/trajectory of the person performing the surgical procedure.

In another embodiment, the visual reference may be omitted, and a small portable imaging system can be attached to a base plate such as the one described below in the present disclosure. In this embodiment, an optical camera, range detector, and processor(s) of the portable imaging system may function as a 3-D scanning system to capture information and allow registration of the patient anatomy to a medical image. This captured information can then be fed back to an image guidance system that either uses the visual reference or directly attaches to the patient. A small compact image guidance system (e.g., a laser based system such as the examples described herein) allows for direct visualization of the target trajectory within the workspace of the surgeon without the need for an additional intervening screen/display.

The optical camera, range detector, and processor(s) of the portable imaging system can allow for the simultaneous capture of texture information (e.g., color, lighting information, light reflection, shadows, shading, etc.) along with 3-D surface mapping. This provides an additional layer of information that can be used for correction of registration. In one embodiment, a shift of the brain during surgery can be partially corrected using the portable imaging system. By continuously scanning the surface of the operative field, a 3-D surface scan of the brain in the surgical field can be captured along with texture information. Using certain anatomically constant features such as arteries and veins, a deformable registration method can be applied to the brain to account for intraoperative movement or repositioning and fit a preoperative scan to an intraoperative scan that includes the intraoperative movement or repositioning. The visual reference can be exposed during surgery to help orient the scan. The direction of gravity can also be accounted for as certain anatomical features, such as the brain, can undergo appreciable deformation under its own weight once cerebrospinal fluid (CSF) has been released. The deformable registration technology may also consider the mechanical properties of the brain, as well as interaction with surrounding structures such as the skull and dura to properly account for brain shift.

In another embodiment, the portable imaging system can be used for different locations or applications in the body. For example, in a trauma situation patients typically receive computerized tomography (CT) scans of multiple parts of their body (e.g., chest, abdomen, pelvis, extremities, or the like). A surface scan using the range detector (e.g., with a LIDAR device/subsystem, a structured light device/system, etc.), along with texture information from an optical camera can help register either portions of a patient or the entire patient to the scan. Prior to registration, a visual reference may be attached to the patient or to some part of the anatomy that would not interfere with additional procedures or patient care. One such location may be the forehead, alternatively the chest area could be used. Using the visualization reference, the optical camera may track the visual reference and continuously update a display of the portable imaging system with regards to various injuries of the patient and reference the internal anatomy to the previously acquired scan.

The portable imaging system may integrate with medical imaging systems such as Picture Archive and Communications Systems (PACS) server to easily search Digital Imaging and Communications in Medicine (DICOM) files and allow for smooth image registration. In an additional embodiment, the portable imaging system may also have integration with existing electronic medical record (EMR) systems to fully integrate the patient information on a screen, either of the portable imaging system, or on another display screen. The portable imaging system may use an internal camera and/or range detector to track a patient while a display screen, of the portable imaging system for example, displays a curated list of the patient's active medical issues and summary of injuries.

In one embodiment, a display screen, of the portable imaging system may be interactive where various body parts may be auto segmented and displayed either in a stylized fashion or actually overlaid on a live camera feed. The user may interact with the display to pull up additional information for a particular anatomical part/structure. For example, a trauma patient with severe head injury, chest contusion, and/or an extremity fracture can have information for each of these body parts available for interactive display. By overlaying the camera feed, the user may see different colored zones overlaying a specific part of the anatomy. If more detail is required for the head injury, the user may tap the head of the patient on the camera feed. In one embodiment, the neuro-vitals, current extent of injury, and any relevant recent lab results may be displayed to help streamline team communication and facilitate patient care.

In general, there are at least two "spaces" that may be used in image guidance systems. The first, referred to as the "image space," may represent the medical imaging acquired prior to or during a procedure, such as an MRI scan of a specific anatomical area performed before surgery. From cross-sectional imaging, a three-dimensional data set may be constructed using the first image space's coordinate system, usually expressed as a Cartesian system with an arbitrary origin and principal axis. The second space is the actual physical space surrounding the patient. This actual physical space is often restricted to a specific anatomical part, such as the head, lower back, hip joint, etc., in order to improve local resolution and system performance.

An image guidance system may include a mechanism for accurately measuring position within the patient's physical space, much like a tracking device. The tracking device may have its own coordinate system which may be different from that of the "image space." In order to provide flexibility, a "visual reference" may be held in a rigid relationship relative to the patient's anatomical area of interest. The visual reference can serve as an arbitrary origin of the patient's physical space and 3-D spatial measurements of the patient's physical space can be expressed relative to the visual reference.

The use of a visual reference can allow for the movement of the image guidance system and/or the movement of the target anatomical region of the patient without losing registration or affecting guidance accuracy. The use of a visual reference can also allow for the movement of an image guidance system that is external to the patient (not rigidly attached) without losing guidance accuracy. Thus, the tracking device or visual reference may be used for spatial recognition to read the coordinates of a point in three-dimensional space and allow accurate tracking of the physical space around the patient. An image guidance system also may include various probes to allow tracking of instruments (e.g., surgical instruments, endoscopic tools, biopsy needles, etc.) during an operation to provide flexibility with regards to navigational options. The probe may also act as the tracking device or visual reference.

After the two coordinate systems have been established, the image space may be correlated to the physical space through a process known as registration. Registration refers to the coordinate transformation of one space into another. This is usually a linear and rigid transformation in which translation and/or rotation may be utilized. Registration may also include scaling or local deformation transformations, as needed.

Once registration is completed, a probe or other device may be used to touch various anatomical structures on the subject (physical space), and the corresponding images of the same anatomical structures may be displayed (image space). The image guidance system may also include multiplanar reconstruction capabilities that can display three-dimensional medical imaging datasets in any arbitrary plane allowing users to view surrounding structures in any arbitrary direction.

An image guidance system may include an information processing unit (e.g., a controller, processor, or other computing device). The information processing unit can load a patient's preoperative and/or intraoperative images and execute software that performs registration of a patient's image space to the patient's physical space and provide navigational information to the operator (e.g., a surgeon). The software may also include the ability to perform multi-planar reconstructions and targeting/trajectory planning to identify specific entry points, targets, trajectories, target zones, and the like. More advanced functions may include image fusion capabilities across imaging modalities such as fusing CT imaging data with MRI imaging data, as well as advanced image segmentation to provide surgeons with live intraoperative guidance. For example, advanced image segmentation may include extracting image information of a patient's inner anatomy, (e.g., a tumor, blood vessels, tissues, etc.), rendering 3-D models of these structures, and then visually overlaying these structures on a display screen in a manner that shows the relative depth of the tissues/structures inside the patient (e.g., the depth of the tissues/structures relative to the patient's surface anatomy, skin, other tissues/structures, etc.). In this manner, a virtual 3-D view of the patient's inner and outer anatomy may be presented to the operator to help the operator visualize the inner locations and depth of tissues/structures inside the patient relative to the patient's surface anatomy.

There are many different ways of implementing an image guidance system. For example, an optical system may include a stereo camera (i.e., two cameras mounted a known fixed distance apart) that cooperate to provide accurate 3-D localization.

In another example, an image guidance system may employ magnetic field generators to generate a uniform gradient field to track spatial localizations. In such systems, a magnetic sensor may be used to measure the strength and direction of the magnetic field, and based on this information, spatial localization may be derived. In these systems a reference point, similar in function to the "visual reference", may be fixed to the patient using various fixation methods ranging from skin adhesives to pins and screws. After registration is performed, probes can then be used to identify patient anatomy and localize surgical trajectory.

Another example image guidance system may be a stereotactic frame system. For cranial procedures, these systems may rely upon the attachment of a rigid frame around a patient's head. Cross-sectional imaging (e.g., CT, MRI, etc.) may be taken of the patient's head with the frame rigidly attached to patient's head. The frame may provide measurement of the physical space around the patient's head that directly correlates with the image space since the frame is simultaneously captured on the cross-sectional imaging scan.

Clinical applications that may benefit from the improved targeting methods disclosed herein may include but are not limited to: biopsies, placement of electrodes, drainage of collections (abscess/hematoma/fluid). Accurate targeting of soft tissue, bone, fluid, or anatomical spaces is required. For brain pathologies, traditional methods have focused on frame-based stereotactic biopsy that rely upon the application of a frame secured to the skull with sharp pins that penetrate the outer table of the skull. This procedure is painful for the patient and time consuming. In some instances, the head needs to be rigidly fixed with penetrating pins in a skull clamp. Another issue with frameless stereotactic systems is that the targeting information is shifted entirely to the guidance system screen. This becomes an attention-splitting task which requires the surgeon to periodically look away from his/her hands to view the screen to perform the procedure.

There are also numerous potential applications of the image-guided techniques disclosed herein for orthopedic procedures, ranging from placement of implants to placement of nails, plates, screws, and the like. For example, in hip replacement surgeries, accurate placement of the acetabular cap with specific angles of abduction/adduction and flexion/extension has been shown to be an important factor in preventing premature wear and recurrent hip dislocations. Similarly, knee, shoulder, ankle, and small joint replacements rely upon precise cuts in the adjacent bones to ensure anatomical alignment of the implant. Another example includes the placement of pedicle screws in spinal surgery, which rely upon a precise trajectory and angle of insertion to prevent neurological injury and screw misplacement. An additional frequent orthopedic application involves the placement of intramedullary nails in long bone fractures. Intramedullary nails may conform to the shape of the intramedullary canal, sometimes making accurate targeting and alignment of distal locking screws difficult. Unfortunately, although many attempts have been made, no satisfactory system currently exists that can easily address this problem without significantly lengthening the operative time.

Image-guided surgery currently requires access to an image guidance system and operating room. Access to such facilities and instruments may not be feasible for emergency procedures, where the delay in bringing the patient to the operating room and setting up existing image guidance systems would result in a poor outcome for the patient. In these instances, the physician is often forced to resort to crude external anatomical landmarks for rough guidance. This trade-off between speed and accuracy means that patients who require emergency procedures are often not able to receive the benefits of precise image-guidance. Further, existing image guidance systems are, in many instances, expensive and cost-prohibitive for smaller medical facilities. This means that image guidance technology is typically restricted to large, well-funded hospitals. Many hospitals and healthcare facilities are not equipped with image guidance systems, depriving patients of the benefits of the accurate and precise targeting. This is particularly true in developing countries where cost is a major barrier.

Additionally, routine radiology procedures such as biopsies are performed under the guidance of plain films, CT scans, or ultrasound imaging. These procedures are performed frequently and may expose patients, radiologists, and technicians to harmful doses of radiation over time. Such imaging modalities may require practitioners to view an image on a screen instead of watching the procedure in the physical space of the patient. This aspect is similar to conventional image guidance systems where practitioners must take their eyes off the patient in order to focus on the information displayed on the screen (i.e., "eyes-off-target"). For these critical moments, the practitioners do not have direct visual confirmation of their instrument(s). Instead, they must rely on feel, muscle memory, and/or rapidly looking back and forth between the screen and the patient.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "circuit," "module," "apparatus," or "system." Furthermore, aspects of the present disclosure may take the form of a computer program product embodied in one or more non-transitory computer readable storage media storing computer readable and/or executable program code.

Many of the functional units described in this specification have been labeled as modules to emphasize their implementation independence more particularly. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented at least partially in software for execution by various types of processors. An identified module of executable code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of executable code may include a single instruction, or many instructions, and may even be distributed over several different code segments, among different programs, across several memory devices, or the like. Where a module or portions of a module are implemented in software, the software portions may be stored on one or more computer readable and/or executable storage media. Any combination of one or more computer readable storage media may be utilized. A computer readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain embodiments, may be embodied by or implemented as a circuit.

As used herein, "medical imaging" refers to a technique and process of imaging the interior of a body for clinical analysis and medical intervention, as well as visual representation of the function of some organs or tissues (physiology). Medical imaging seeks to reveal internal structures hidden by the skin and bones, as well as to diagnose and treat disease. Medical imaging may be used to establish a database of normal anatomy and physiology to make possible identification of abnormalities.

Medical imaging in its widest sense, is part of biological imaging and incorporates radiology, which uses the imaging technologies of X-ray radiography, magnetic resonance imaging, ultrasound, endoscopy, elastography, tactile imaging, thermography, medical photography, nuclear medicine functional imaging techniques as positron emission tomography (PET) and single-photon emission computed tomography (SPECT). Another form of X-ray radiography includes computerized tomography (CT) scans in which a computer controls the position of the X-ray sources and detectors. Magnetic Resonance Imaging (MRI) is another medical imaging technology. Fluoroscopy is an imaging technique that uses X-rays to obtain real-time moving images of the interior of an object. In its primary application of medical imaging, a fluoroscope allows a physician to see the internal structure and function of a patient, so that the pumping action of the heart or the motion of swallowing, for example, can be watched. This is useful for both diagnosis and therapy and occurs in general radiology, interventional radiology, and image-guided surgery. (Search "medical imaging" on Wikipedia.com Jul. 14, 2021. CC-BY-SA 3.0 Modified. Accessed Sep. 1, 2021.) Data analyzed, generated, manipulated, interpolated, collected, stored, reviewed, and/or modified in connection with medical imaging or medical image processing can be referred to herein as medical imaging data or medical image data.

Measurement and recording techniques that are not primarily designed to produce images, such as electroencephalography (EEG), magnetoencephalography (MEG), electrocardiography (ECG), and others, represent other technologies that produce data susceptible to representation as a parameter graph vs. time or maps that contain data about the measurement locations. These technologies may be considered forms of medical imaging in certain disciplines. (Search "medical imaging" on Wikipedia.com Jun. 16, 2021. CC-BY-SA 3.0 Modified. Accessed Jun. 23, 2021.)

As used herein, "image" refers to a single image in digital or analog format and a plurality of images that differ from each other based on one or more characteristics, such as time, exposure, image capture modality, and the like. "Image" also refers to videos and a set of images taken over a time series. An image may exist in a purely digital form or in a physical tangible form.

As used herein, "medical image computing" or "medical image processing" refers to systems, software, hardware, components, and/or apparatus that involve and combine the fields of computer science, information engineering, electrical engineering, physics, mathematics, and medicine. Medical image computing develops computational and mathematical methods for working with medical images and their use for biomedical research and clinical care. One goal for medical image computing is to extract clinically relevant information or knowledge from medical images. While closely related to the field of medical imaging, medical image computing focuses on the computational analysis of the images, not their acquisition. The methods can be grouped into several broad categories: image segmentation, image registration, image-based physiological modeling, and others. (Search "medical image computing" on Wikipedia.com Jun. 24, 2021. CC-BY-SA 3.0 Modified. Accessed Jun. 24, 2021.) Medical image computing may include one or more processors or controllers on one or more computing devices. Such processors or controllers may be referred to herein as medical image processors.

Medical imaging and medical image computing together can provide systems and methods to image, quantify and fuse both structural and functional information about a patient in vivo. These two technologies include the transformation of computational models to represent specific subjects/patients, thus paving the way for personalized computational models. Individualization of generic computational models through imaging can be realized in three complementary directions: definition of the subject-specific computational domain (anatomy) and related subdomains (tissue types); definition of boundary and initial conditions from (dynamic and/or functional) imaging; and characterization of structural and functional tissue properties. Medical imaging and medical image computing enable in the translation of models to the clinical setting with both diagnostic and therapeutic applications. (Id.)

As used herein, a "marking" or "marker" refers to a symbol, letter, lettering, word, phrase, icon, design, diagram, indicator, figure, or combination of these designed, intended, structured, organized, configured, programmed, arranged, or engineered to communication information and/or a message to a user receiving, viewing, or encountering the marking. The marking can include one or more of a tactile signal, a visual signal or indication, an audible signal, and the like. In one embodiment, a marking may comprise a number or set letters, symbols, or words positioned on a surface, structure, or device to convey a desired message or set of information.

As used herein, an "indicator" refers to an apparatus, device, component, system, assembly, mechanism, hardware, software, firmware, circuit, module, or logic structured, organized, configured, programmed, designed, arranged, or engineered to convey information or indicate a state, condition, location, or position to a user of a device or apparatus that includes the indicator. The indicator can include one or more of an audible signal, a tactile signal, a visual signal or indication, a visual marker, and the like.

As used herein, "visual reference," "fiducial," "patient reference," or "fiducial marker" refers to any indicator, marker, structure, or component designed, configured, placed, engineered, or organized to serve as a reference point or fixed known predetermined location for use in medical imaging, medical image processing, medical scanning, and the like. In certain embodiments, a visual reference may be an arrow or delta shaped indicator. A visual reference may be two-dimensional or three-dimensional. In certain embodiments, a visual reference may be a structure with patterned surfaces of known geometric dimensions with at least one surface visible to an image capture device/system. A visual reference may have a variety of shapes including cube, planar square, rectangle, or triangle, tetrahedral, pyramid, or the like. The visual reference may have at least one surface visible by the image capture device/system. Surfaces of a visual reference may include high contrast patterns. In at least one embodiment, one or more surfaces of a visual reference may include a highly distinctive QR code pattern with unique patterned surfaces which may include alternating designs. Of course, surfaces of the visual reference may include other designs such as a checkerboard pattern and such patterns may include two high contrast colors, such as black and white, red, and green, etc. Moreover, a visual reference may have particular reflective coatings, radio opaque materials, and the like.

As used herein, "preoperative" or "PRE-OP" refers to any activity, method, feature, or aspect performed before a surgical procedure. As used herein, "intraoperative" or "INTRA-OP" refers to any activity, method, feature, or aspect performed during a surgical procedure.

As used herein, "anatomic mapping" refers to a process of determining one or more points, landmarks, or features of an anatomic structure of a patient. In certain aspects, an anatomic mapping can generate a set of anatomic data representative of a structure of a patient. Anatomic mapping may be performed on structures of a patient, of a physical model of an anatomical structure, or on computer model of an anatomical structure. As used herein, "anatomic data" refers to data identified, used, collected, gathered, and/or generated in connection with an anatomy of a human or animal. Examples of anatomic data may include location data for structures, both independent, and those connected to other structures within a coordinate system. Anatomic data may also include data that labels or identifies one or more anatomical structures. Anatomic data can include volumetric data, material composition data, and/or the like. Anatomic data can be generated based on medical imaging data or measurements using a variety of instruments including monitors and/or sensors. Anatomic data can be gathered, measured, or collected from a patient or anatomical models and/or can be used to generate, manipulate, or modify anatomical models.

As used herein, "anatomic features" or "anatomical features" refers to structures on, within, or integrated with other parts of a patient's body that are distinct in one or more characteristics in relation to other parts of a patient. The distinct characteristics can be one or more of size, shape, number, location, orientation, position, profile, weight, color, or the like. As used herein, anatomical features refers to both external morphology (i.e., eidonomy) and internal morphology (i.e., anatomy). Representative examples of anatomic features include, but are not limited to, hands, feet, extremities, heart, lungs, brain, facial features, eyes, nose, mouth, and the like. In certain embodiments, anatomical features can serve as landmarks for medical imaging and/or medical image processing.

As used herein, "surgical field," "operative field," or "operating field" refers to an area of a patient where surgery is or will be performed and includes one or more areas of a patient's body and all personnel and equipment that is used in the surgery. (Search "surgical field" on medical-dictionary.thefreedictionary.com Copyright 2021 Farlex Inc. Modified. Accessed Sep. 8, 2021.)

As used herein, "surface data" refers to data identified, used, collected, gathered, and/or generated in connection with scanning, mapping, gathering, or collecting imaging data, such as medical imaging data of one or more objects in a field of view. Surface data can be used to define a surface in two-dimensional or three-dimensional space within a variety of coordinate systems. Surface data can represent a surface of a variety of objects both animate and inanimate and both real and imaginary or modeled including but not limited to anatomical features of a patient.

As used herein, "calibration" refers to a comparison of measured values provided by a device under test (DUT) with those of a calibration standard of known accuracy. The standard can come from another measurement device of known or acceptable accuracy or a device generating the quantity to be measured. The outcome of the comparison can result in one of the following: no error being noted on the DUT, an error being noted but no adjustment made, an adjustment made to correct the error to an acceptable level. As used herein, "calibration" refers to both the act of comparison and any subsequent adjustment. (Search "calibration" on Wikipedia.com Jul. 2, 2021. CC-BY-SA 3.0 Modified. Accessed Sep. 8, 2021.)

As used herein, "image registration" or "registration" refers to a method, process, module, component, apparatus, and/or system that seeks to achieve precision in the alignment of two images. As used here, "image" may refer to one or more of an image of a structure or object, a time series of images such as a video or other time series, another image, or a model (e.g., a computer based model or a physical model, in either two dimensions or three dimensions). In the simplest case of image registration, two images are aligned. One image may serve as the target image and the other as a source image; the source image is transformed, positioned, realigned, and/or modified to match the target image. An optimization procedure may be applied that updates the transformation of the source image based on a similarity value that evaluates the current quality of the alignment. An iterative procedure of optimization may be repeated until a (local) optimum is found. An example is the registration of CT and PET images to combine structural and metabolic information.

Image registration can be used in a variety of medical applications: Studying temporal changes; Longitudinal studies may acquire images over several months or years to study long-term processes, such as disease progression. Time series correspond to images acquired within the same session (seconds or minutes). Time series images can be used to study cognitive processes, heart deformations and respiration; Combining complementary information from different imaging modalities. One example may be the fusion of anatomical and functional information. Since the size and shape of structures vary across modalities, evaluating the alignment quality can be more challenging. Thus, similarity measures such as mutual information may be used; Characterizing a population of subjects. In contrast to intra-subject registration, a one-to-one mapping may not exist between subjects, depending on the structural variability of the organ of interest. Inter-subject registration may be used for atlas construction in computational anatomy. Here, the objective may be to statistically model the anatomy of organs across subjects; Computer-assisted surgery: in computer-assisted surgery pre-operative images such as CT or MRI may be registered to intra-operative images or tracking systems to facilitate image guidance or navigation.

Image registration can be done using an intrinsic method or an extrinsic method or a combination of both. The extrinsic image registration method uses an outside object that is introduced into the physical space where the image was taken. The outside object may be referred to using different names herein such as a "reference," "visual reference," "visualization reference," "reference point," "reference marker," "patient reference," or "fiducial marker." The intrinsic image registration method uses information from the image of the patient, such as landmarks and object surfaces.

There may be several considerations made when performing image registration:

The transformation model. Common choices are rigid, affine, and deformable (i.e., nonlinear) transformation models. B-spline and thin plate spline models are commonly used for ~ parameterized transformation fields. Non-parametric or dense deformation fields carry a displacement vector at every grid location; this may use additional regularization constraints. A specific class of deformation fields are diffeomorphisms, which are invertible transformations with a smooth inverse;

The similarity metric. A distance or similarity function is used to quantify the registration quality. This similarity can be calculated either on the original images or on features extracted from the images. Common similarity measures are sum of squared distances (SSD), correlation coefficient, and mutual information. The choice of similarity measure depends on whether the images are from the same modality; the acquisition noise can also play a role in this decision. For example, SSD may be the optimal similarity measure for images of the same modality with Gaussian noise. However, the image statistics in ultrasound may be significantly different from Gaussian noise, leading to the introduction of ultrasound specific similarity measures. Multi-modal registration may use a more sophisticated similarity measure; alternatively, a different image representation can be used, such as structural representations or registering adjacent anatomy;

The optimization procedure. Either continuous or discrete optimization is performed. For continuous optimization, gradient-based optimization techniques are applied to improve the convergence speed. (Search "medical image computing" on Wikipedia.com Jun. 24, 2021. CC-BY-SA 3.0 Modified. Accessed Jun. 25, 2021.) A deformable registration transformation model is a non-rigid transformation or non-linear transformation As used herein, "augmented reality (AR)" refers to an interactive experience of a real-world environment where objects that reside in the real world are enhanced by computer/machine-generated perceptual information, sometimes across multiple sensory modalities, including visual, auditory, haptic, somatosensory, and olfactory. AR refers to a system that incorporates three features: a combination of real and virtual worlds, real-time interaction, and accurate 3-D registration of virtual and real objects. The overlaid sensory information provided by an AR system or component can be constructive (i.e., additive to the natural environment), or destructive (i.e., masking of the natural environment). This experience can be seamlessly interwoven with the physical world such that the physical world is perceived as an immersive aspect of the real environment. In this way, augmented reality alters one's perception of a real-world environment. Augmented reality is related to two largely synonymous terms: mixed reality and computer-mediated reality. (Search "augmented reality" on Wikipedia.com Aug. 28, 2021. CC-BY-SA 3.0 Modified. Accessed Sep. 8, 2021.)

As used herein, "artificial intelligence" refers to intelligence demonstrated by machines, unlike the natural intelligence displayed by humans and animals, which involves consciousness and emotionality. The distinction between artificial intelligence and natural intelligence categories is often revealed by the acronym chosen. 'Strong' AI is usually labelled as artificial general intelligence (AGI) while attempts to emulate 'natural' intelligence have been called artificial biological intelligence (ABI). Leading AI textbooks define the field as the study of "intelligent agents": any device that perceives its environment and takes actions that maximize its chance of achieving its goals. The term "artificial intelligence" can also be used to describe machines that mimic "cognitive" functions that humans associate with the human mind, such as "learning" and "problem solving". (Search "artificial intelligence" on Wikipedia.com Jun. 25, 2021. CC-BY-SA 3.0 Modified. Accessed Jun. 25, 2021.)

As used herein, "image segmentation" refers to a process of partitioning a digital image into multiple segments (sets of pixels, also known as image objects). The goal of segmentation is to simplify and/or change the representation of an image into something that is more meaningful and easier to analyze. Image segmentation can be used to locate objects and boundaries (lines, curves, etc.) in images. More precisely, image segmentation can include the process of assigning a label to every pixel in an image such that pixels with the same label share certain characteristics.

One result of image segmentation can be a set of segments that collectively cover the entire image, or a set of contours extracted from the image. Each of the pixels in a region are similar with respect to some characteristic or computed property, such as color, intensity, or texture. Adjacent regions can be a significantly different color with respect to the same characteristic(s). When applied to a stack of images, typical in medical imaging, the resulting contours after image segmentation can be used to create 3-D reconstructions with the help of interpolation algorithms such as the marching cubes algorithm. (Search "image segmentation" on Wikipedia.com Sep. 8, 2021. CC-BY-SA 3.0 Modified. Accessed Sep. 8, 2021.)

As used herein, "electronic component" refers to any basic discrete device or physical entity in an electronic system used to affect electrons or their associated fields. Electronic components may be either passive electronic components or active electronic components. Active electronic components include transistors, diodes, integrated circuits, display components, power sources, and the like. Passive electronic components include resistors, capacitors, magnetic (inductive) devices, memristors, transducers, sensors, detectors, antennas and the like. (search "electronic component" on Wikipedia. Apr. 18, 2020. Modified. Accessed May 15, 2020, Jun. 16, 2020.)

As used herein, a "body" refers to a main or central part of a structure. The body may serve as a structural component to connect, interconnect, surround, enclose, and/or protect one or more other structural components. A body may be made from a variety of materials including, but not limited to, metal, plastic, ceramic, wood, fiberglass, acrylic, carbon, biocompatible materials, biodegradable materials or the like. A body may be formed of any biocompatible materials, including but not limited to biocompatible metals such as Titanium, Titanium alloys, stainless steel alloys, cobalt-chromium steel alloys, nickel-titanium alloys, shape memory alloys such as Nitinol, biocompatible ceramics, and biocompatible polymers such as Polyether ether ketone (PEEK) or a polylactide polymer (e.g., PLLA) and/or others.

In one embodiment, a body may include a housing or frame or framework for a larger system, component, structure, or device. A body may include a modifier that identifies a particular function, location, orientation, operation, and/or a particular structure relating to the body. Examples of such modifiers applied to a body, include, but are not limited to, "inferior body," "superior body," "lateral body," "medial body," and the like.

As used herein, "side" refers to a structure or part of a structure including, but not limited to one of a longer bounding surfaces or lines of an object especially contrasted with the ends, a line or surface forming a border or face of an object, either surface of a thin object, a bounding line or structure of a geometric figure or shape, and the like. (search "side" on Merriam-Webster.com. Merriam-Webster, 2021. Web. 3 Aug. 2021. Modified.) A side can also refer to a geometric edge of a polygon (two-dimensional shape) and/or a face or surface of a polyhedron (three-dimensional shape). (Search "side" on Wikipedia.com Jul. 21, 2021. CC-BY-SA 3.0 Modified. Accessed Aug. 3, 2021.) Side can also refer to a location on a structure. For example, a side can be a location on a structure at, or near, a furthest position away from a central axis of the structure.

As used herein, "feature" refers to a distinctive attribute or aspect of something. (Search "feature" on google.com. Oxford Languages, 2021. Web. 20 Apr. 2021.) A feature may include one or more modifiers that identify one or more particular functions, attributes, advantages, or operations and/or particular structures relating to the feature. Examples of such modifiers applied to a feature, include, but are not limited to, "attachment feature," "securing feature," "alignment feature," "adjustment feature," "guide feature," "protruding feature," "engagement feature," "disengagement feature," and the like.

As used herein, "LiDAR" (also spelled Lidar, or LIDAR, and sometimes LADAR) refers to a method for determining ranges (variable distance) by targeting an object with a laser and measuring the time for the reflected light to return to the receiver. Lidar can also be used to make digital 3-D representations of areas on the earth's surface and ocean bottom, due to differences in laser return times, and by varying laser wavelengths. It has terrestrial, airborne, and mobile applications. Lidar is an acronym of "light detection and ranging" or "laser imaging, detection, and ranging". Lidar sometimes is called 3-D laser scanning, a special combination of a 3-D scanning and laser scanning. (Search "Lidar" on Wikipedia.com Sep. 7, 2021. CC-BY-SA 3.0 Modified. Accessed Sep. 8, 2021.) LiDAR devices, components, systems, and/or modules determine range data that indicates a distance between the LiDAR sensor and an object or feature.

As used herein, "model" refers to an informative representation of an object, body, person, or system. Representational models can be broadly divided into the concrete (e.g., physical form) and the abstract (e.g., behavioral patterns, especially as expressed in mathematical form). In abstract form, certain models may be based on data used in a computer system or software program to represent the model. Such models can be referred to as computer models. Computer models can be used to display the model, modify the model, print the model (either on a 2D medium or using a 3D printer or additive manufacturing technology). Computer models can also be used in environments with models of other objects, people, or systems. Computer models can also be used to generate simulations, display in virtual environment systems, display in augmented reality systems, or the like. Computer models can be used in Computer Aided Design (CAD) and/or Computer Aided Manufacturing (CAM) systems. Certain models may be identified with an adjective that identifies the object, person, or system the model represents. For example, a "bone" model is a model of a bone, and a "heart" model is a model of a heart. (Search "model" on Wikipedia.com Jun. 13, 2021. CC-BY-SA 3.0 Modified. Accessed Jun. 23, 2021.)

As used herein, "photogrammetry" refers to technology of obtaining reliable information about physical objects and the environment through the process of recording, measuring, and interpreting photographic images and patterns of electromagnetic radiant imagery and other phenomena. One example of photogrammetry is the extraction of three-dimensional measurements from two-dimensional data (i.e., images); for example, the distance between two points that lie on a plane parallel to the photographic image plane can be determined by measuring their distance on the image, if the scale of the image is known.

A special case, called stereophotogrammetry, involves estimating the three-dimensional coordinates of points on an object employing measurements made in two or more photographic images taken from different positions. Common points are identified on each image. A line of sight (or ray) can be constructed from the camera location to the point on the object. It is the intersection of these rays (triangulation) that determines the three-dimensional location of the point.

Photogrammetric data can be complemented with range data from other techniques. Photogrammetry is more accurate in the x and y direction while range data are generally more accurate in the z direction. This range data can be supplied by techniques like LiDAR, laser scanners (using time of flight, triangulation, or interferometry), white-light digitizers and any other technique that scans an area and returns x, y, z coordinates for multiple discrete points (commonly called "point clouds"). (Search "photogrammetry" on Wikipedia.com Jul. 29, 2021. CC-BY-SA 3.0 Modified. Accessed Sep. 8, 2021.)

As used herein, a "deploy" or "deployment" refers to an act, action, process, system, method, means, or apparatus for inserting an implant or prosthesis into a part, body part, and/or patient. "Deploy" or "deployment" can also refer to an act, action, process, system, method, means, or apparatus for placing something into therapeutic use. A device, system, component, medication, drug, compound, or nutrient may be deployed by a human operator, a mechanical device, an automated system, a computer system or program, a robotic system, or the like.

Standard medical planes of reference and descriptive terminology are employed in this specification. While these terms are commonly used to refer to the human body, certain terms are applicable to physical objects in general.

A standard system of three mutually perpendicular reference planes is employed. A sagittal plane divides a body into right and left portions. A coronal plane divides a body into anterior and posterior portions. A transverse plane divides a body into superior and inferior portions. A mid-sagittal, mid-coronal, or mid-transverse plane divides a body into equal portions, which may be bilaterally symmetric. The intersection of the sagittal and coronal planes defines a superior-inferior or cephalad-caudal axis. The intersection of the sagittal and transverse planes defines an anterior-posterior axis. The intersection of the coronal and transverse planes defines a medial-lateral axis. The superior-inferior or cephalad-caudal axis, the anterior-posterior axis, and the medial-lateral axis are mutually perpendicular.

Anterior means toward the front of a body. Posterior means toward the back of a body. Superior or cephalad means toward the head. Inferior or caudal means toward the feet or tail. Medial means toward the midline of a body, particularly toward a plane of bilateral symmetry of the body. Lateral means away from the midline of a body or away from a plane of bilateral symmetry of the body. Axial means toward a central axis of a body. Abaxial means away from a central axis of a body. Ipsilateral means on the same side of the body. Contralateral means on the opposite side of the body. Proximal means toward the trunk of the body. Proximal may also mean toward a user or operator. Distal means away from the trunk. Distal may also mean away from a user or operator. Dorsal means toward the top of the foot. Plantar means toward the sole of the foot.

The claims are not to be interpreted as including means-plus or step-plus-function limitations, unless such a limitation is explicitly recited in a given claim using the phrase(s) "means for" or "step for," respectively. The term "coupled" is defined as connected, although not necessarily directly, and not necessarily mechanically. The use of the word "a" or "an" when used in conjunction with the term "comprising" in the claims and/or the specification may mean "one," but it is also consistent with the meaning of "one or more" or "at least one." The term "about" means, in general, the stated value plus or minus 5%. The use of the term "or" in the claims is used to mean "and/or" unless explicitly indicated to refer to alternatives only or the alternatives are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features. Furthermore, a device or structure that is configured in a certain way is configured in at least that way but may also be configured in ways that are not listed.

In the foregoing Detailed Description, various features are grouped together in several examples for the purpose of streamlining the disclosure. This method of disclosure is not to be interpreted as reflecting an intention that the disclosure require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. § 112 Paragraph 6. It will be apparent to those having skill in the art that changes may be made to the details of the above-described embodiments without departing from the underlying principles of the disclosure.

While specific embodiments and applications of the present disclosure have been illustrated and described, it is to be understood that the scope of this disclosure is not limited to the precise configuration and components disclosed herein. Various modifications, changes, and variations which will be apparent to those skilled in the art may be made in the arrangement, operation, and details of the methods and systems of the present disclosure set forth herein without departing from the spirit and scope of the present disclosure.

The invention claimed is:

1. A method for visualizing and targeting anatomical structures inside a patient utilizing a handheld screen device, the method comprising:
   projecting a structured light pattern onto a surface of an anatomical feature of the patient with a structured light source;
   grasping the handheld screen device and manipulating a position of the handheld screen device relative to the patient, the handheld screen device comprising:
      a camera; and
      a display;
   orienting the camera on the handheld screen device relative to the anatomical feature of the patient by manipulating the position of the handheld screen device relative to the patient;
   capturing first image data of light reflecting from the surface of the anatomical feature with the camera on the handheld screen device, wherein the first image data represents a deformed structured light pattern reflecting from the surface of the anatomical feature; and
   comparing the first image data with a pre-operative 3-D image of the patient to determine a location of an anatomical structure located inside the patient and positioned relative to the anatomical feature of the patient;
   generating a 3-D surface map of the anatomical feature of the patient based on the deformed structured light pattern; and
   registering the 3-D surface map with the pre-operative 3-D image of the patient comprising:
      second image data of the anatomical feature of the patient; and
      third image data of an anatomical structure located inside the patient.

2. The method of claim 1, further comprising:
   capturing fourth image data of the anatomical feature of the patient with the camera on the handheld screen device; and
   displaying the fourth image data of the anatomical feature of the patient on the display of the handheld screen device.

3. The method of claim 2, further comprising:
   displaying an augmented virtual image on the display of the handheld screen device in addition to the anatomical feature of the patient, the augmented virtual image comprising at least one of:
      a virtual trajectory oriented with respect to the anatomical feature of the patient and the anatomical structure located inside the patient; and
      an overlay of the anatomical structure located inside the patient.

4. The method of claim 1, wherein the structured light pattern comprises a structured light dot matrix pattern.

5. The method of claim 4, wherein the structured light dot matrix pattern comprises at least one of:
   a predefined dot density; and
   a predefined spacing between adjacent dots forming the structured light dot matrix pattern.

6. The method of claim 1, wherein the structured light pattern comprises a structured light grid pattern.

7. The method of claim 6, wherein the structured light grid pattern comprises at least one of:
   a predefined orientation of lines forming the structured light grid pattern; and
   a predefined grid spacing between adjacent lines forming the structured light grid pattern.

8. The method of claim 1, wherein the handheld screen device comprises a smart phone.

9. A method for visualizing and targeting anatomical structures inside a patient utilizing a handheld screen device, the method comprising:
   holding the handheld screen device and manipulating a position of the handheld screen device relative to the patient, the handheld screen device comprising:
      a camera; and
      a display;
   orienting the camera on the handheld screen device relative to an anatomical feature of the patient by manipulating the position of the handheld screen device relative to the patient;
   capturing image data of light reflecting from a surface of the anatomical feature with the camera on the handheld screen device;
   comparing the image data with a pre-operative 3-D image of the patient to determine a location of an anatomical structure located inside the patient and positioned relative to the anatomical feature of the patient;
   displaying the anatomical feature of the patient on the display of the handheld screen device; and
   displaying an augmented virtual image on the display of the handheld screen device in addition to the anatomical feature of the patient, the augmented virtual image comprising at least one of:
      a virtual trajectory oriented with respect to the anatomical feature of the patient and the anatomical structure located inside the patient; and
      an overlay of the anatomical structure located inside the patient.

10. The method of claim 9, further comprising:
    projecting a structured light pattern onto the surface of the anatomical feature of the patient with a structured light source, wherein the image data represents light from a deformed structured light pattern reflecting from the surface of the anatomical feature;
    generating a 3-D surface map of the anatomical feature of the patient based on the deformed structured light pattern; and registering the 3-D surface map with the pre-operative 3-D image of the patient to determine the location of the anatomical structure located inside the patient.

11. The method of claim 10, wherein the handheld screen device comprises a smart phone.

12. The method of claim 11, wherein the camera is configured to capture infrared image data reflected from the surface of the anatomical feature of the patient.

13. The method of claim 12, wherein the structured light pattern comprises a structured light dot matrix pattern.

14. A method for visualizing and targeting anatomical structures inside a patient utilizing a handheld screen device comprising: a scanner, a detector, a registration module, a camera, and a display, the method comprising:

grasping the handheld screen device relative to the patient and orienting the scanner of the handheld screen device relative to an anatomical feature of the patient;

projecting a structured light pattern onto a surface of the anatomical feature with the scanner of the handheld screen device;

capturing first image data of a deformed structured light pattern reflecting from the surface of the anatomical feature with the detector of the handheld screen device;

comparing the first image data with a pre-operative 3-D image of the patient to determine a location of an anatomical structure located inside the patient and positioned relative to the anatomical feature of the patient;

capturing second image data of the anatomical feature of the patient with the camera of the handheld screen device; and displaying the second image data of the anatomical feature of the patient on the display of the handheld screen device.

15. The method of claim 14, further comprising:

generating a 3-D surface map of the anatomical feature of the patient based on the deformed structured light pattern in the first image data; and registering the 3-D surface map and the pre-operative 3-D image of the patient with the registration module of the handheld screen device to determine the location of the anatomical structure located inside the patient.

16. The method of claim 14, further comprising:

displaying an augmented virtual image on the display of the handheld screen device in addition to the anatomical feature of the patient, the augmented virtual image comprising at least one of:

a virtual trajectory oriented with respect to the anatomical feature of the patient and the anatomical structure located inside the patient; and an overlay of the anatomical structure located inside the patient.

17. The method of claim 14, wherein the handheld screen device comprises a smart phone.

18. The method of claim 17, wherein the scanner is configured to capture infrared image data reflected from the surface of the anatomical feature of the patient.

19. The method of claim 18, wherein the structured light pattern comprises an infrared structured light dot matrix pattern.

* * * * *